US009038487B2

(12) United States Patent
Ozawa et al.

(10) Patent No.: US 9,038,487 B2
(45) Date of Patent: May 26, 2015

(54) SUPPORT STRUCTURE FOR LOAD MEASUREMENT SENSOR

(75) Inventors: Hidetoshi Ozawa, Tochigi (JP); Wataru Honda, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 347 days.

(21) Appl. No.: 13/558,514

(22) Filed: Jul. 26, 2012

(65) Prior Publication Data

US 2013/0025378 A1 Jan. 31, 2013

(30) Foreign Application Priority Data

Jul. 28, 2011 (JP) ................................ 2011-165471
Aug. 10, 2011 (JP) ................................ 2011-175462
Aug. 10, 2011 (JP) ................................ 2011-175463
Jun. 8, 2012 (JP) ................................ 2012-131052

(51) Int. Cl.
*G01L 1/04* (2006.01)
*G01G 19/414* (2006.01)
*B60N 2/00* (2006.01)

(52) U.S. Cl.
CPC ............ *G01G 19/4142* (2013.01); *B60N 2/002* (2013.01)

(58) Field of Classification Search
CPC .............................. B60N 2/002; G01L 1/2206
USPC ............................... 73/862.621, 862.625, 818
See application file for complete search history.

(56) References Cited

U.S. PATENT DOCUMENTS

| 6,224,094 | B1 * | 5/2001 | Norton ........................... 280/735 |
| 6,364,352 | B1 * | 4/2002 | Norton ........................... 280/735 |
| 6,662,670 | B2 * | 12/2003 | Clark ........................ 73/862.391 |
| 6,820,896 | B1 * | 11/2004 | Norton ........................... 280/735 |
| 2001/0011482 | A1 | 8/2001 | Billen |
| 2003/0106723 | A1 * | 6/2003 | Thakur et al. .................. 177/144 |
| 2004/0007397 | A1 | 1/2004 | Golla |
| 2004/0050182 | A1 | 3/2004 | Dukart |
| 2005/0021207 | A1 * | 1/2005 | Endo et al. ....................... 701/49 |
| 2006/0010984 | A1 * | 1/2006 | Yamazaki ......................... 73/761 |
| 2007/0057527 | A1 * | 3/2007 | Endo et al. .................. 296/65.13 |
| 2008/0042797 | A1 * | 2/2008 | Nakasone et al. ................ 338/5 |

(Continued)

FOREIGN PATENT DOCUMENTS

| EP | 2551652 A1 * | 1/2013 |
| JP | 4205028 B2 | 1/2009 |
| JP | 2010-042809 A | 2/2010 |

OTHER PUBLICATIONS

Search Report established for EP 12178278.3 (Oct. 24, 2012).

*Primary Examiner* — Max Noori
(74) *Attorney, Agent, or Firm* — Drinker Biddle & Reath LLP

(57) ABSTRACT

A support structure for a load measurement sensor has sufficient durability without adding a large load to a portion transmitting a load to the load measurement sensor. In a support structure for a load measurement sensor, including a sensor body detecting a load generated from a seat having a seat frame and an extension shaft portion extending from the sensor body, by way of attachment brackets in the state where the extension shaft portion follows the horizontal direction, the support structure includes a load input portion which comes into contact with the sensor body and inputs a load to the sensor body, the sensor body includes a load receiving surface which contacts the load input portion and receives the load, and the load input portion is formed to be movable in the axial direction of the extension shaft portion with respect to the load receiving surface.

17 Claims, 38 Drawing Sheets

(56) References Cited

U.S. PATENT DOCUMENTS

| | | |
|---|---|---|
| 2008/0202225 A1 | 8/2008 | Munz et al. |
| 2009/0079239 A1* | 3/2009 | Endo et al. .................. 297/217.2 |
| 2009/0179764 A1* | 7/2009 | Lee et al. ....................... 340/667 |
| 2010/0133017 A1* | 6/2010 | Ito et al. ......................... 177/136 |
| 2011/0018301 A1* | 1/2011 | Endo et al. .................... 296/68.1 |
| 2011/0018302 A1* | 1/2011 | Endo et al. .................... 296/68.1 |

* cited by examiner

FRONT-TO-BACK DIRECTION

WIDTH DIRECTION

SUPPORT STRUCTURE FOR LOAD MEASUREMENT SENSOR

BACKGROUND

Disclosed herein is a support structure for a load measurement sensor, and particularly, to a support structure for a load measurement sensor which is supported in the state where an extension portion extending from a sensor body is positioned at a side portion of the sensor body.

With a view to improving the safety of a passenger or the comfort thereof when the passenger sits on a seat, there is proposed a technique of controlling an operation of a device around a vehicle seat in response to the weight of the sitting passenger.

In such a technique, in order to detect the weight of the sitting passenger, a load measurement sensor is generally disposed below the vehicle seat on which the passenger sits.

The installation position of the load measurement sensor is generally located below the vehicle seat. Then, for example, there is a known configuration in which a load measurement sensor is provided between a seat frame constituting a vehicle seat and a slide rail provided to slide the vehicle seat in the front-to-back direction (see Japanese Patent Document No. 4205028B1 ("the '028 Reference")).

The '028 Reference discloses, as illustrated in FIG. 37, a configuration in which a load measurement sensor 130 (which it describes as a "load sensor") is provided above an upper rail 112 (which it describes as a "slider") sliding on a lower rail 111 (which it describes as a "rail body") attached to a vehicle body floor and a seat frame 101 is disposed above the load measurement sensor 130. Furthermore, FIG. 37 is a partial perspective view illustrating a vehicle seat which adopts the support structure for the load measurement sensor according to the related art.

Then, as illustrated in FIG. 38, in order to fix the load measurement sensor 130 to the seat frame 101, a shaft portion 131 (which it describes as a "male screw") is provided, and the shaft portion 131 is disposed so that its axial direction becomes the vertical direction. In recent years, in order to improve the convenience of the passenger who gets in and out of the vehicle or the design of the vehicle, a technique is demanded which lowers the height of the vehicle seat. However, in the case where the load measurement sensor 130 is provided with such a technique, the seat frame 101 is disposed so that the seat frame 101 increases in height by the height of the load measurement sensor 130, which causes a problem in which the height of the vehicle seat increases. FIG. 38 is a cross-sectional view illustrating the support structure for the load measurement sensor according to the related art.

On the other hand, there is proposed a technique in which the shaft portion is disposed so that the axial direction of the shaft portion for attaching the load measurement sensor thereto is not set as the vertical direction, but is set as the horizontal direction (see Japanese Patent Document No. 2010-42809A ("the '809 Reference")).

In the '809 Reference, the load measurement sensor (which it describes as a "load detection sensor") is provided so that the axial direction becomes the horizontal direction and the load measurement sensor is disposed to be included in the height range of the seat frame. For this reason, the height of the vehicle seat may be lowered compared to the technique of the '028 Reference.

On the other hand, there is a known load measurement sensor which includes a deformation portion deformed by receiving a load, in which the deformation portion is provided as a detection portion for detecting the load. When such a sensor receives the load from the seat while being supported so that the axial direction of the shaft portion follows the horizontal direction, the deformation portion is deformed to be curved inward in the radial direction of the shaft portion by receiving the load. Then, the load is measured based on the deformation amount of the deformation portion. However, in the load measurement sensor, when a biased load is applied to the load measurement sensor due to the influence of the passenger's seating posture or seating position, the deformation portion may be excessively deformed. In such a state, there is a possibility that the load may not be normally measured.

Therefore, various embodiments of the invention are made in view of the above-described problems, and provide a support structure for a load measurement sensor capable of measuring a load by a deformation amount of a deformation portion and of disposing a load measurement sensor at a position where a load is normally and stably measured by inhibiting an excessive deformation.

Further, in order to support the load measurement sensor at a predetermined position, an insertion hole may be formed in a sensor supporting member and a shaft portion may be inserted into the insertion hole. On the other hand, there is a possibility that the load measurement sensor in which the shaft hole is inserted into the insertion hole may rotate about the shaft portion with respect to the member provided with the insertion hole. By the relative rotation of the load measurement sensor, the position of the load detection surface provided at a predetermined portion of the sensor changes in the rotation direction.

Then, the direction of the load detection surface with respect to the load changes by a positional change in the load detection surface, which adversely affects the load measurement precision of the load measurement sensor. For this reason, there is a need to inhibit the rotation of the load measurement sensor after the shaft portion is inserted into the insertion hole. Here, when inhibiting the relative rotation of the load measurement sensor, there is a concern that a local force (contact pressure) may act on the member provided with the insertion hole or the load measurement sensor and the shaft portion of the load measurement sensor may be cut out so that the member provided with the insertion hole is deformed. In such a state, the load measurement precision is adversely affected and the load is not easily and appropriately measured.

Therefore, various embodiments of the invention further provide a support structure for a load measurement sensor capable of holding a load measurement sensor at a position where a load may be accurately measured.

Further, as described above, there is the known load measurement sensor which includes the deformation portion deformed by receiving the load from the seat, but in such a sensor, there is a concern that a biased load may be applied to the deformation portion when the load is applied from the seat.

Therefore, various embodiments of the invention further provide a support structure for a load measurement sensor capable of inhibiting a biased load from being applied to a load detection portion of a sensor body.

In addition, when the load measurement sensor is moved by the load transmitted from the seat to the load measurement sensor and the deformation portion is deformed, if the load is not appropriately transmitted to the deformation portion, there is a possibility that the deformation of the deformation portion may be disturbed. For this reason, there is a possibility that the load may not be appropriately detected by the deformation portion even when the load is input from the seat.

Therefore, various embodiments of the invention further provide a support structure capable of reliably transmitting a load input from a seat to a load measurement sensor to accurately detect the input load.

SUMMARY

The above-described problems may be solved by a support structure for a load measurement sensor which supports a load measurement sensor, including a sensor body that detects a load applied to a seat and an extension shaft portion extending from the sensor body, by way of a support bracket in the state where the extension shaft portion is positioned at a side portion of the sensor body, in which the sensor body includes a deformation portion which is deformed to be curved inward in the radial direction of the extension shaft portion by receiving the load, and a regulation portion which is positioned inside relative to the deformation portion in the radial direction and comes into contact with the deformation portion to regulate a deformation amount of the deformation portion, and in which the regulation portion is disposed in an axial direction of the extension shaft portion at a position that includes a load center point of the load applied to the deformation portion by the seat.

According to the support structure, the regulation portion receives the portion which corresponds to the load center point in the deformation portion. That is, the regulation portion comes into contact with the deformation portion at the side opposite to the load input side. As a result, the excessive deformation of the deformation portion due to the biased load or the like is inhibited, so that the load measurement sensor may normally and stably measure the load.

At this time, as in an embodiment, the sensor body may further include foreign matter intrusion inhibiting portion which inhibits foreign matter from intruding between the deformation portion and the regulation portion, and the foreign matter intrusion inhibiting portion may be provided at a position adjacent to the regulation portion in the axial direction.

With such a configuration, foreign matter is inhibited from intruding between the deformation portion and the regulation portion, so that the adverse influence on the load measurement precision due to the intrusion of the foreign matter may be inhibited.

At this time, as in an embodiment, the regulation portion and the foreign matter intrusion inhibiting portion may be provided in the same components among components constituting the sensor body.

With such a configuration, since the number of components decreases compared to the case where the regulation portion and the foreign matter intrusion inhibiting portion are individually provided, the assembly operation or the like may be further easily performed.

Further, as in an embodiment, the support structure for the load measurement sensor may include a pressing portion which is positioned at the outside of the deformation portion in the radial direction and presses the deformation portion inward in the radial direction when the load is applied to the seat, and the length of the regulation portion in the axial direction may be longer than the length of the pressing portion in the axial direction.

With such a configuration, since the regulation portion receives the deformation portion not only in the portion corresponding to the load center point, but also all range where the pressing portion presses, the load may be further stably measured.

Further, as in an embodiment, the support structure for the load measurement sensor may include: the pressing portion which is positioned at the outside of the deformation portion in the radial direction and presses the deformation portion inward in the radial direction when the load is applied to the seat; and a load transmission member that is positioned between the deformation portion and the pressing portion in the radial direction to widen a pressing area in which the pressing portion presses the deformation portion, and the load transmission member may be provided so that both ends of the load transmission member in the axial direction are positioned at the inside of both ends of the regulation portion in the axial direction.

With such a configuration, even when the range where the deformation portion presses is widened by the load transmission member, the regulation portion receives the deformation portion throughout the entire wide pressing range. Accordingly, the load may be further stably measured by taking advantage of the effect of the load transmission member.

Further, as in an embodiment, the support structure for the load measurement sensor may include the pressing portion which is positioned at the outside of the deformation portion in the radial direction and presses the deformation portion inward in the radial direction when the load is applied to the seat. The pressing portion may be positioned at a position different from the support bracket in the axial direction. The sensor body may include a substrate which outputs an electric signal representing a measurement result using the load measurement sensor. The substrate may be disposed at the side opposite to the support bracket with respect to the pressing portion in the axial direction. The gap between the substrate and the pressing portion in the axial direction may be larger than the gap between the pressing portion and the support bracket.

With such a configuration, since the contact between the substrate and the pressing portion is inhibited, it is possible to inhibit an adverse influence on the substrate due to the contact with the pressing portion.

Further, as in an embodiment, the support structure for the load measurement sensor may include: the pressing portion which is positioned at the outside of the deformation portion in the radial direction and presses the deformation portion inward in the radial direction when the load is applied to the seat; and a load input member that is positioned between the deformation portion and the pressing portion in the radial direction and moves in the axial direction along with the deformation of the deformation portion. One end of a contact surface of the load input member with respect to the deformation portion in the axial direction may be positioned near the extension shaft portion compared to the other end of the contact surface in the axial direction. One end of the regulation portion in the axial direction may be positioned near the extension shaft portion compared to the other end of the regulation portion in the axial direction. One end of the contact surface in the axial direction may be separated from the extension shaft portion compared to one end of the regulation portion in the axial direction.

With such a configuration, when the pressing portion presses the deformation portion through the load input member, the load input member moves along the axial direction of the extension shaft portion, and the regulation portion may stably and continuously receive the deformation portion.

At this time, as in an embodiment, the other end of the contact surface in the axial direction may be near the extension shaft portion compared to the other end of the regulation portion in the axial direction.

With such a configuration, since the contact surface is included in the range of the regulation portion in the axial direction of the extension shaft portion, the load may be appropriately received and accurately detected.

Further, as in an embodiment, the support structure for the load measurement sensor may include: a movable portion which is disposed at a position parallel to the support bracket in the axial direction and moves in the axial direction along with the deformation of the deformation portion; and a spacer which is disposed in a gap between the support bracket and the movable portion in the axial direction and is adjacent to the movable portion in the axial direction. The movable portion may be positioned at the outside of the deformation portion in the radial direction and moves toward the support bracket along the axial direction while pressing the deformation portion inward in the radial direction to transmit the load to the deformation portion. The end of the spacer near the movable portion in the axial direction and the end of the deformation portion near the spacer in the axial direction may overlap with each other on the same imaginary plane in which the axial direction is set as the normal direction.

With such a configuration, it is possible to inhibit the biased load from being applied to the end of the deformation portion near the spacer in the axial direction of the extension shaft portion.

At this time, as in an embodiment, a hole portion forming member that has a hole portion formed to insert the deformation portion thereinto may be positioned at the inside in the axial direction compared to the support bracket. The movable portion may be a load input member that is positioned between the hole portion forming member and the deformation portion in the radial direction and moves toward the support bracket in the axial direction along with the deformation of the deformation portion. The load input member may be disposed at a position separated from the support bracket compared to the end of the deformation portion near the support bracket in the axial direction.

With such a configuration, it is possible to visually check the state of the vicinity of the end of the deformation portion near the installation side of the support bracket in the axial direction of the extension shaft portion, and, for example, the presence of foreign matter from the upper side.

Further, as in an embodiment, the support structure for the load measurement sensor may include: the movable portion which is disposed at a position parallel to the support bracket in the axial direction and moves in the axial direction along with the deformation of the deformation portion; and a movement regulation member that is adjacent to the movable portion in the axial direction and regulates the movement of the movable portion toward the side opposite to the support bracket. The movable portion may be positioned at the outside of the deformation portion in the radial direction and moves toward the support bracket along the axial direction while pressing the deformation portion inward in the radial direction to transmit the load to the deformation portion. The end of the regulation portion at the side opposite to the support bracket in the axial direction may be near the support bracket compared to the movement regulation member.

With such a configuration, when the length of the regulation portion (the length in the axial direction) is ensured by the length to the arrangement position of the movement regulation member in order to regulate the deformation amount of the deformation portion, it is possible to inhibit the regulation portion from being unnecessarily increased in size.

Further, as in an embodiment, the deformation portion may include a load receiving surface and be deformed to be curved inward in the radial direction when the load is transmitted to the load receiving surface. The support structure for the load measurement sensor may include: a hole portion which is formed in the support bracket to insert the extension shaft portion thereinto; a convex portion which protrudes from the extension shaft portion; and a concave portion which is formed in the support bracket and is engageable with the convex portion. When the load measurement sensor rotates about the extension shaft portion relative to the support bracket in the state where the extension shaft portion is inserted into the hole portion, the convex portion may come into contact with the concave portion.

With such a configuration, since the convex portion formed in the extension shaft portion comes into contact with the concave portion formed in the support bracket, it is possible to regulate the load measurement sensor from rotating about the extension shaft portion with respect to the support bracket. Accordingly, the position of the load measurement sensor in the rotation direction is fixed, so that the load measurement sensor may be continuously held at a position where the load may be accurately measured.

Further, as in an embodiment, the support structure for the load measurement sensor may include a contact portion which comes into contact with the sensor body and transmits the load to the sensor body. The sensor body may include the load receiving surface which comes into contact with the contact portion and receives the load. A surface contact holding mechanism may be formed in which the load receiving surface is able to come into plane-contact with the contact portion when the load is transmitted to a position where the load receiving surface comes into contact with the contact portion.

With such a configuration, since the surface contact holding mechanism in which the load receiving surface and the contact portion are able to come into plane-contact with each other with the application of the load is provided at a position where the load receiving surface and the contact portion come into contact with each other, the load transmitted from the contact portion may be stably received by the surface contact holding mechanism, so that the biased load from the contact portion may be inhibited.

At this time, as in an embodiment, the support structure for the load measurement sensor may include a load transmission portion which transmits the load from the seat to the contact portion. The load receiving surface may receive the load from the contact portion and be displaced in the direction opposite to the contact portion. The load transmission portion may include a deformation following portion which is deformed based on the displacement of the load receiving surface.

With such a configuration, since the load transmission member may include the deformation following portion which is deformable based on the displacement of the load receiving surface, even when the biased load is applied from the contact portion, the biased load may be inhibited by the deformation of the deformation following portion based on the displacement of the load receiving surface, so that the input load may be further stably received.

Further, as in an embodiment, the surface contact holding mechanism may be formed such that the regulation portion is able to come into plane-contact with the deformation portion when the deformation portion receives the load at a position where the regulation portion comes into contact with the deformation portion.

With the above-described configuration, since the surface contact holding mechanism in which the regulation portion and the deformation portion are able to come into plane-contact with each other with the application of the load to the deformation portion is provided at a position where the regulation portion and the deformation portion come into contact with each other, the load may be stably received by the surface contact holding mechanism, so that it is possible to inhibit the biased load from being applied from the deformation portion to the regulation portion when the deformation portion is deformed by receiving the load from the seat.

At this time, as in an embodiment, the deformation portion may include a free end at one end thereof, and the surface contact holding mechanism may be provided near the free end.

With the above-described configuration, the biased load may be further effectively inhibited.

Further, as in an embodiment, the support structure for the load measurement sensor may include: a load input portion which comes into contact with the load measurement sensor and inputs the load to the load measurement sensor; and a sensor body receiving portion which is pressed by the deformation portion when the load measurement sensor is moved by the load input from the load input portion. In the state where the load measurement sensor is supported by the support bracket, the load input portion and the sensor body receiving portion may be separated from each other.

In the above-described configuration, since the load input portion and the sensor body receiving portion are present at positions separated from each other, when the load is input from the load input portion to the load measurement sensor, the load measurement sensor moves, and the deformation portion is deformed while being pressed against the sensor body receiving portion through the contact portion with the movement operation. By such a procedure, the load which is input from the load input portion is reliably transmitted to the sensor body, and more specifically, the deformation portion through the contact portion. In addition, even when the input load is minute, the load is appropriately transmitted from the load input portion to the deformation portion by the principle of a lever. As a result, the load which is input from the load input portion may be appropriately transmitted to the deformation portion, so that the load may be accurately detected.

According to at least one embodiment discussed above, the excessive deformation of the deformation portion due to the biased load or the like is inhibited, so that the load measurement sensor may normally and stably measure the load.

According to at least one embodiment discussed above, foreign matter is inhibited from intruding between the deformation portion and the regulation portion, so that the load measurement precision may be inhibited from being adversely affected by the intrusion of the foreign matter.

According to at least one embodiment discussed above, since the number of components decreases compared to the case where the regulation portion and the foreign matter intrusion inhibiting portion are individually provided, the assembly operation or the like may be further easily performed.

According to at least one embodiment discussed above, since the regulation portion receives the deformation portion not only in the portion corresponding to the load center point, but also throughout the range where the pressing portion presses, the load may be further stably measured.

According to at least one embodiment discussed above, since the regulation portion receives the deformation portion throughout the entire pressing range even when the range where the deformation portion presses is widened by the load transmission member, the load may be further stably measured by taking advantage of the effect of the load transmission member.

According to at least one embodiment discussed above, since the contact between the substrate and the pressing portion is inhibited, it is possible to inhibit an adverse influence on the substrate due to the contact with the pressing portion.

According to at least one embodiment discussed above, even when the load input member moves along the axial direction of the extension shaft portion when the pressing portion presses the deformation portion through the load input member, the regulation portion stably and continuously receives the deformation portion.

According to at least one embodiment discussed above, since the contact surface is included in the range of the regulation portion in the axial direction of the extension shaft portion, the load may be appropriately received and accurately detected.

According to at least one embodiment discussed above, it is possible to inhibit the biased load from being applied to the end of the deformation portion near the spacer in the axial direction of the extension shaft portion.

According to at least one embodiment discussed above, it is possible to visually check the state of the vicinity of the end of the deformation portion near the installation side of the support bracket in the axial direction of the extension shaft portion from the upper side.

According to at least one embodiment discussed above, since the length of the regulation portion may be ensured by the length to the arrangement position of the movement regulation member in order to regulate the deformation amount of the deformation portion, it is possible to inhibit the regulation portion from being unnecessarily increased in size.

According to at least one embodiment discussed above, since the load measurement sensor may be inhibited from rotating about the extension shaft portion with respect to the support bracket, the position of the load measurement sensor in the rotation direction may be fixed, and the load measurement sensor may be held at a position where the load may be accurately measured.

According to at least one embodiment discussed above, since the load which is transmitted from the contact portion may be stably received by the surface contact holding mechanism, it is possible to inhibit the biased load from being applied from the contact portion.

According to at least one embodiment discussed above, since the deformation following portion is deformed to follow the displacement of the load receiving surface even when the biased load is applied from the contact portion, the biased load may be inhibited, so that the load may be further stably received.

According to at least one embodiment discussed above, since the load may be stably received by the surface contact holding mechanism, it is possible to inhibit the biased load from being applied from the deformation portion to the regulation portion when the deformation portion is deformed by receiving the load from the seat.

According to at least one embodiment discussed above, the biased load may be further effectively inhibited.

According to at least one embodiment discussed above, the load input from the load input portion is reliably transmitted to the deformation portion of the sensor body through the contact portion. In addition, even when the input load is minute, the load is appropriately transmitted from the load input portion to the deformation portion by the principle of a lever. As a result, the load may be accurately detected.

BRIEF DESCRIPTION OF THE DRAWINGS

Various embodiments of the invention are illustrated in the drawings, in which.

DETAILED DESCRIPTION

Hereinafter, a support structure for a load measurement sensor according to an embodiment (the embodiment) of the invention will be described by referring to FIGS. 1 to 28. Here, the load measurement sensor of the embodiment is used to measure a load applied to a vehicle seat Z, and in the following description, a support structure for supporting the load measurement sensor to a predetermined member in a predetermined posture will be described.

Furthermore, the sign FR of the drawings indicates the front side of the vehicle, and the sign RR indicates the rear side of the vehicle. Further, in the following description, the width direction of the vehicle seat Z (hereinafter, simply referred to as the width direction) is a direction which corresponds to the transverse direction in the state where the vehicle faces the front side. Further, in FIG. 4, sensor attachment components 40 to be described below are not illustrated.

A load measurement sensor (hereinafter, a sensor 30) measures a load which is generated when a passenger sits on a vehicle seat Z as a load which is applied to the vehicle seat Z. The measurement result is output as an electric signal from a substrate in the sensor 30. Subsequently, when a receiver (not illustrated) receives the output signal, it is determined whether a passenger is present or whether the sitting passenger is an adult or a child.

Structure of Vehicle Seat

Figure 3:
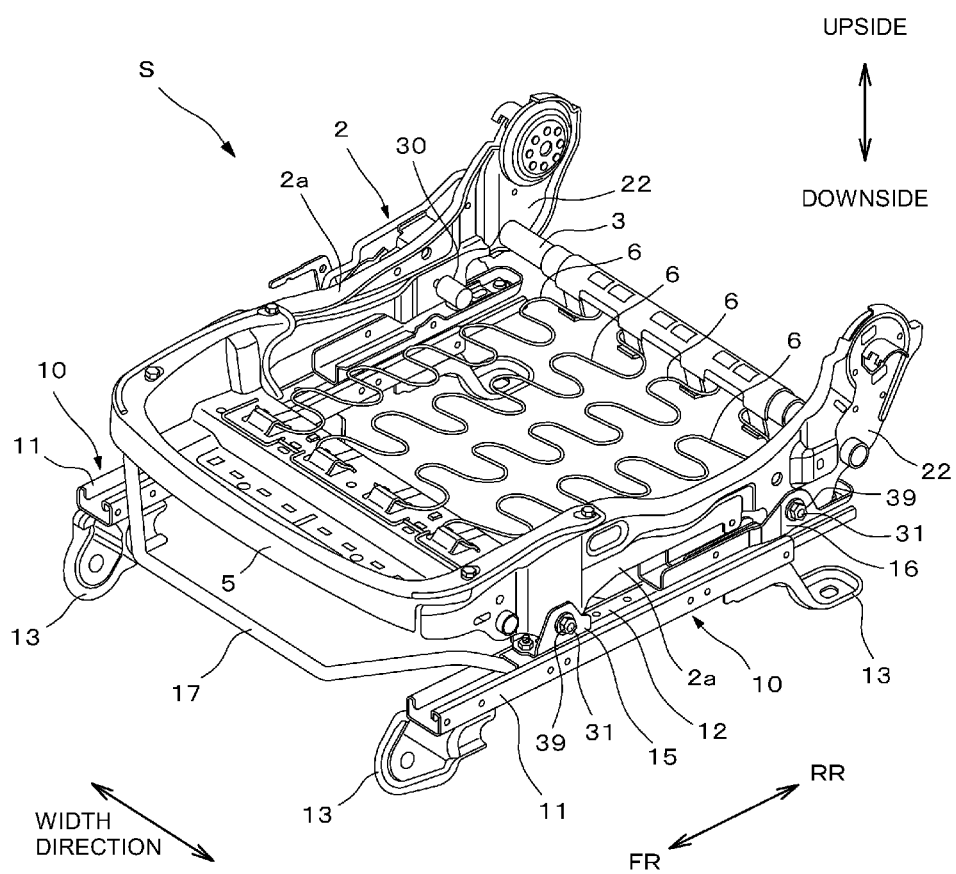
FIG. 3 is a perspective view of a seat unit.

The sensor 30 is supported at a predetermined position of a seat unit S illustrated in FIG. 3 to measure a load applied to the vehicle seat Z. Hereinafter, a structure of the seat unit S which includes the vehicle seat Z will be described.

Figure 1:
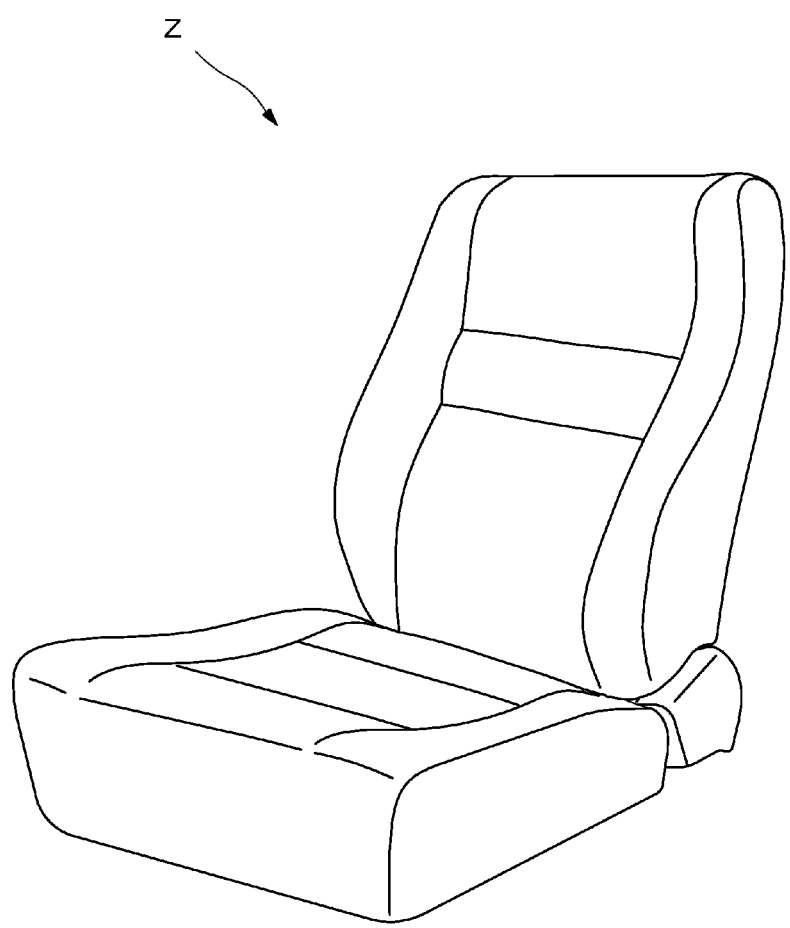
FIG. 1 is a perspective view of a vehicle seat.
Figure 2:
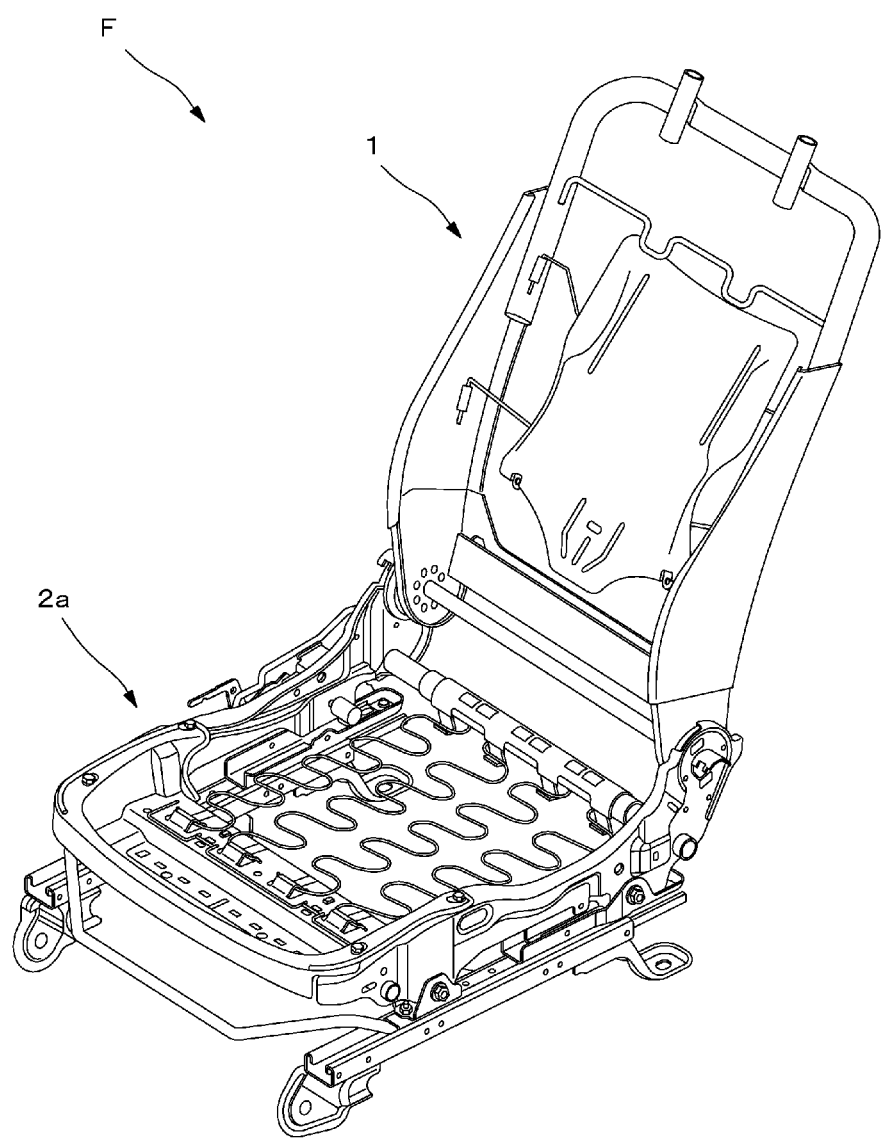
FIG. 2 is a perspective view of a seat frame.

The seat unit S includes the vehicle seat Z and a rail mechanism 10, and is fixed to a vehicle body floor. The vehicle seat Z illustrated in FIG. 1 is an example of the seat, and includes a seat frame F and a cushion body which are provided as a structure thereof. The seat frame F is made of a metal material as illustrated in FIG. 2, and includes a seating frame 2 having a side frame 2a provided at each of both ends thereof in the width direction and a seat back frame 1 provided at the rear side thereof.

Figure 4:
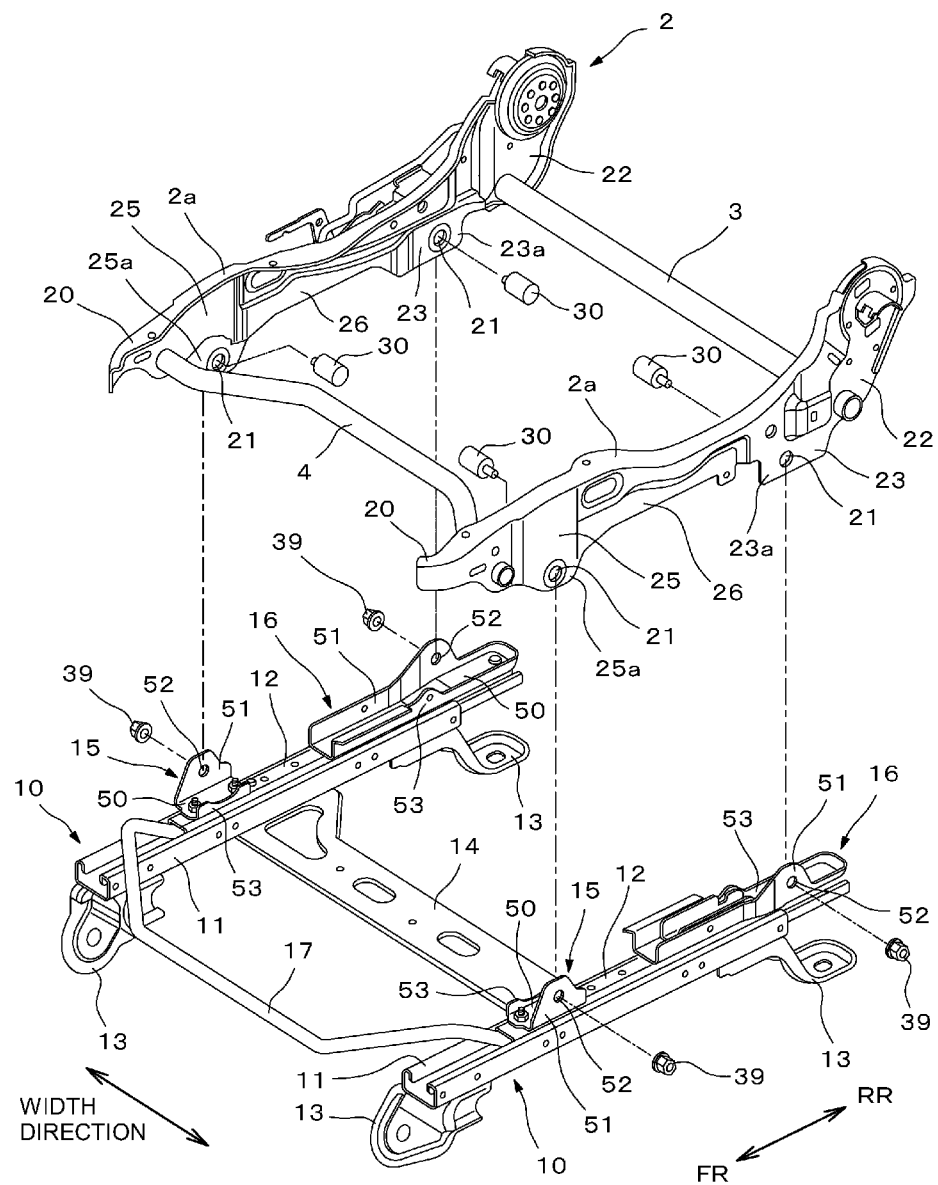
FIG. 4 is an exploded perspective view of the seat unit.

Each of the side frames 2a which constitutes the seating frame 2 is a sheet metal member that extends in the front-to-back direction and its rear end is connected to the seat back frame 1. Further, the side frame 2a which is present at one end side of the width direction and the side frame 2*a* which is present at the other end side of the width direction are away from each other in the width direction in parallel to each other. Further, as illustrated in FIG. 4, the side frames 2*a* are connected to each other at the rear end sides thereof through a connection pipe 3, and are also connected to each other at the front end sides through a submarine restraining pipe 4.

The submarine restraining pipe 4 is a pipe member that extends from one end to the other end in the width direction of the vehicle seat Z. A transverse center portion 4*a* and a transverse end 4*b* of the submarine restraining pipe 4 are arranged in parallel along the width direction, and deviate from each other in the front-to-back direction. In the embodiment, the transverse center portion 4*a* is positioned at the rear side of the transverse end 4*b* (for example, see FIG. 15). A connection portion 4*c* may be provided between the transverse center portion 4*a* and the transverse end 4*b* to connect both each other, and the extension direction of the connection portion 4*c* is inclined with respect to the width direction.

Further, a plurality of S-springs 6 is disposed between the side frames 2*a* to support the cushion body from the lower side thereof. Furthermore, the front end of each of the S-springs 6 is hung by a hanging pan 5 which is provided between the side frames 2*a*, and the rear end thereof is hung by a hanging and locking member that is attached to the connection pipe 3. Accordingly, the S-springs 6 are positioned between the side frames 2*a* in the width direction. Furthermore, the structure of the side frame 2*a* will be described in detail below.

The pair of rail mechanisms 10 is provided to be away from each other in the width direction, and each rail mechanism 10 includes a lower rail 11 and an upper rail 12 which slides on the lower rail 11. The lower rail 11 and the upper rail 12 both extend along the front-to-back direction. Further, as illustrated in FIG. 4, the upper rails 12 are connected to each other by a slide lever 17, and the lower rails 11 are connected to each other by a member frame 14. Further, a fixation bracket 13 is attached to the lower surface of the lower rail 11, and the fixation bracket 13 is fastened to the vehicle body floor, so that the lower rail 11 is fixed onto the vehicle body floor.

The upper rail 12 is disposed to be slidable on the lower rail 11, and attachment brackets 15 and 16 are fixed onto the upper rail 12 by a bolt 18 and a nut. Further, the side frame 2*a* of the vehicle seat Z is connected to the attachment brackets 15 and 16. Then, when the attachment brackets 15 and 16 are connected to the side frame 2*a*, the vehicle seat Z is placed on the upper rail 12 and the lower rail 11.

Furthermore, in the state where the vehicle seat Z is placed on the lower rail 11, the side frame 2*a* which is present at one end side of the width direction is positioned above the lower rail 11 which is present at one end side of the width direction, and the side frame 2*a* which is present at the other end side of the width direction is positioned above the lower rail 11 which is present at the other end side of the width direction. Further, the plurality of S-springs 6 is disposed between the lower rails 11 to be parallel to each other in the width direction.

Further, in the embodiment, the sensor 30 to be described below is supported by each of the attachment brackets 15 and 16. That is, in the configuration according to the embodiment, the attachment brackets 15 and 16 correspond to the support brackets. On the other hand, in the embodiment, if a load is generated when a passenger sits on the vehicle seat Z, the side frame 2*a* presses a predetermined portion of the sensor 30 downward so that the load is input to the sensor 30.

Structure of Sensor

Next, the structure of the sensor 30 will be described by referring to FIG. 5.

Figure 5:
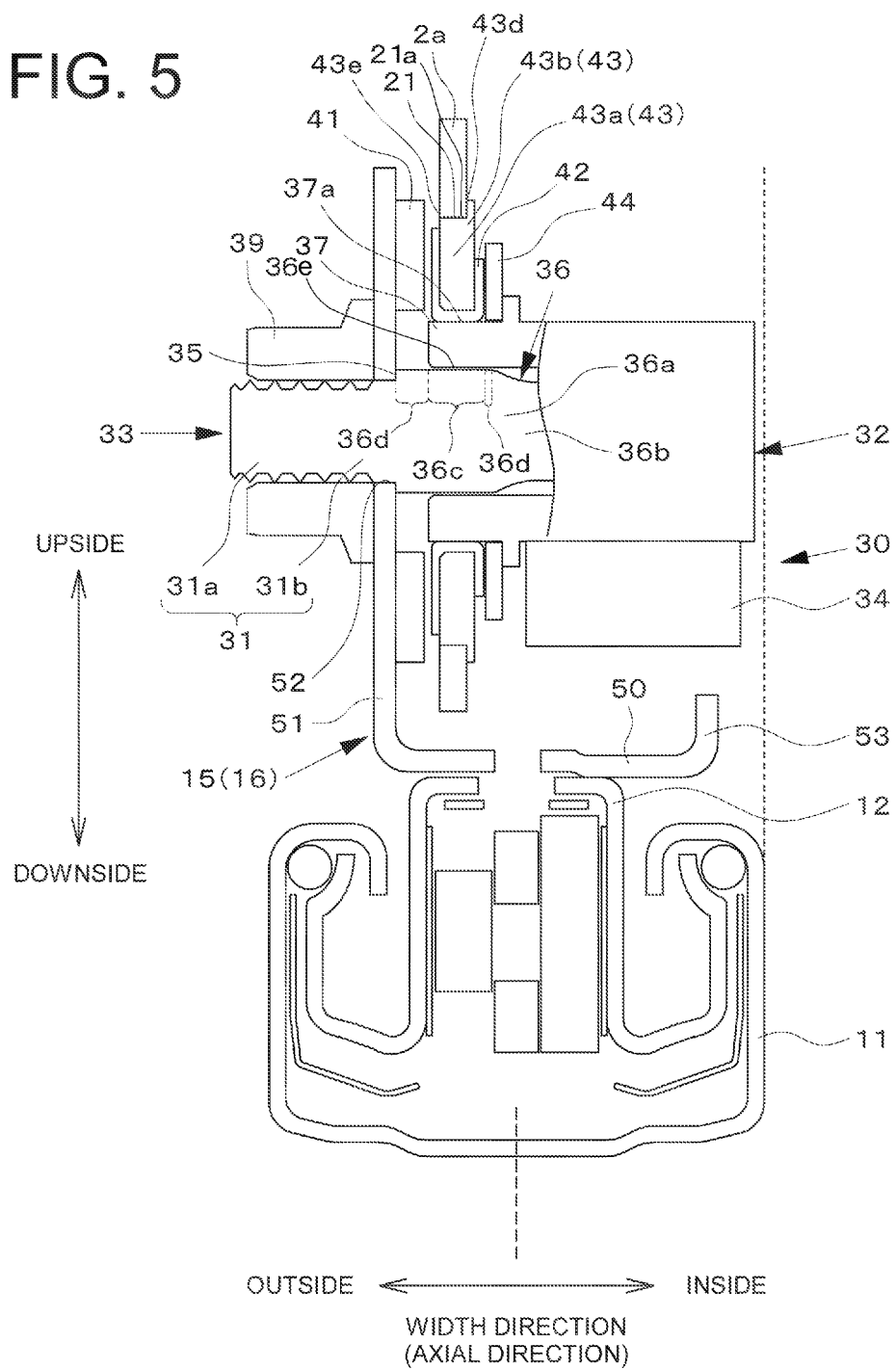
FIG. 5 is a sectional diagram illustrating a support structure for a load measurement sensor.

The sensor 30 includes, as illustrated in FIG. 5, an extension shaft portion 31, a sensor body 32, and a substrate unit 34. In the embodiment, in a metallic shaft body 33 which has a male screw formed at one end thereof, the extension shaft portion 31 is formed by the end on the formation side of the male screw. On the other hand, the sensor body 32 includes a portion in which the extension shaft portion 31 is excluded from the shaft body 33 and an outer cylindrical body through which the portion is inserted. Furthermore, the shaft body 33 is integrated with the outer cylindrical body which constitutes the sensor body 32.

The extension shaft portion 31 is a bolt-shaped portion which is provided to support the sensor 30 at a predetermined position of the seat unit S, and extends from the side portion of the sensor body 32. Further, the extension shaft portion 31 includes a male screw portion 31*a* which is formed in one end of the shaft body 33 in the axial direction and an adjacent portion 31*b* which is adjacent to the male screw portion 31*a* in the axial direction. The portion corresponding to the thread ridge of the male screw portion 31*a* and the adjacent portion 31*b* are equal to each other in diameter. Furthermore, in the embodiment, the extension shaft portion 31 is provided with the male screw portion 31*a*, but may be provided with a female screw portion.

The sensor body 32 is a portion which detects and measures the load applied to the vehicle seat Z, and includes a positioning portion 35 which positions the sensor 30 and a load detection portion 37 which is deformed to detect the load. The positioning portion 35 is a step portion which is adjacent to the adjacent portion 31*b* at the side opposite to the male screw portion 31*a* in the shaft body 33 provided with the extension shaft portion 31. The step portion which forms the positioning portion 35 has an outer diameter which is slightly larger than that of the male screw portion 31*a* or the adjacent portion 31*b*.

The load detection portion 37 is formed by an annular portion which is formed at the opening side end of the outer cylindrical body. The load detection portion 37 corresponds to a deformation portion, and when a load generated along the radial direction of the extension shaft portion 31 is applied to the load detection portion 37, the load detection portion 37 is deformed (displaced) to be curved inward in the radial direction. The sensor body 32 detects the deformation amount of the load detection portion 37 by a strain sensor (not illustrated), and measures the magnitude of the load from the deformation amount.

Figure 14:
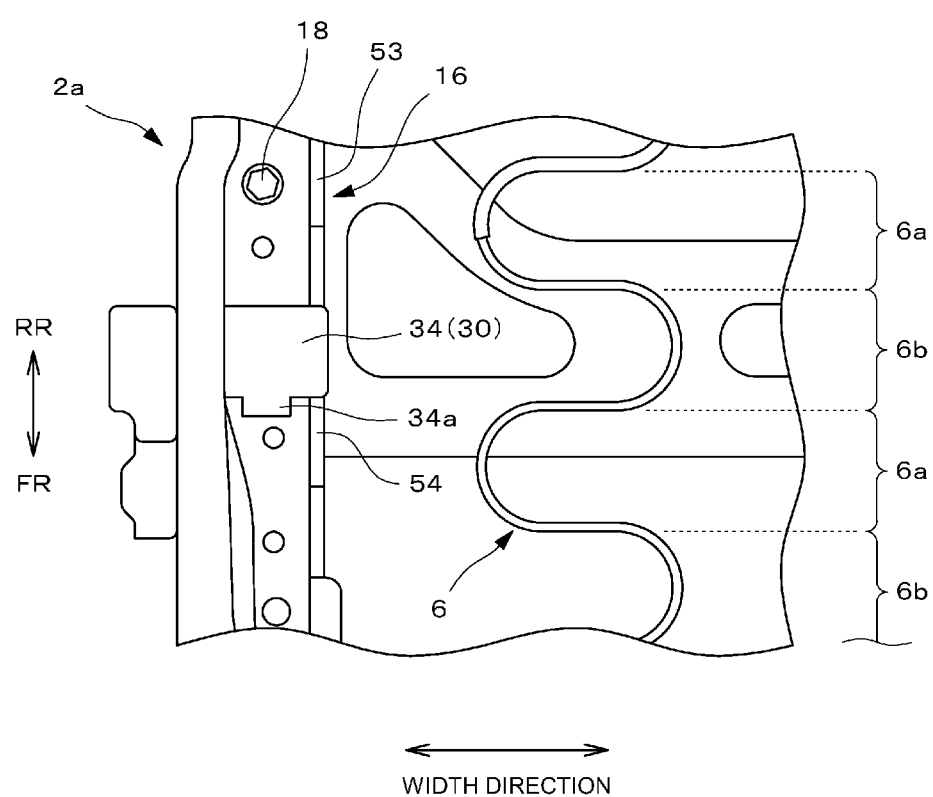
FIG. 14 is a diagram illustrating a positional relation between the load measurement sensor and an S-spring.
Figure 15:
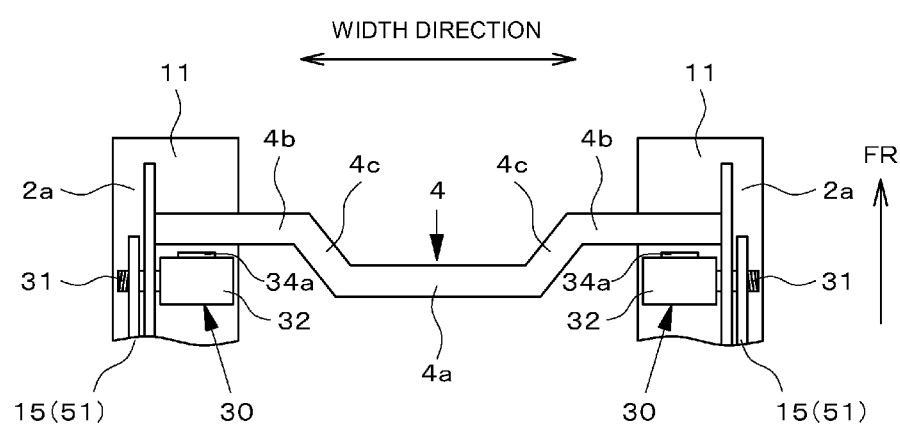
FIG. 15 is a diagram illustrating a positional relation between the load measurement sensor and a submarine restraining pipe.

Further, the sensor body 32 is equipped with the substrate unit 34, and the substrate unit 34 includes a substrate which outputs an electric signal indicating the measurement result of the load obtained by the sensor 30. Further, as illustrated in FIGS. 14 and 15, the substrate unit 34 is provided with a connector portion 34*a* which is connected to a receiver (not illustrated) which receives the electric signal output from the substrate.

In addition, the sensor body 32 includes a component which is a portion (hereinafter, an accommodation shaft portion 36) that is accommodated inside the outer cylindrical body in the shaft body 33 provided with the extension shaft portion 31. The accommodation shaft portion 36 includes, as illustrated in FIG. 5, an even diameter portion 36*a* which is adjacent to the positioning portion 35 in the axial direction of the shaft body 33 and an uneven diameter portion 36*b* which decreases in diameter compared to the even diameter portion 36*a*. Furthermore, the outer diameter of the even diameter portion 36*a* is the largest in the accommodation shaft portion 36, and is slightly smaller than the inner diameter of the annular portion serving as the load detection portion 37. With regard to the outer diameter of the uneven diameter portion

36*d*, the diameter of the end on the side of the even diameter portion 36*a* in the axial direction of the shaft body 33 is equal to that of the even diameter portion 36*a*, and the diameter gradually decreases from the end to be a small diameter and is maintained at a uniform diameter.

The sensor 30 with the above-described configuration is, as illustrated in FIG. 5, supported so that the extension shaft portion 31 is positioned at the side portion of the sensor body 32, and more specifically, the extension shaft portion 31 follows the horizontal direction. Furthermore, in the state where the sensor 30 is supported at the predetermined position, the annular portion serving as the load detection portion 37 in the sensor 30 is fitted to a hole portion 21 which is formed in the side frame 2*a*.

Then, when the passenger sits on the vehicle seat Z, the load which is generated at this time is transmitted to the load detection portion 37 of the sensor body 32 through the side frame 2*a*. Specifically, the side frame 2*a* which is positioned at the outside of the annular portion in the radial direction of the extension shaft portion 31 presses the upper portion of the annular portion inward in the radial direction to transmit the load to the annular portion. Here, a region which is positioned at the upper portion of the outer peripheral surface of the annular portion in the circumferential direction corresponds to a load receiving surface 37*a*, and the sensor body 32 detects the load in a direction (specifically, the downward vertical direction) perpendicular to the load receiving surface 37*a*.

On the other hand, the side frame 2*a* presses the annular portion at the inner peripheral surface of the hole portion 21 to which the annular portion is fitted. That is, in the inner peripheral surface of the hole portion 21 provided in the side frame 2*a*, and more specifically, the inner peripheral surface, a region which is positioned at the upper portion in the circumferential direction corresponds to a pressing portion.

Furthermore, as illustrated in FIG. 5, the even diameter portion 36*a* of the accommodation shaft portion 36 having an outer diameter slightly smaller than the inner diameter of the annular portion is disposed at the inside of the annular portion in the radial direction. Accordingly, when the upper portion of the annular portion in the circumferential direction is curved inward in the radial direction by the load which is applied to the vehicle seat Z, the upper portion is curved in the range where the upper portion comes into contact with the even diameter portion 36*a*. In other words, the even diameter portion 36*a* regulates the curved amount so that the annular portion is not excessively curved by coming into contact with the annular portion which is curved by a predetermined amount. That is, in the embodiment, a region which comes into contact with the load detection portion 37 in the even diameter portion 36*a* corresponds to a regulation portion 36*c* which regulates the deformation amount in which the load detection portion 37 is deformed. Furthermore, a portion corresponding to the regulation portion 36*c* in the even diameter portion 36*a* is positioned at the center portion of the even diameter portion 36*a* in the axial direction of the extension shaft portion 31, and has a predetermined area in the axial direction.

Further, the regulation portion 36*c* in the even diameter portion 36*a* is disposed at a position along the load center point when the vehicle seat Z applies the load to the load detection portion 37 through the side frame 2*a* in the axial direction of the extension shaft portion 31. Here, the load center point indicates a point where the largest load concentrates in the sensor body 32 when the load generated from the vehicle seat Z is applied to the load detection portion 37 of the sensor body 32. In the case of the embodiment, the load center point is present inside the load receiving surface 37*a*, and particularly, is positioned at the center position of the load receiving surface 37*a* in the axial direction of the extension shaft portion 31.

When the regulation portion 36*c* is disposed at the above-described position, the regulation portion 36*c* receives the portion corresponding to the load center point in the annular portion serving as the load detection portion 37. As a result, the excessive deformation of the annular portion due to a biased load or the like is inhibited, so that the sensor 30 may stably measure the load.

Further, in the embodiment, as illustrated in FIG. 5, the length of the even diameter portion 36*a* in the axial direction of the extension shaft portion 31 is larger than the length of the inner peripheral surface of the hole portion 21 which is formed in the side frame 2*a* in the same direction, that is, the pressing portion. That is, the even diameter portion 36*a* is present in the range where the annular portion is pressed by the side frame 2*a* in the axial direction. Accordingly, the even diameter portion 36*a* receives the load detection portion 37 throughout the entire range of the pressure of the side frame 2*a*, so that the load may be further stably measured.

In addition, a region which is positioned at each of both sides of the axial center portion provided with the regulation portion 36*c* in the even diameter portion 36*a* is provided with foreign matter intrusion inhibiting portion 36*d* which inhibits foreign matter from intruding between the annular portion and the accommodation shaft portion 36. In this way, when the foreign matter intrusion inhibiting portion 36*d* is formed, foreign matter is inhibited from intruding between the annular portion and the even diameter portion 36*a*, thereby inhibiting degradation in load measurement precision due to the intrusion of the foreign matter.

Further, in the embodiment, the regulation portion 36*c* which regulates the excessive deformation of the annular portion and the foreign matter intrusion inhibiting portion 36*d* are provided in the same component among the components which form the sensor body 32. In this way, when the regulation portion 36*c* and the foreign matter intrusion inhibiting portion 36*d* are integrated as the same component, the number of components decreases compared to the case where the regulation portion 36*c* and the foreign matter intrusion inhibiting portion 36*d* are individually provided, so that the assembly operation or the like is further easily performed. Furthermore, from the viewpoint of further effectively inhibiting the intrusion of the foreign matter, it is more desirable to attach a seal member that is formed of a soft material that does not disturb the deformation of the annular portion to the outer peripheral surface of the axial center portion provided with the regulation portion 36*c* in the even diameter portion 36*a*.

Figure 23:
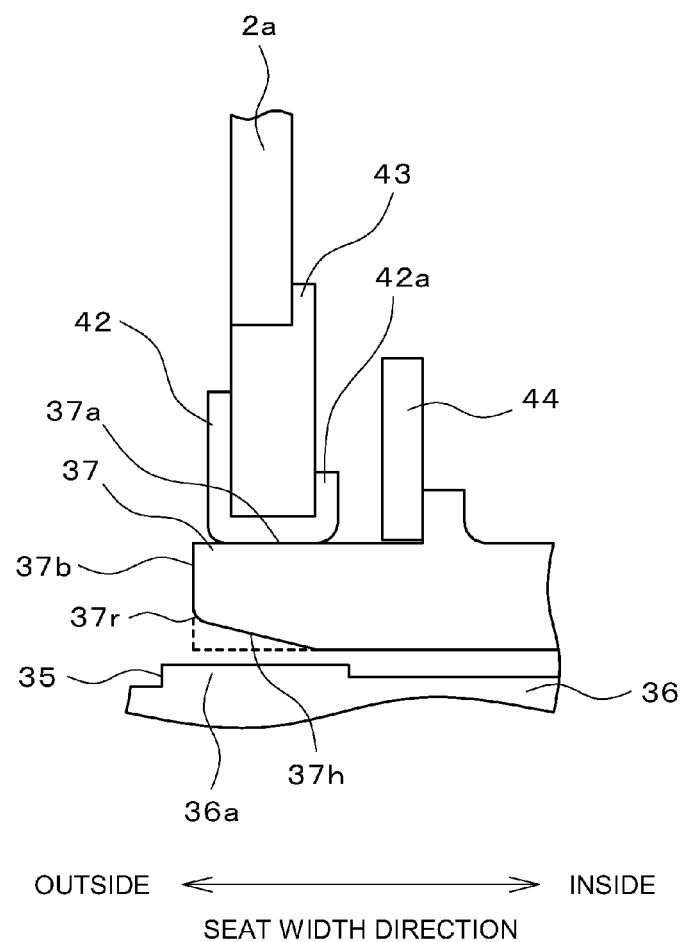
FIG. 23 is a diagram illustrating an inclined surface of a load detection portion.

Furthermore, as a modified example of the sensor body 32, the position in which the inner peripheral surface of the annular portion serving as the load detection portion 37 is deformed by the load applied thereto through a sliding member 42 to come into contact with the even diameter portion 36*a* may be formed, as illustrated in FIG. 23, as an inclined surface 37*h* which comes closer to the even diameter portion 36*a* as it moves from a free end 37*b* toward the side opposite to the free end 37*b* in the axial direction of the accommodation shaft portion 36. With such a configuration, it is possible to inhibit a biased load from being transmitted from the annular portion to the even diameter portion 36*a*.

Further, the inner end of the inclined surface 37*h* in the seat width direction is positioned outside of the width direction compared to the inner end surface of the sliding member 42 to be described below, and specifically, an inner end surface of a one end side flange portion 42*a* in the width direction. Further, the boundary line which connects the inclined surface 37h and the free end 37b is formed as an R-shaped portion 37r which is formed in a round shape. Accordingly, it is possible to inhibit a problem in which an inclined surface 37i comes into contact with the even diameter portion 36a so that the boundary line between the inclined surface 37i and the free end 37b is cut out whenever the load is applied thereto. By forming such an R-shaped portion 37r, the biased load may be further inhibited. Furthermore, instead of forming the R-shaped portion 37r, the boundary which connects the inclined surface 37h and the free end 37b may have a chamfered shape.

Figure 24:
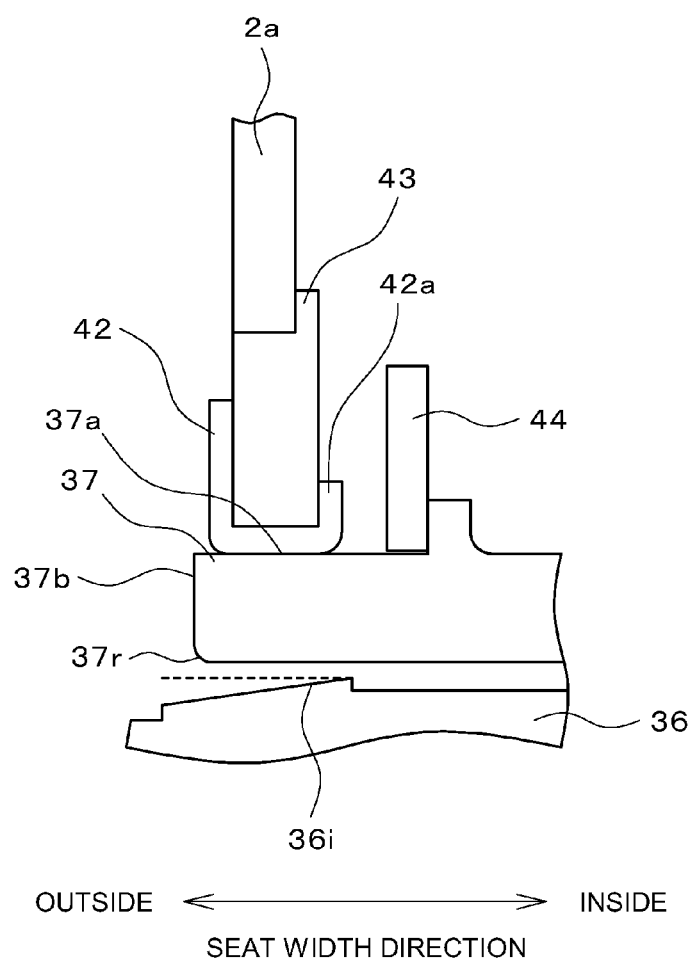
FIG. 24 is a diagram illustrating an inclined surface of an accommodation shaft portion.

In the example of FIG. 23, the inclined surface 37h is formed in the inner wall of the annular portion serving as the load detection portion 37, but as illustrated in FIG. 24, an inclined surface 36i may be formed in the even diameter portion 36a. Furthermore, the inclined surface 36i may be formed to be closer to the annular portion as it moves from the free end 37b toward the side opposite to the free end 37b in the axial direction of the accommodation shaft portion 36.

Here, the inner end of the inclined surface 36i in the width direction is positioned at the inside of the width direction compared to the inner end surface of the sliding member 42 to be described below in the width direction, and specifically, the inner end surface of the one end side flange portion 42a. Further, the boundary which connects the free end 37b and the surface of the load detection portion 37 facing the inclined surface 36i is formed as the R-shaped portion 37r which is formed in a round shape. Accordingly, it is possible to inhibit a problem in which the annular portion comes into contact with the inclined surface 36i and the boundary line between the surface of the annular portion facing the inclined surface 36i and the free end 37b is cut out whenever the load is applied to the annular portion. By forming such an R-shaped portion 37r, a biased load may be further inhibited. Furthermore, instead of forming the R-shaped portion 37r, the boundary which connects the surface of the load detection portion 37 facing the inclined surface 36i to the free end 37b may have a chamfered shape.

A surface contact holding mechanism is formed by at least one of the inclined surface 37h and the inclined surface 36i. Further, in the example of FIGS. 23 and 24, the surface contact holding mechanism which includes the inclined surface 37h is provided in the free end 37b. Furthermore, in the example of FIGS. 23 and 24, the inclined surface 37h or 36i is provided in one of the annular portion serving as the load detection portion 37 and the even diameter portion 36a, but both the annular portion and the even diameter portion 36a may be provided with the inclined surface 37h and 36i.

Then, the effect which is obtained from the surface contact holding mechanism which is formed by at least one of the inclined surface 37h and the inclined surface 36i, that is, the stable load receiving effect and the biased load inhibiting effect are exhibited not only in a case of a so-called both-end holding structure of fixing both ends of the sensor 30, but also a case of a cantilevered structure of fixing only one end of the sensor 30. Here, since the biased load is easily generated in the cantilevered structure, the stable load receiving effect and the biased load inhibiting effect are particularly noticeably exhibited by the surface contact holding mechanism.

Support Structure for Sensor

The sensor 30 is, as illustrated in FIG. 5, supported by each of the attachment brackets 15 and 16 while crossing the side frame 2a and each of the attachment brackets 15 and 16. Accordingly, the side frame 2a is connected to the attachment brackets 15 and 16, so that the vehicle seat Z is fixed onto the respective upper rails 12. Hereinafter, the support structure for the sensor 30 will be described. Furthermore, since the vehicle seat Z of the embodiment has a substantially bisymmetrical structure, hereinafter, only the configuration at one end side (left side) in the width direction of the vehicle seat Z will be described.

Further, in the following description, one lower rail 11 among the pair of lower rails 11 is referred to as a first rail member, and the other lower rail 11 is referred to as a second rail member. Here, the first rail member and the second rail member have a relative concept, and when one lower rail 11 is set as the first rail member, and the lower rail 11 which is one of the pair is set as the second rail member.

Further, for convenience of description, the position of the second rail member in the width direction when seen from the first rail member is referred to as the inside and the side opposite to the position of the second rail member when seen from the first rail member is referred to as the outside.

With the description of the support structure for the sensor 30, the structures of the side frame 2a and the attachment brackets 15 and 16 will be described by referring to FIGS. 6 to 8.

The side frame 2a will be described. The side frame 2a is formed by processing an elongated steel sheet, and the front end 20 thereof is curved inward to define the front end of the vehicle seat Z. Further, the circular hole portion 21 is provided in each of the position slightly in rear of the front end of the side frame 2a and the position near the device compared to the rear end to support the sensor 30. The annular portion serving as the load detection portion 37 provided in the sensor 30 is inserted through the hole portion 21. That is, in the embodiment, the side frame 2a corresponds to a hole portion forming member that has the hole portion 21 through which the annular portion is inserted.

Figure 10:
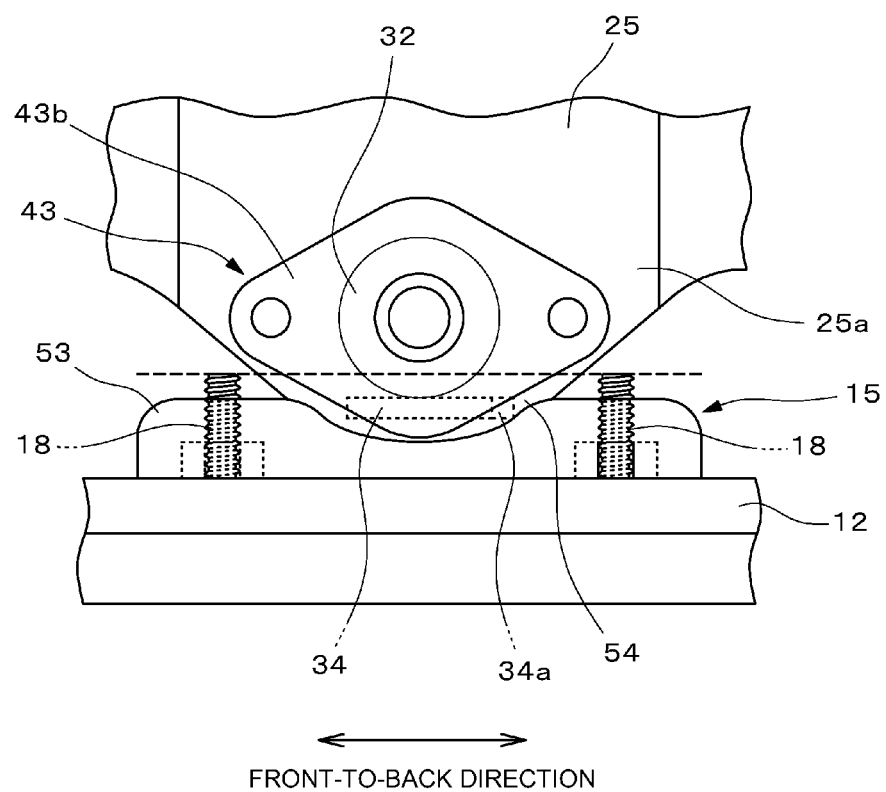
FIG. 10 is a side-view diagram when the load measurement sensor which is supported at a predetermined position is seen from the side thereof.

Furthermore, in the embodiment, as illustrated in FIG. 10, in order to widen the length of the portion of the side frame 2a through which the annular portion is inserted, a bush 43 is fitted into the hole portion 21.

Figure 6:
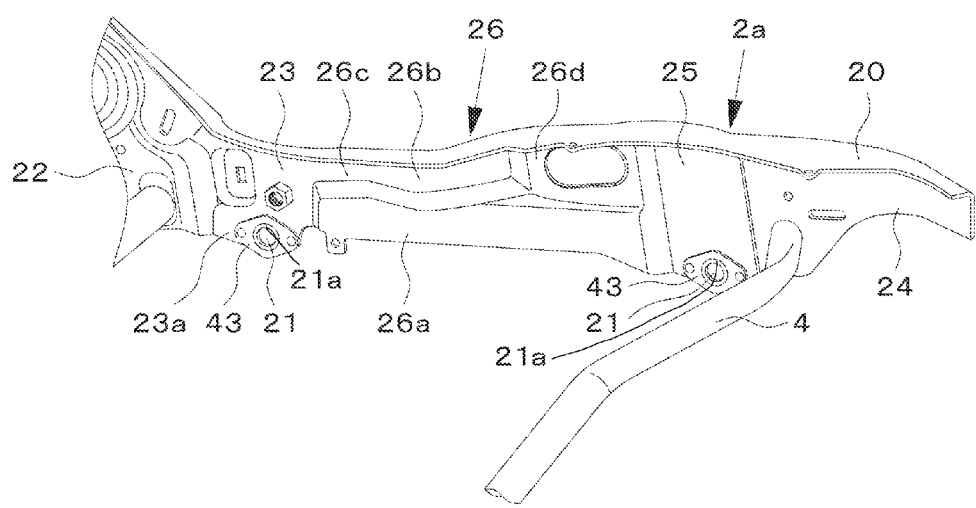
FIG. 6 is a perspective view illustrating an inner surface of a side frame.
Figure 7:
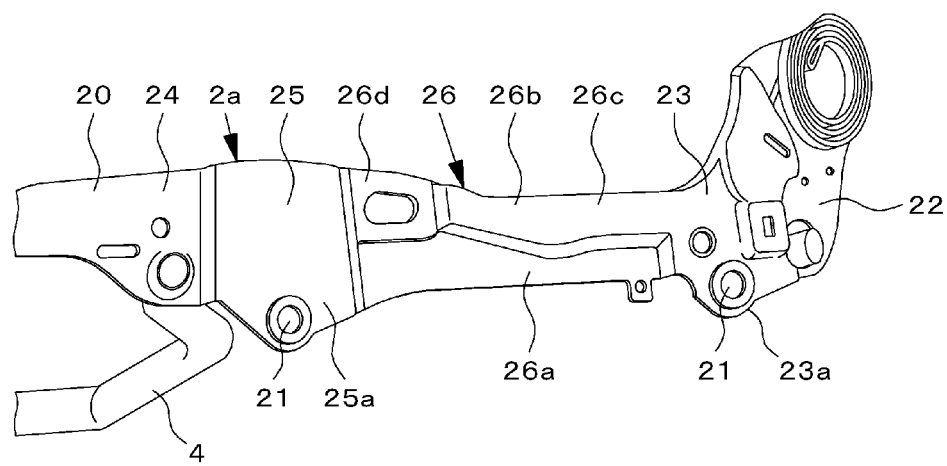
FIG. 7 is a perspective view illustrating an outer surface of the side frame.

Further, as illustrated in FIGS. 6 and 7, a predetermined region of the side frame 2a is depressed inward, and the outer region protrudes outward. Specifically, in the side frame 2a, the connection region 22 (that is, the rear end) which is connected to the seat back frame 1 is positioned at the innermost side in the side frame 2a. In other words, the connection region 22 is nearest the second rail member in the width direction. A region (hereinafter, a rear attachment region 23) which is positioned in front of the connection region 22 and corresponds to the protrusion portion provided with the rear hole portion 21 slightly protrudes outward compared to the connection region 22, and particularly, the portion which is positioned near the boundary with the connection region 22 further protrudes outward as illustrated in FIG. 7.

On the other hand, a region (hereinafter, a front attachment region 25) which is positioned in rear of a region (a front end region 24) corresponding to the front end of the side frame 2a and corresponds to the protrusion portion provided with the front hole portion 21 is positioned at the outside compared to the front end region 24. Further, the front attachment region 25 is positioned at the outside compared to the connection region 22 which is positioned at the innermost side in the side frame 2a.

With regard to a region (an intermediate region 26) which is positioned between the front attachment region 25 and the rear attachment region 23 in the front-to-back direction in the side frame 2a, a lower portion 26a is depressed inward. On the other hand, a rear adjacent portion 26c which is adjacent to the rear attachment region 23 in the upper portion 26b of the intermediate region 26 protrudes outward by the same extent as that of the rear attachment region 23, and a front adjacent portion 26d which is adjacent to the front attachment region 25 is slightly depressed inward compared to the front attachment region 25.

As described above, in the embodiment, when the outer surface of the connection region 22 in the side frame 2a is set as a reference surface, the rear attachment region 23 and the front attachment region 25 provided with the hole portion 21, that is, the region supporting the sensor 30, protrudes outward compared to the reference surface.

Furthermore, in the embodiment, a part (for example, the rear adjacent portion 26c of the intermediate region 26) of the region other than the rear attachment region 23 and the front attachment region 25 provided with the hole portion 21 protrudes outward compared to the reference surface, but the invention is not limited thereto. Only the region provided with the hole portion 21, that is, the region supporting the sensor 30 may protrude outward compared to the reference surface.

Further, as illustrated in FIG. 7, the lower portion of the rear attachment region 23 is provided with a protrusion portion 23a which protrudes in an inverse triangular shape. Similarly, the lower portion of the front attachment region 25 is also provided with a protrusion portion 25a which protrudes in an inverse triangular shape. That is, with regard to the rear attachment region 23 and the front attachment region 25 in the side frame 2a, the vertical length thereof becomes longer than that of the other region by the amount of the protrusion portions 23a and 25a. Then, the protrusion portions 23a and 25a are provided with the hole portion 21.

Next, the attachment brackets 15 and 16 will be described. The attachment brackets 15 and 16 are members which are formed separately from the upper rail 12, and the attachment brackets extend along the front-to-back direction of the vehicle seat Z and are fixed onto the upper surface of the upper rail 12 by the bolt 18 which is an example of the fastening member. In the embodiment, the plurality of attachment brackets 15 and 16 is attached in the front-to-back direction of the vehicle seat Z, and the sensor 30 is supported by each of the attachment brackets 15 and 16. Particularly, in the embodiment illustrated in the specification, the sensor 30 is provided at each of the front side and the rear side of the upper rail 12 to be positioned at each of one end side and the other end side of the width direction.

Then, each of the attachment brackets 15 and 16 and the structure for supporting the load measurement sensor to each of the attachment brackets 15 and 16 are provided for each sensor 30. Specifically, the attachment bracket 15 is provided for the front sensor 30, and the attachment bracket 16 is provided for the rear sensor 30.

The attachment bracket 15 for the front sensor 30 and the attachment bracket 30 for the rear sensor 30 have different lengths in the length direction of the upper rail 12, but have substantially the same basic structure. Accordingly, hereinafter, the structure of the attachment bracket 15 of the front sensor 30 will be described.

Figure 8:
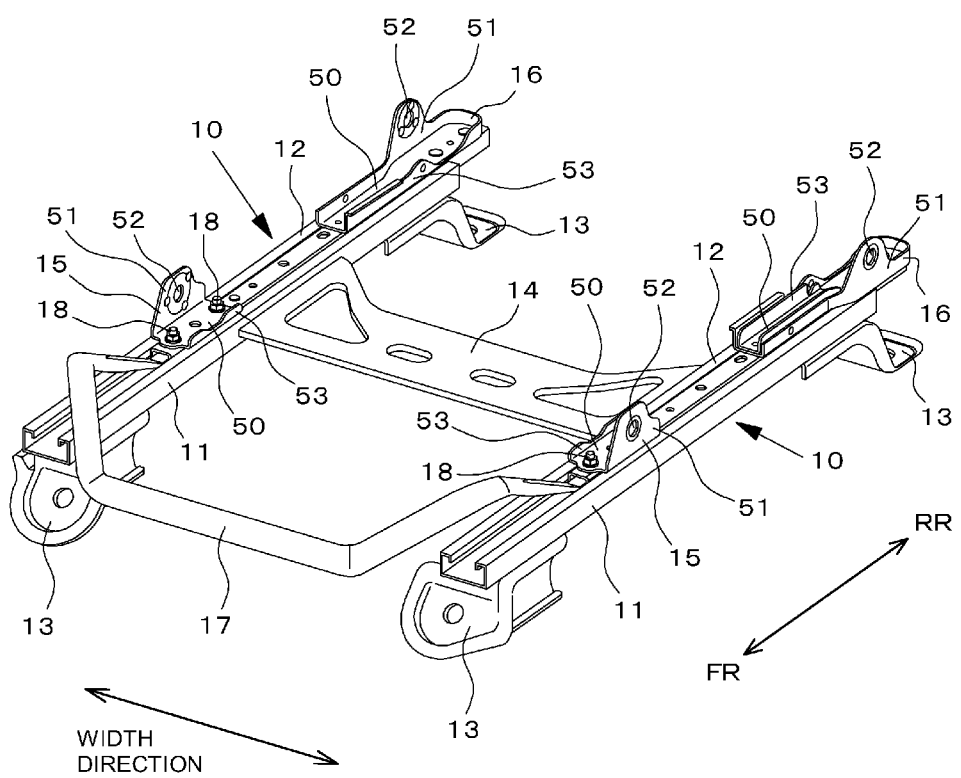
FIG. 8 is a perspective view illustrating a rail mechanism.

As illustrated in FIG. 8, the attachment bracket 15 is formed in a substantially U-shape when seen from the front side in the front-to-back direction of the vehicle seat Z, and is fixed onto the upper surface of the upper rail 12 so that the transverse center overlaps the transverse center of the upper rail 12. Furthermore, as described above, the attachment bracket 15 is fixed onto the upper surface of the upper rail 12 by the bolt 18.

Here, a bolt hole (not illustrated) is formed in a bottom wall portion 50 of the attachment bracket 15 to insert the bolt 18 therethrough. The bolt hole is formed as an elongated hole along the front-to-back direction of the vehicle seat Z. For this reason, when fixing the attachment bracket 15 onto the upper rail 12, the bolt 18 is inserted into the bolt hole and is temporarily assembled to the nut, thereby adjusting the position of the attachment bracket 15 with respect to the upper rail 12. Therefore, in the embodiment, the position in which the attachment bracket 15 is fixed to the upper rail 12 serving as the rail member may be adjusted along the length direction of the upper rail 12. Accordingly, the position of fixing the attachment bracket 15 may be easily adjusted with high precision.

Furthermore, the bolt hole is not limited to the elongated hole along the length direction of the upper rail 12. For example, the bolt hole may have a size in which the position of fixing the attachment bracket 15 may be adjusted. In such a size, a true circular hole may be used.

Figure 9:
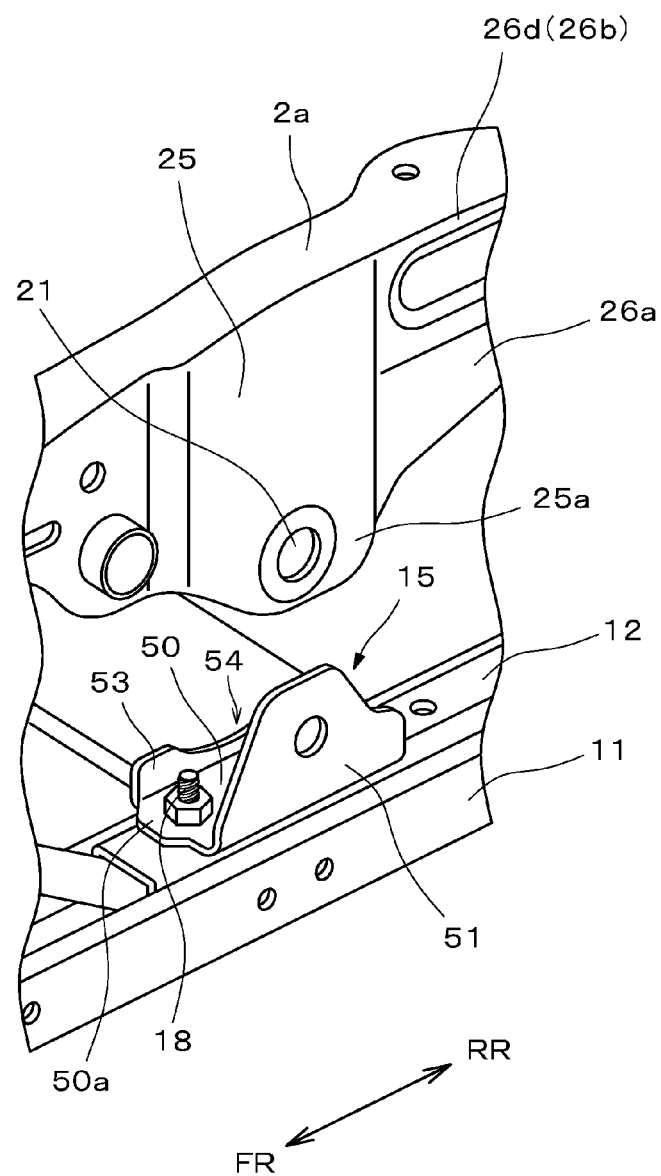
FIG. 9 is a perspective diagram illustrating a state where an attachment bracket and a side frame are connected to each other.

Further, the bottom wall portion 50 includes, as illustrated in FIG. 9, an extension portion 50a which extends along the front-to-back direction from the end in the front-to-back direction of the vehicle seat Z. The extension portion 50a is provided to extend forward or backward from at least an end of an upright wall portion 51 in the front-to-back direction. Then, the bolt 18 is disposed near the extension portion 50a. More specifically, the bolt 18 is disposed at a position adjacent to the extension portion 50a in the front-to-back direction. Accordingly, since the bolt 18 is rigidly attached, the attachment bracket 15 may be rigidly attached to the upper rail 12.

The attachment bracket 15 includes the upright wall portion 51 which is perpendicularly formed upright from the outer end of the bottom wall portion 50 in the width direction. The upright wall portion 51 is formed in a substantially triangular shape, and is formed from the front end of the bottom wall portion 50 to the rear end thereof. Further, the portion which corresponds to the apex in the substantially triangular upright wall portion 51 includes, as illustrated in FIG. 8, an insertion hole 52 through which the extension shaft portion 31 is inserted when supporting the sensor 30. The insertion hole 52 is a penetration hole which is formed along the thickness direction of the attachment bracket 15. For this reason, it is possible to check the state where the sensor 30 is supported, and particularly, the state where the sensor 30 is positioned in the width direction of the vehicle seat Z through an insertion hole 52.

In addition, the attachment bracket 15 includes an upward protrusion wall 53 which protrudes upward from the inner end of the bottom wall portion 50 in the width direction. Since the upward protrusion wall 53 is provided in the attachment bracket 15, the rigidity of the attachment bracket 15 is improved. As a result, the support rigidity (the rigidity of the portion supporting the sensor 30) of the sensor 30 is increased, so that the load measurement precision using the sensor 30 may be improved. Furthermore, the upward protrusion wall 53 is not limited to be substantially perpendicular to the bottom wall portion 50. For example, the upward protrusion wall 53 may protrude to intersect the bottom wall portion 50 at an angle forming an obtuse angle with respect thereto.

The upward protrusion wall 53 extends from the front end of the bottom wall portion 50 toward the rear end thereof in the front-to-back direction of the vehicle seat Z, and the upper portion of the portion which is positioned at the same position as that of the insertion hole 52 in the front-to-back direction is removed by notching. In this way, the upward protrusion wall 53 includes a removed portion 54 which is formed at the same position as that of the insertion hole 52 in the front-to-back direction.

The side frame 2a and each of the attachment brackets 15 and 16 which are described above so far are connected to each other by the sensor 30. Specifically, as illustrated in FIG. 9, the vehicle seat Z is placed on the upper rail 12 so that the side frame 2a is positioned at the inside of the upright wall portion 51 of each of the attachment brackets 15 and 16. At this time, the insertion hole 52 which is formed in each of the attachment brackets 15 and 16 overlaps the hole portion 21 formed in the side frame 2a.

In the state where the insertion hole 52 and the hole portion 21 overlap with each other, the sensor 30 is inserted into two holes from the extension shaft portion 31. Here, when the sensor 30 is inserted until the positioning portion 35 of the sensor 30 comes into contact with the inner surface of the upright wall portion 51 of each of the attachment brackets 15 and 16, the sensor 30 is positioned in the width direction.

At the time point at which the sensor 30 is positioned, the annular portion which is provided as the load detection portion 37 in the sensor 30 is fitted to the hole portion 21 of the side frame 2a. Further, the male screw portion 31a of the extension shaft portion 31 protrudes outward compared to the outer surface of the upright wall portion 51 of each of the attachment brackets 15 and 16, and the adjacent portion 31b is fitted to the insertion hole 52 of each of the attachment brackets 15 and 16.

Subsequently, when a nut 39 is threaded into the male screw portion 31a which protrudes from the outer surface of the upright wall portion 51, the sensor 30 is supported at a predetermined position. In such a state, the sensor 30 takes a posture in which the axial direction of the extension shaft portion 31 follows the horizontal direction. That is, in the embodiment, the sensor 30 is supported in a cantilevered state while taking a posture in which the extension shaft portion 31 follows the horizontal direction. In the case where the sensor 30 is supported in the cantilevered state, the support operation may be easily performed with a decrease in the number of the fastening positions compared to the case where the sensor 30 is supported in a both-end support state. Furthermore, in the embodiment, a configuration is illustrated in which the sensor 30 is supported in the cantilevered state, but may be supported in a both-end support state in which both ends thereof the axial direction are supported.

On the other hand, in the case where the sensor 30 is supported in the cantilevered state, there is a need to stabilize the position (arrangement position) of the sensor 30 for the satisfactory measurement of the sensor 30 and hence the position of the sensor 30 is stabilized. For this reason, a member (specifically, the attachment brackets 15 and 16) which supports the sensor 30 needs to have sufficient support rigidity. In the embodiment, as described above, the rigidity of the attachment brackets 15 and 16 is increased by providing the upward protrusion wall 53, so that the sensor 30 may be stably supported.

Furthermore, in the embodiment, the insertion hole 52 is provided at a position deviated from the maximum load position where the largest load is applied in the axial direction of the extension shaft portion 31. Here, the maximum load position is a position which corresponds to the load center point. Accordingly, the sensor 30 is stably supported by each of the attachment brackets 15 and 16. Specifically, each of the attachment brackets 15 and 16 which support the sensor 30 and the side frame 2a to which the load is input are disposed at positions that deviate from each other in the axial direction of the extension shaft portion 31 (the width direction). In this way, since the position of supporting the sensor 30 deviates from the maximum load position, the position is not affected by the load, so that the sensor 30 may be stably supported.

When the passenger sits on the vehicle seat Z in the state where the sensor 30 is supported at the above-described position, the load is applied to the annular portion serving as the load detection portion 37 through the side frame 2a. Specifically, the load which is generated when the passenger sits on the vehicle seat Z is a load which is directed downward in the vertical direction, and when the load is generated, the side frame 2a presses the annular portion inserted into the hole portion 21 against the inner peripheral surface of the hole portion 21. Accordingly, the annular portion is deformed to be curved inward in the radial direction of the extension shaft portion 31, so that the load is detected and the magnitude thereof is measured.

As described above, when the sensor 30 is supported at the above-described position in a posture in which the extension shaft portion 31 follows the horizontal direction, the load may be measured by the sensor 30. In other words, the position of supporting the sensor 30 is a position where the load may be measured by the sensor 30, and specifically, the position of the sensor 30 illustrated in FIG. 5. Furthermore, the support position of the embodiment is positioned above the first rail member (that is, the nearer lower rail 11 when seen from the sensor 30).

The support structure for the sensor 30 will be further described. Each of the attachment brackets 15 and 16 is provided with the upward protrusion wall 53 which is provided at the inner end in the width direction, and the upward protrusion wall 53 is provided with the removed portion 54 which is formed at the same position as that of the insertion hole 52 in the front-to-back direction of the vehicle seat Z. Then, in the embodiment, as illustrated in FIG. 10, the position of supporting the sensor 30 is equal to the position of forming the removed portion 54. With this configuration, the sensor 30 may be easily supported.

More specifically, the sensor 30 is inserted into the insertion hole 52 and the hole portion 21 which overlap with each other from the inside of the attachment brackets 15 and 16, and more specifically, the installation side of the upward protrusion wall 53. On the other hand, the removed portion 54 is provided at the same position as that of the sensor 30 in the front-to-back direction. Here, the removed portion 54 is a portion which is formed by removing a part of the upward protrusion wall 53 to expose the sensor 30 to the inner space compared to the upward protrusion wall 53. The sensor 30 approaches the hole portion 21 of the side frame 2a through the removed portion 54. That is, since the upward protrusion wall 53 is not present in the path where the sensor 30 is moved from the inside of the upward protrusion wall 53 toward the support position, the sensor 30 may be smoothly moved to the support position.

Furthermore, in the embodiment, the removed portion 54 is formed by notching the upper portion of the portion which is present at the same position as that of the insertion hole 52 in the front-to-back direction of the vehicle seat Z in the upward protrusion wall 53. Here, the invention is not limited thereto. For example, a penetration hole (not illustrated) having a size sufficient for the passage of the sensor 30 when the sensor 30 moves toward the support position may be formed in the upward protrusion wall 53.

Further, the setting position of the bolt 18 which fixes each of the attachment brackets 15 and 16 to the upper surface of the upper rail 12 deviates from the removed portion 54 in the front-to-back direction. Accordingly, the interference between the sensor 30 (precisely, the sensor body 32) and the bolt 18 is inhibited, so that the position of supporting the sensor 30 may be further shifted to the lower side.

In addition, when the sensor 30 is supported at the above-described support position, the lower surface of the sensor 30 is, as illustrated in FIG. 10, positioned below the upper surface (indicated by the dashed line in FIG. 10) of the bolt 18 which is set to the upper surface of the first rail member. Accordingly, the space for supporting the sensor 30 may be further compact in size.

Further, in the embodiment, when the insertion hole 52 formed in each of the attachment brackets 15 and 16 and the hole portion 21 formed in the side frame 2a overlap with each other, as illustrated in FIG. 9, the substantially triangular upright wall portion 51 provided with the insertion hole 52 may overlap each of the substantially inverse triangular protrusion portions 23a and 25a provided with the hole portion 21. As a result, it is easy to ensure the space around the bolt 18 set before and behind the sensor 30, and hence the workability is improved. In addition, since the upright wall portion 51 is formed in a substantially triangular shape and each of the protrusion portions 23a and 25a is formed in a substantially inverse triangular shape, when the periphery of each bonding portion (specifically, the portion of forming the insertion hole 52 or the hole portion 21) is notched, a further decrease in weight may be attained and the sensor support state may be easily seen.

Furthermore, as described above, the upward protrusion wall 53 of each of the attachment brackets 15 and 16 is provided with a notch serving as the removed portion 54 formed at the same position as that of the sensor 30 in the front-to-back direction of the vehicle seat Z. As a result, the upright wall portions 51 of each of the attachment brackets 15 and 16 may easily overlap the protrusion portions 23a and 25a of the side frame 2a. That is, when the removed portion 54 is formed by notching the upward protrusion wall 53, the sensor 30 may be easily supported and the vehicle seat Z may be easily assembled to the rail mechanism 10.

Sensor Attachment Component

In the state where the sensor 30 is supported at the support position, as illustrated in FIG. 5, the sensor attachment components 40 are provided around the sensor body 32, and particularly, the annular portion serving as the load detection portion 37. The sensor attachment components 40 are components which dispose the sensor 30 at the above-described support position to satisfactorily measure the load. Hereinafter, the respective sensor attachment components 40 will be described by referring to FIGS. 11 to 13.

Figure 12:
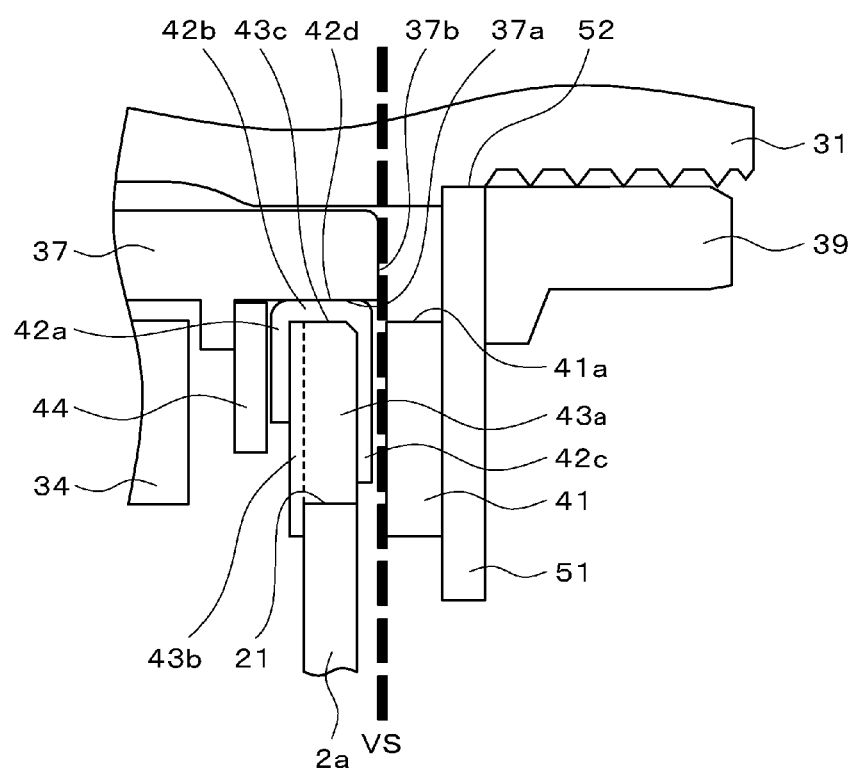
FIG. 12 is an enlarged cross-section diagram illustrating the periphery of the load measurement sensor.

As for the sensor attachment components 40, as illustrated in FIG. 12, a spacer 41, the sliding member 42 serving as the contact portion or the load input member, the bush 43 serving as the load transmission portion or the load transmission member, and the washer 44 serving as the movement regulation member are sequentially arranged from the outside in the width direction of the vehicle seat Z. In the embodiment, among the sensor attachment components 40, the bush 43 is attached to the side frame 2a, and the sliding member 42 is also attached to the side frame 2a through the bush 43.

The bush 43 is a component which is provided to transmit the load generated from the vehicle seat Z to the sensor 30, and is made of a hot-rolled steel sheet (SPHC). More specifically, the bush 43 constitutes a load transmission portion which receives the load applied to the vehicle seat Z from the side frame 2a and transmits the load to the sliding member 42 to be described below.

Figure 11:
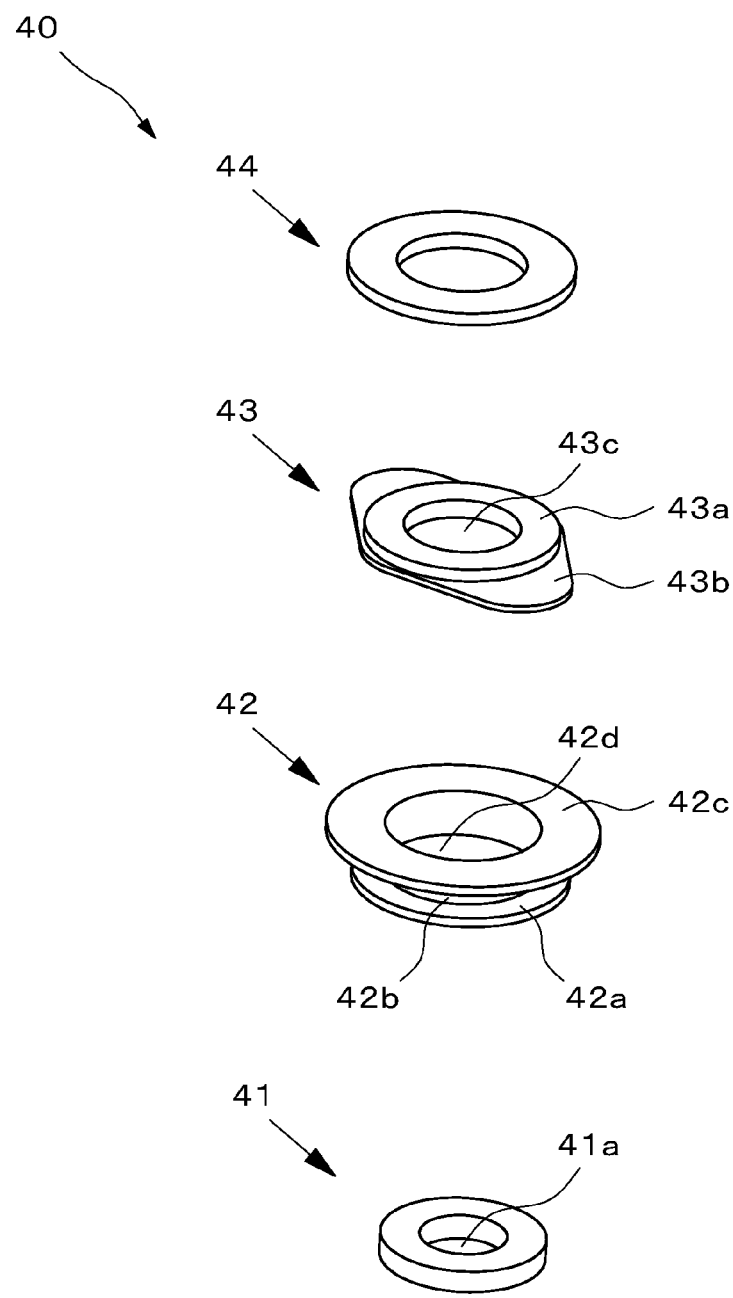
FIG. 11 is an exploded perspective component diagram illustrating respective sensor attachment components.

The bush 43 has, as illustrated in FIG. 11, a structure in which a cylindrical portion 43a and a substantially rhombic flange portion 43b are adjacent to each other in the thickness direction. Furthermore, in FIG. 12, in order to describe the cylindrical portion 43a and the flange portion 43b, the bush 43 is indicated by the divided dashed line. That is, as for the bush 43, the flange portion 43b extends from one end side of the cylindrical portion 43a in the axial direction outward in the radial direction. At the center position of the bush 43, a penetration hole 43c is formed to penetrate both the cylindrical portion 43a and the flange portion 43b. The diameter of the penetration hole 43c is slightly larger than the outer diameter of the annular portion serving as the load detection portion 37 of the sensor 30. With regard to the cylindrical portion 43a, the thickness is substantially equal to the thickness of the rear attachment region 23 of the side frame 2a or the thickness of the front attachment region 25, and the outer diameter is substantially equal to the diameter of the hole portion 21.

Further, the thickness of the flange portion 43b is formed to be smaller than the width (more specifically, the width enlarged outward in the seat width compared to the connection region 22) in which the front attachment region 25 (or the rear attachment region 23) provided in the side frame 2a protrudes in the seat width direction. In addition, the outer diameter of the flange portion 43b is formed in a size in which the outer diameter is included in the range of the front attachment region 25 (or the rear attachment region 23) in the front-to-back direction when seen from the side portion of the vehicle seat Z. With such a configuration, when attaching the bush 43 to the side frame 2a, the flange portion 43b of the bush 43 is disposed inside the enlarged portion (in other words, the portion recessed inward in the width direction) of the front attachment region 25 (or the rear attachment region 23). For this reason, there is no need to increase the entire seat width in order to attach the bush 43, so that the bush 43 may be compactly attached.

The above-described configuration will be described again from the side frame 2a. As illustrated in FIG. 12, the bush 43 is attached to the side frame 2a so that the flange portion 43b is positioned inside the width direction compared to the cylindrical portion 43a. As a result, since the side frame 2a is disposed at the outside in the width direction by the thickness of the flange portion 43b, it is easy to ensure a space for attaching a member (for example, a safety belt or the like) other than the member disposed at the inside of the side frame 2a in the width direction.

Furthermore, in FIG. 12, a configuration in which the flange portion 43b is disposed at the inside of the seat width direction compared to the cylindrical portion 43a is described by referring to the drawing, but the positional relation between the cylindrical portion 43a and the flange portion 43b may be reversed. With such a configuration, since the side frame 2a is disposed at the inside of the seat width direction by the thickness of the flange portion 43b, it is easy to ensure a space for attaching the other member disposed at the outside of the side frame 2a in the seat width direction. Accordingly, the interference between the other member and the seat frame may be inhibited, so that the load detection precision may be improved.

With regard to the bush 43 having the above-described shape, the flange portion 43b is bonded to the side frame 2a by projection welding in the state where the cylindrical portion 43a is fitted to the hole portion 21 of the side frame 2a. Since the flange portion 43b is fixed to the side frame 2a by welding, the bush 43 may be attached to the side frame 2a without providing a particular member. Accordingly, for example, compared to the case where the bush 43 is fixed by the bolt or the like, the structure around the bush 43 does not increase in size.

Then, when the sensor 30 is inserted into the penetration hole 43c of the bush 43 attached to the side frame 2a, the bush 43 is positioned at the outside in the radial direction of the annular portion which is provided as the load detection portion 37 in the sensor 30. In such a state, the bush 43 is disposed at a position in which the side frame 2a presses the annular portion. That is, the pressing area when the side frame 2a presses the annular portion increases by the amount corresponding to the thickness of the flange portion 43b of the bush 43. In this way, the bush 43 serves as a load transmission member that widens the pressing area when the side frame 2a presses the annular portion.

More specifically, the end of the bush 43 which is positioned near the sensor body 32 in the load transmission direction, that is, the portion which forms the penetration hole 43c is formed to have a longer length in the axial direction of the extension shaft portion 31 than that of the end which is positioned at the opposite side in the load transmission direction, that is, the outer peripheral end of the cylindrical portion 43a of the bush 43. That is, the end near the sensor body 32 in the load transmission portion according to the embodiment is provided with a wide portion of which the width in the axial direction is large. Then, the plate thickness of the wide portion is larger than the plate thickness of the side frame 2a in the width direction.

With the above-described configuration, the bush 43 which constitutes the load transmission portion is interposed between the regulation portion 36c formed in the even diameter portion 36a and the inner peripheral surface of the hole portion 21 of the side frame 2a corresponding to the pressing portion in the radial direction of the extension shaft portion 31, and accomplishes a function of widening the pressing area in which the load is transmitted to the sensor body 32. As a result, the load may be stably transmitted to the sensor 30. Accordingly, the load detection precision may be further improved.

Figure 13:
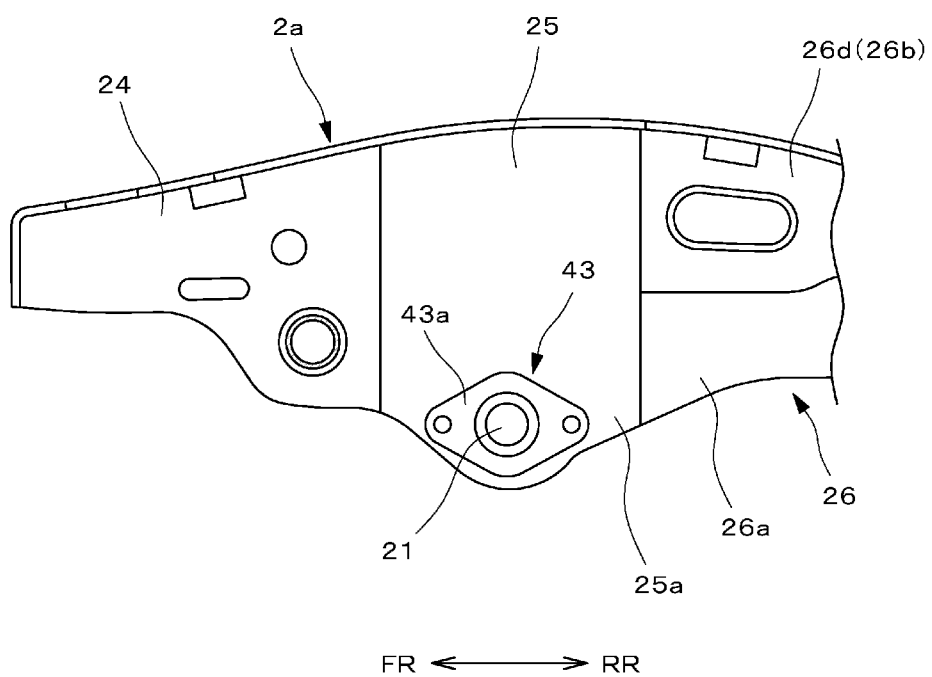
FIG. 13 is an enlarged diagram illustrating the periphery of a hole portion of the side frame.

Furthermore, in the embodiment, as illustrated in FIG. 13, the bush 43 is bonded to the side frame 2a so that the length direction of the flange portion 43b serving as the extension portion extending from the cylindrical portion 43a follows the length direction of the side frame 2a. Accordingly, compared to the case where the bush 43 is bonded to the side frame 2a so that the length direction of the flange portion 43b is perpendicular to the length direction of the side frame 2a, an increase in the space for bonding the bush 43, and specifically, the heights of the protrusion portions 23a and 25a may be inhibited. As a result, an increase in size of the bush 43 in the height direction is inhibited, and hence when supporting the sensor 30, the sensor 30 may be supported at the minimum height.

Further, as illustrated in FIG. 12, the length of the bush 43 in the axial direction of the extension shaft portion 31 is shorter than the length of the regulation portion 36c formed in the even diameter portion 36a in the axial direction. That is, both ends of the bush 43 in the axial direction are provided to be positioned at the inside of both ends of the regulation portion 36c in the axial direction. With the above-described configuration, even when the pressing range of the side frame 2a is widened by the bush 43, the regulation portion 36c receives the annular portion serving as the load detection portion 37 throughout the entire pressing range. Accordingly, the load may be further stably measured while obtaining an effect of the bush 43.

Further, at least a part of the flange portion 43b is positioned below the upper end surface (indicated by the dashed line in FIG. 10) of the bolt 18 which fixes the attachment brackets 15 and 16 to the upper surface of the upper rail 12. Accordingly, an increase in size of the bush 43 in the height direction is inhibited, so that the space for supporting the sensor 30 may be further compact in size.

Further, as illustrated in FIG. 5, the bush 43 and the side frame 2a are fixed only by a welded portion 43d at the upper end of the surface where the flange portion 43b and the side frame 2a come into contact with each other. Accordingly, the side frame 2a is fixed to the bush 43 at the welded portion 43d in the upper end of the surface where the side frame 2a comes into contact with the flange portion 43b. On the other hand, the side opposite to the flange portion 43b is formed as a deformation following portion 43e in which the matching surface of the hole portion 21 of the side frame 2a is not fixed to the outer peripheral surface of the cylindrical portion 43a. In the deformation following portion 43e, the matching surface of the hole portion 21 of the side frame 2a is movable to come into contact with and separate from the outer peripheral surface of the cylindrical portion 43a. When the load is input from the seat Z, the load detection portion 37 may be deformed by the deformation following portion 43e. Accordingly, the deformation following portion 43e is deformed based on the deformation of the load detection portion 37 when the load is input thereto, so that the load may be further stably received and the biased load may be inhibited.

Figure 19:
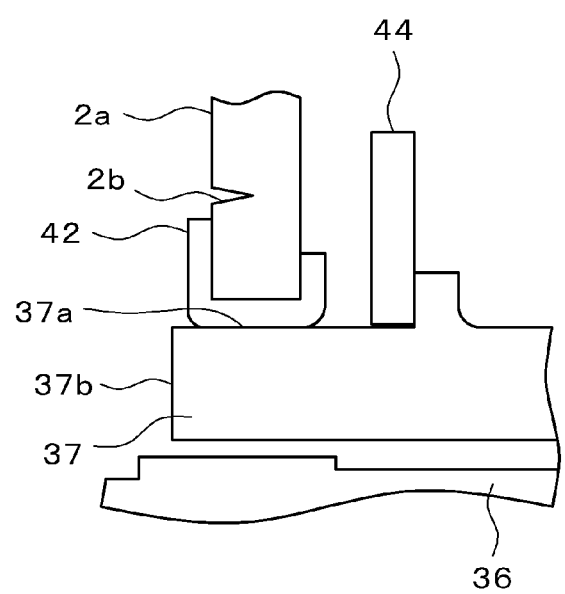
FIG. 19 is a diagram illustrating the other embodiment of a deformation following portion.

Furthermore, in the embodiment, the matching surface of the side frame 2a with respect to the cylindrical portion 43a is formed as the deformation following portion 43e, but the invention is not limited thereto. As illustrated in FIG. 19, the bush 43 may not be provided, and the surface of the side frame 2a near the free end 37b may be provided with a notch so that the notch is used as a deformation following portion 2b. The deformation following portion 2b illustrated in FIG. 19 is formed as a notch which is horizontally formed in the surface of the side frame 2a near the free end 37b to be perpendicular to the load application direction. The deformation following portion 2b is formed above the upper end of the sliding member 42 to be described below.

Then, in the deformation following portion 2b which is formed as the notch, when the load is input from the seat Z, the surface of the side frame 2a near the free end 37b may be deformed in the vertical direction. Accordingly, the deformation following portion 2b is deformed based on the deformation of the load detection portion 37 when the load is input to the load detection portion, so that the load may be further stably received, and the biased load may be inhibited.

Figure 25:
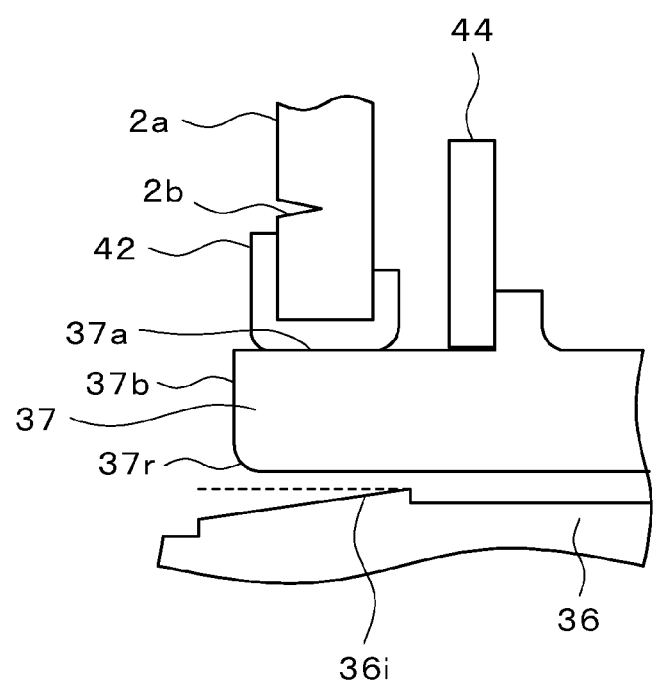
FIG. 25 is a diagram illustrating the other embodiment of the deformation following portion.

Further, in a configuration in which a surface contact holding mechanism including at least one of the inclined surfaces 37h and 36i illustrated in FIG. 23 or 24 is provided, as illustrated in FIG. 25, the deformation following portion 2b which is formed by the notch may be provided. In addition, although it is not illustrated in the drawings, it is certain that the surface contact holding mechanism including at least one of the inclined surface 37h and the inclined surface 36i illustrated in FIG. 5 or FIG. 23 or 24 may be provided.

The biased load inhibiting effect using the deformation following portion 43e or 2b is exhibited in both the case of the both-end support structure for supporting both ends of the sensor 30 and the case of the cantilevered support structure for supporting only one end of the sensor 30. However, in the case of the both-end support structure, since the biased load is easily generated, the biased load inhibiting effect using the deformation following portion 43e or 2b is particularly noticeably exhibited.

The sliding member 42 is provided to transmit the load applied to the vehicle seat Z to the sensor 30 by coming into contact with the sensor 30. When the load is input from the side frame 2a, the sliding member 42 directly comes into contact with the sensor 30 and relays the transmission of the load from the side frame 2a to the sensor 30. In addition, the sliding member 42 slides on the annular portion along the axial direction of the extension shaft portion 31 with the deformation of the annular portion when the annular portion serving as the load detection portion 37 is deformed by the load input from the side frame 2a. For this reason, the sliding member 42 corresponds to a movable portion.

Specifically, the sliding member 42 is an annular member that is formed of an ethylene resin, and is interposed between the annular portion and the bush 43 in the radial direction of the extension shaft portion 31. That is, the sliding member 42 is interposed between the annular portion and the inner peripheral surface of the hole portion 21 of the side frame 2a corresponding to the pressing portion in the radial direction, and is disposed in parallel to the attachment brackets 15 and 16 in the axial direction.

More specifically, the sliding member 42 includes a cylindrical fitting cylindrical portion 42b which is fitted to the penetration hole 43c of the bush 43, a one end side flange portion 42a which is adjacent to one end of the fitting cylindrical portion 42b, and the other end side flange portion 42c which is adjacent to the other end of the fitting cylindrical portion 42b. In the state where the fitting cylindrical portion 42b penetrates the penetration hole 43c of the bush 43, the one end side flange portion 42a and the other end side flange portion 42c interpose the bush 43 and the side frame 2a therebetween (see FIG. 12). That is, the sliding member 42 is formed with a large width in the width direction compared to the side frame 2a. Furthermore, in the embodiment, the one end side flange portion 42a has a diameter smaller than that of the other end side flange portion 42c. In this way, since the sliding member 42 includes the one end side flange portion 42a and the other end side flange portion 42c which are formed in a flange shape, the rigidity (the attachment strength) of the sliding member 42 is improved. Further, since the cross section of the sliding member 42 is formed in a U-shape, the sliding member 42 may be easily attached to the bush 43.

Further, the sliding member 42 includes a penetration hole 42d which penetrates the one end side flange portion 42a, the fitting cylindrical portion 42b, and the other end side flange portion 42c in the thickness direction. The penetration hole 42d is slightly larger than the outer diameter of the annular portion provided with the load detection portion 37 of the sensor 30. Then, during the operation of supporting the sensor 30, the annular portion is fitted into the penetration hole 42d in the state where a slight gap is formed between the penetration hole 42d of the sliding member 42 and the annular portion. Furthermore, in the embodiment, the sliding member 42 is attached so that the one end side flange portion 42a is away from the front end of the extension shaft portion 31 compared to the other end side flange portion 42c in the axial direction of the extension shaft portion 31.

The sliding member 42 with the above-described configuration may be attached according to the following procedure.

First, the one end side flange portion 42a and the fitting cylindrical portion 42b are provided, and the sliding member 42 which is not provided with the other end side flange portion 42c yet is attached to the bush 43. At this time, the one end side flange portion 42a is attached to the installation side of the sensor body 32 in the axial direction of the extension shaft portion 31. Furthermore, the one end side flange portion 42a and the bush 43 may be integrated with each other.

Next, the bush 43 is attached to the hole portion 21 which is provided in the side frame 2a, and the opposite end to the installation side of the one end side flange portion 42a is bent outward in the radial direction to form the other end side flange portion 42c. As for the other end side flange portion 42c which is formed by attaching the sliding member 42 to the hole portion 21 and bending a part of the sliding member 42, the stability of the shape or the dimension is slightly degraded. However, since the one end side flange portion 42a near the sensor body 32 is first formed, the precision in the shape or the dimension of the portion disposed near the substrate unit 34 in the sliding member 42 may be improved. As a result, the load detection precision may be improved.

Furthermore, the outer diameter of the cylindrical portion 43a of the bush 43 is slightly larger than the outer diameters of the one end side flange portion 42a and the other end side flange portion 42c of the sliding member 42. In this way, since the outer diameter of the cylindrical portion 43a of the bush 43 is larger than the outer diameters of the one end side flange portion 42a and the other end side flange portion 42c of the sliding member 42, the outer radial ends of the one end side flange portion 42a and the other end side flange portion 42c do not come into contact with the boundary portion between the bush 43 and the hole portion 21 of the side frame 2a, whereby the bush 43 is rigidly attached to the side frame 2a.

The sliding member 42 which is attached according to the above-described procedure is interposed between the side frame 2a (precisely, the bush 43) and the annular portion in the radial direction when the side frame 2a presses the annular portion serving as the load detection portion 37 of the sensor 30, and comes into contact with the circumferential upper portion of the annular portion. For this reason, it may be understood that the sliding member 42 is a load input member that finally inputs the load transmitted through the side frame 2a and the bush 43 to the annular portion. That is, the sliding member 42 comes into contact with the load detection portion 37 to directly press the annular portion with the transmission of the load transmitted from the side frame 2a to the annular portion.

Then, the sliding member 42 is disposed away from the other members (specifically, a spacer 41 and a washer 44) which are disposed adjacent to each other in the thickness direction. That is, since the sliding member 42 is disposed with a gap with respect to the other members in the axial direction of the extension shaft portion 31, the sliding member 42 may move in the axial direction when the load is applied from the side frame 2a to the sliding member. More specifically, when the annular portion is deformed to be curved inward in the radial direction by the load transmitted from the side frame 2a to the sensor 30, the sliding member 42 slides outward in the width direction along the annular portion by the deformation, that is, toward the installation side of the attachment brackets 15 and 16. In other words, the sliding member 42 moves toward the attachment brackets 15 and 16 along the axial direction of the extension shaft portion 31 while pressing the annular portion inward in the radial direction to transmit the load to the annular portion.

In this way, since the sliding member 42 slides outward in the width direction, the sensor 30 may receive the load in the vicinity of the attachment brackets 15 and 16, that is, the position where the extension shaft portion 31 is fixed. As a result, since the load is stably input from the side frame 2a to the sensor 30, the detection precision is improved. Furthermore, in the embodiment, in order to cause the sliding member to easily slide on the sensor 30, the sliding member 42 is formed of a resin member having a satisfactory sliding performance. Here, the structure for forming the contact portion is not limited to the structure in which the sliding member 42 is attached to the side frame 2a, and the contact portion may be formed by coating a resin on the side frame 2a.

In addition, the sliding member 42 is disposed at the inside in the seat width direction compared to the positioning portion 35, and is disposed at a position near the installation side of the substrate unit 34 compared to the outer end of the load detection portion 37 in the seat width direction. That is, the sliding member 42 is disposed at a position near the substrate unit 34 compared to the unfixed end (the free end 37b) of the annular portion serving as the load detection portion 37 in the axial direction. With such a configuration, since the sliding member 42 stably comes into contact with the load receiving surface 37a of the sensor 30, the load detection precision may be improved. Further, it is possible to inhibit the biased load from being added to the sliding member 42.

Figure 17:
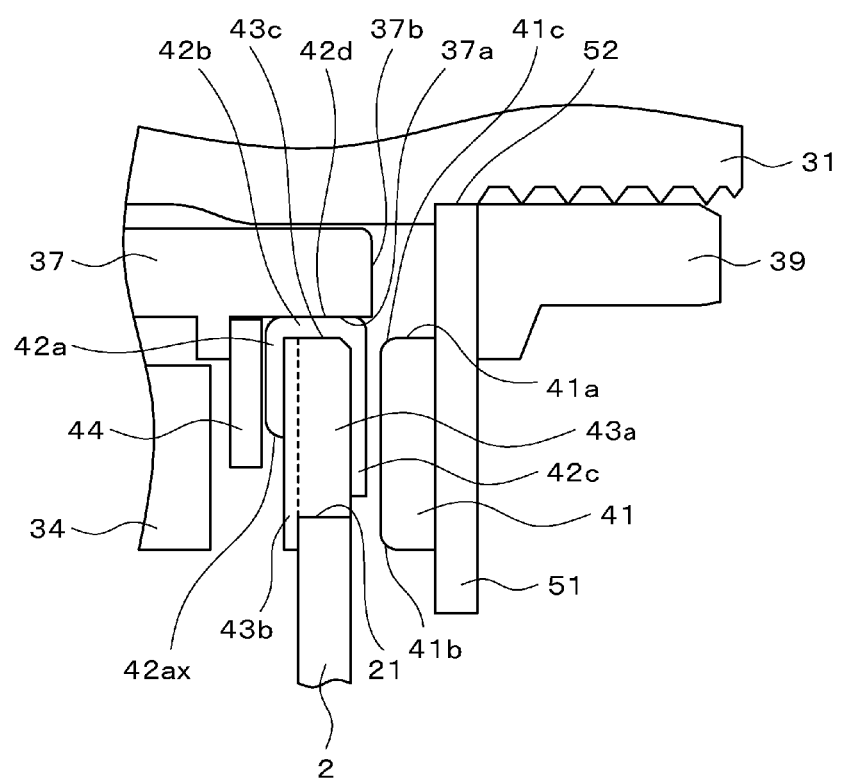
FIG. 17 is an enlarged diagram illustrating an improved example of a support structure for the load measurement sensor.

Further, in the sliding member 42, as illustrated in FIG. 17, an end 42ax which may be provided at the outer peripheral side in the surface facing the washer 44 to be described later may be chamfered. By the chamfering, even when the sliding member 42 comes into contact with the washer 44 in an inclined state, the damage of the washer 44 and the sliding member 42 may be inhibited. As a result, the durability of the support structure for the sensor 30 is improved. Furthermore, the chamfering indicates that a structure in which the corner portion is cut out or rounded.

Furthermore, in the contact surface with respect to the load detection portion 37 provided in the sliding member 42, and specifically, the inner peripheral surface of the penetration hole 42d, a region which faces the load receiving surface 37a has a wide area in the axial direction of the extension shaft portion 31. Here, one end of the contact surface in the axial direction is positioned near the extension shaft portion 31 (the outside) compared to the other end in the axial direction. Further, one end of the regulation portion 36c formed in the even diameter portion 36a in the axial direction is positioned near the extension shaft portion 31 (the outside) compared to the other end in the axial direction. In contrast, the other end of the contact surface in the axial direction is positioned at the inside compared to one end in the axial direction, and the other end of the regulation portion 36c in the axial direction is positioned near the inside compared to the other end in the axial direction.

Then, one end of the contact surface in the axial direction is positioned at the inside compared to one end of the regulation portion 36c in the axial direction. In other words, the one end is away from the extension shaft portion 31. Accordingly, when the side frame 2a presses the annular portion serving as the load detection portion 37 through the sliding member 42, the regulation portion 36c receives the annular portion. In addition, the regulation portion 36c may receive the annular portion continuously and stably even when the sliding member 42 slides.

Further, the other end of the contact surface in the axial direction is positioned at the outside compared to the other end of the regulation portion 36c in the axial direction. In other words, the other end is near the extension shaft portion 31. That is, in the embodiment, the contact surface is included in the range where the even diameter portion 36a including the regulation portion 36c is present in the width direction of the vehicle seat Z. Accordingly, the contact surface is included within the width of the even diameter portion 36a (the range where the even diameter portion 36a is present in the axial direction), so that the load may be stably and accurately detected.

Figure 20:
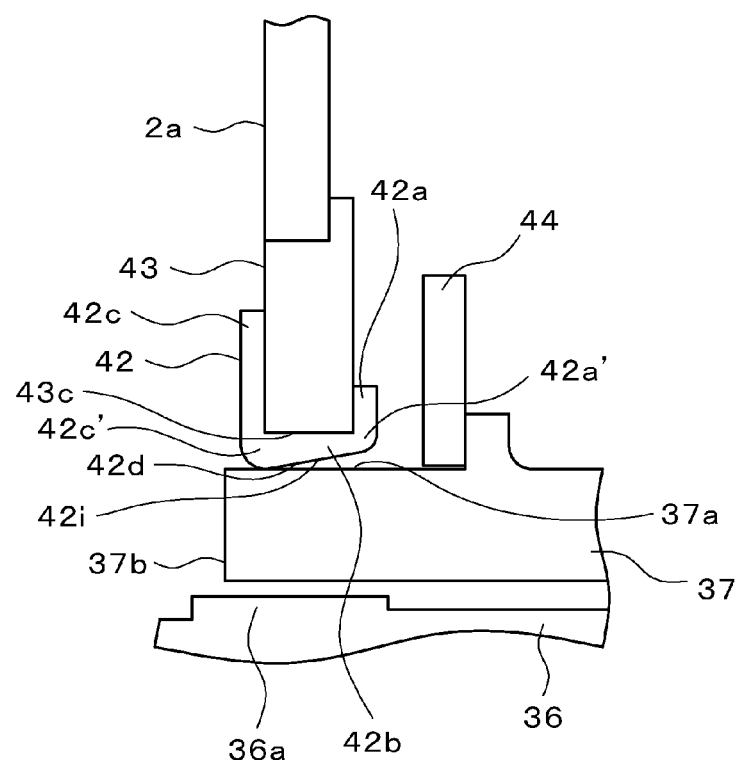
FIG. 20 is a diagram illustrating an inclined surface of a sliding member.

Further, in the inner peripheral surface of the penetration hole 42d of the sliding member 42, the portion which comes into contact with the load receiving surface 37a when the load is applied thereto may be, as illustrated in FIG. 20, formed as an inclined surface 42i which moves away from the annular portion as it moves from the side of the free end 37b toward the side opposite to the free end 37b along the axial direction of the even diameter portion 36a. With such a configuration, the contact area between the load input surface facing the load receiving surface 37a in the inner peripheral surface of the penetration hole 42d of the sliding member 42 and the load receiving surface 37a when the load is applied thereto increases, so that the load may be further stably received by the load input surface and the load receiving surface 37a.

When the inclined surface 42i is formed, the boundary portion of the sliding member 42 between the one end side flange portion 42a and the fitting cylindrical portion 42b is formed as a thin portion 42a', and the boundary portion between the other end side flange portion 42c and the fitting cylindrical portion 42b becomes a thick portion 42c'.

Figure 21:
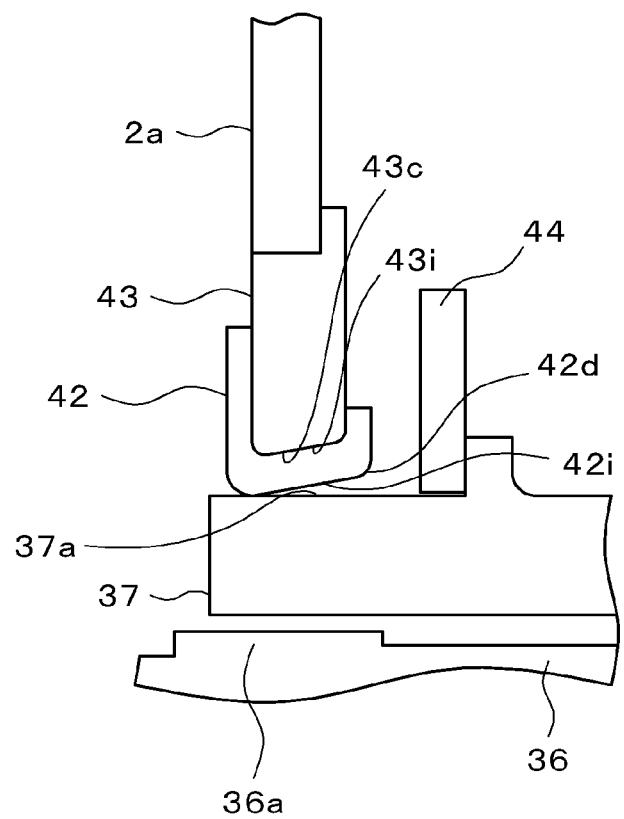
FIG. 21 is a diagram illustrating inclined surfaces of a bush and the sliding member.

Further, in the example of FIG. 20, in the inner peripheral surface of the penetration hole 43c of the bush 43, the portion which faces the load receiving surface 37a is formed in parallel to the axis of the even diameter portion 36a. However, as illustrated in FIG. 21, the portion may be formed as an inclined surface 43i which becomes away from the annular portion as it moves from the side of the free end 37b toward the side opposite to the free end 37b along the axial direction of the extension shaft portion 31. At this time, the sliding member 42 may be formed in a shape according to the shape of the penetration hole 43c of the bush 43.

With such a configuration, the contact area between the load input surface facing the load receiving surface 37a in the inner peripheral surface of the penetration hole 42d of the sliding member 42 and the load receiving surface 37a when the load input thereto may be increased while the plate thickness of the sliding member 42 is uniform, so that the load may be further stably received by the load input surface and the load receiving surface 37a. Further, since the plate thickness of the sliding member 42 is uniform, the rigidity of the sliding member 42 may be ensured.

Further, in the example of FIGS. 20 and 21, in the inner peripheral surface of the penetration hole 42d of the sliding member 42, the portion which comes into contact with the load receiving surface 37a when the load is applied thereto is formed as the inclined surface 42i which becomes away from the load detection portion 37 as it moves from the side of the free end 37b toward the side opposite to the free end 37b along the axial direction of the extension shaft portion 31. However, instead of forming the inclined surface 42i in the sliding member 42, as illustrated in FIG. 22, the load receiving surface 37a may be provided with the inclined surface 37i which becomes away from the sliding member 42 as it moves away from the side of the free end 37b in the axial direction of the even diameter portion 36a.

The surface contact holding mechanism is formed by the inclined surface 42i or any one of the inclined surface 42i, the inclined surface 43i, and the inclined surface 37i. Further, in FIGS. 20 to 22, the surface contact holding mechanism is provided near the free end 37b. Furthermore, the inclined surface 42i illustrated in FIG. 20 or 21 or both of the inclined surface 42i and the inclined surface 43i and the inclined surface 37i in FIG. 21 may be provided.

Here, the effect which is obtained by the surface contact holding mechanism, that is, the stable load receiving effect and the biased load inhibiting effect are exhibited in both the case of supporting both ends of the sensor 30 and the case of supporting only one end of the sensor 30 in a cantilevered manner. However, in the cantilevered support structure, since the biased load is easily applied, the stable load receiving effect and the biased load inhibiting effect are particularly noticeably exhibited by the surface contact holding mechanism.

Figure 22:
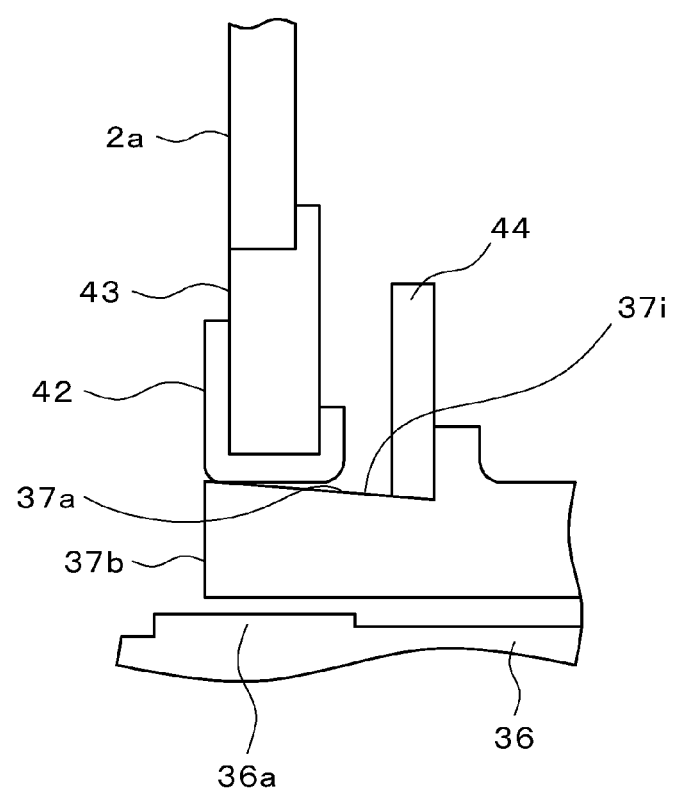
FIG. 22 is a diagram illustrating an inclined surface of a load receiving surface.

Further, in the configuration illustrated in FIGS. 20 to 22, the inner diameter of the washer 44 is formed to be smaller than the inner diameter of the sliding member 42 near the washer 44. Accordingly, the deformation of the sliding member 42 may be inhibited, particularly, in the case of FIG. 20, since there is a high possibility that the sliding member 42 may be deformed toward the washer 44, when the inner diameter of the washer 44 is formed to be smaller than the inner diameter of the sliding member 42 near the washer 44, the effect of inhibiting the deformation of the sliding member 42 may be effectively exhibited.

Figure 26:
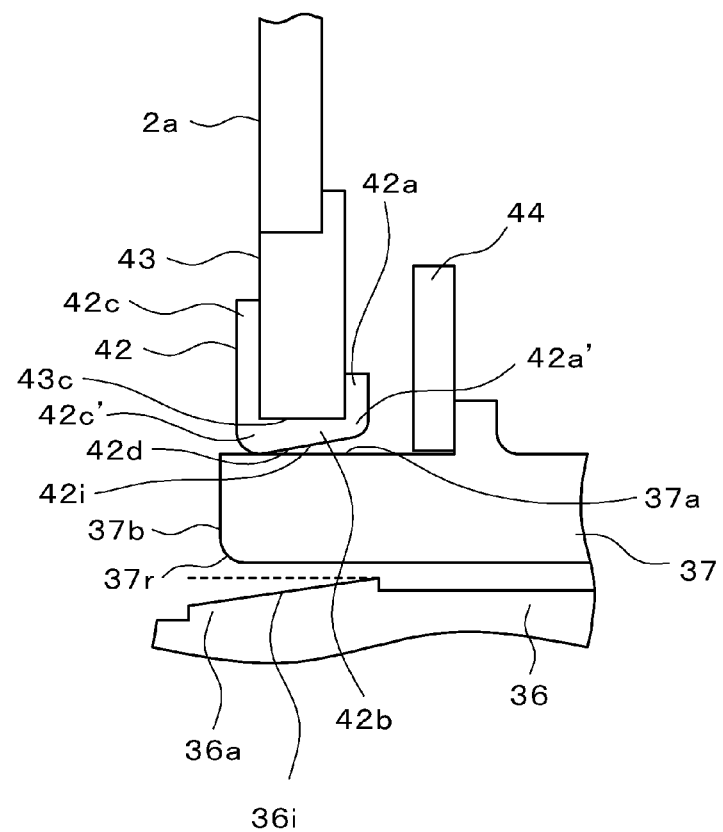
FIG. 26 is a diagram illustrating an inclined surface of a sliding member.
Figure 27:
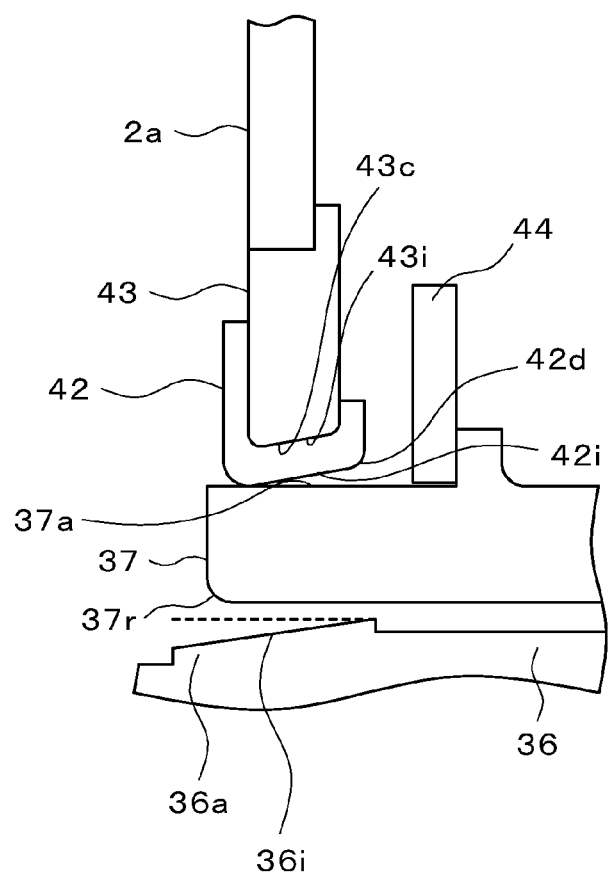
FIG. 27 is a diagram illustrating inclined surfaces of a bush and the sliding member.
Figure 28:
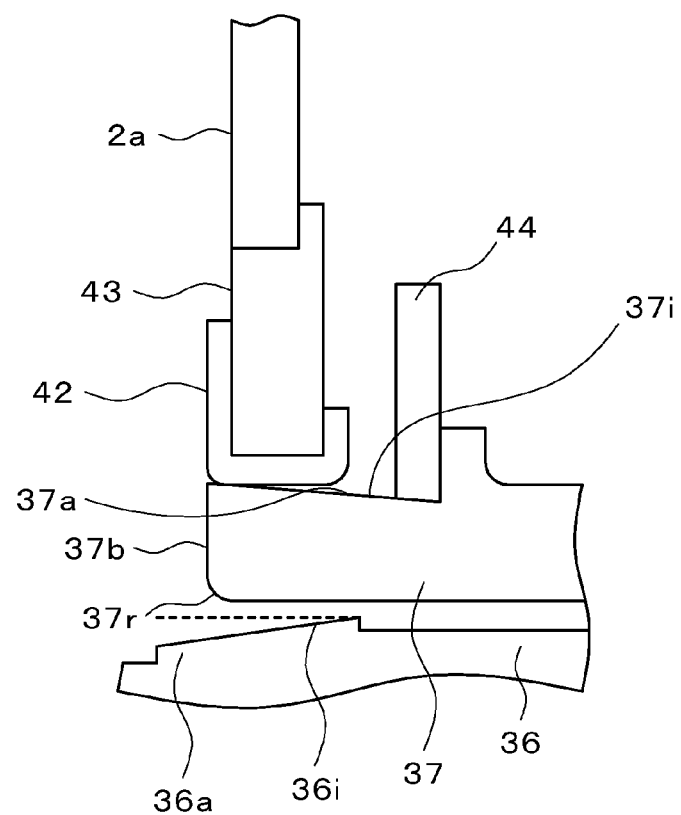
FIG. 28 is a diagram illustrating an inclined surface of a load receiving surface.

Further, as illustrated in FIGS. 26 to 28, the surface contact holding mechanism which includes at least one of the inclined surface 37h and the inclined surface 36i illustrated in FIG. 23 or 24 and the surface contact holding mechanism which includes at least one of the inclined surface 42i, the inclined surface 42i and the inclined surface 43i, and the inclined surface 37i illustrated in FIGS. 20 to 22 may be both provided.

The washer 44 is an annular member that is made of a steel sheet (specifically, SUS630). The washer 44 is fitted to the annular portion serving as the load detection portion 37 in the state where the sensor 30 is support at the support position, and as illustrated in FIG. 12, is positioned at the inside of the sliding member 42 in the seat width direction with a slight gap with respect to the sliding member 42. That is, the washer 44 is disposed to be adjacent to the sliding member 42 at the inside of the sliding member 42 in the axial direction of the extension shaft portion 31. Further, the washer 44 is disposed at the outside of the width direction of the substrate unit 34 with a gap with respect to the substrate unit 34 provided in the sensor 30. In this way, since the washer 44 is disposed away from the substrate unit 34, when the sliding member 42 moves toward the washer 44, the washer 44 may be inclined toward the substrate unit 34, so that the washer 44 serves as a damper which protects the substrate unit 34.

Then, at the arrangement position, the washer 44 regulates the sliding member 42 from excessively moving inward in the width direction, that is, the side opposite to the attachment brackets 15 and 16. That is, the washer 44 serves as a movement regulation member that regulates the sliding member 42 from moving inward compared to the arrangement position of the washer 44.

Further, in the embodiment, as illustrated in FIG. 12, the end (the end opposite to the attachment brackets 15 and 16 in the axial direction of the extension shaft portion 31) at the inside of the regulation portion 36c formed in the even diameter portion 36a is positioned at the outside compared to the washer 44, and is closer to the attachment brackets 15 and 16. Accordingly, the length (the length in the axial direction) of the regulation portion 36c to be ensured to regulate the deformation amount of the annular portion serving as the load detection portion 37 may be the length corresponding to the movable range of the sliding member 42, that is, the length to the arrangement position of the washer 44, and the even diameter portion 36a provided with the regulation portion 36c may be inhibited from unnecessarily increasing in size.

Further, the washer 44 is formed in a size in which the inner peripheral end thereof is positioned at the inside in the radial direction compared to the bottom surface of the substrate unit 34 (the surface near the accommodation shaft portion 36) and the outer peripheral end thereof is positioned at the outside in the radial direction compared to the bottom surface of the substrate unit 34. That is, when the sensor 30 is supported, the washer 44 extends to the outside in the radial direction compared to the bottom surface of the substrate unit 34. In other words, the washer 44 is formed at the outside (from the inside to the outside in the radial direction) in the radial direction compared to the bottom surface of the substrate unit 34. Accordingly, at the arrangement position, the washer 44 exhibits a function of inhibiting the sliding member 42 from moving inward in the axial direction of the extension shaft portion 31 to interfere with the substrate unit 34.

Further, the outer diameter of the washer 44 is formed to be larger than the outer diameter of the one end side flange portion 42a of the sliding member 42. That is, the washer 44 extends outward in the radial direction compared to the outer diameter of the one end side flange portion 42a of the sliding member 42. In this way, since the outer diameter of the washer 44 is formed to be larger than that of the sliding member 42, even when the sliding member 42 slides along the axial direction, the movement toward the washer 44 may be reliably inhibited. Further, a local load is inhibited from being applied to the sliding member 42.

Furthermore, when the outer peripheral surface of the washer 44 is disposed at the inside of the radial direction of the extension shaft portion 31 compared to the ceiling surface (the opposite surface to the installation side of the accommodation shaft portion 36) of the substrate unit 34, the washer 44 is disposed at the inside in the radial direction compared to the ceiling surface of the substrate unit 34. Accordingly, since the washer 44 is provided at the inside of the radial direction compared to the substrate unit 34. Accordingly, the structure which is provided to fix the sensor 30 to the seat may be inhibited from increasing in size in the height direction and the front-to-back direction.

Further, at least a part of the washer 44 is disposed below the upper end of the bolt 18 which is used to fix the bottom wall portion 50 to the upper rail 12. Accordingly, an increase in size of the support structure for the sensor 30 in the height direction may be inhibited.

Furthermore, in the embodiment, a configuration is illustrated in which the washer 44 is provided separately from the sensor 30 (the sensor body 32), but for example, the washer may be integrated with the annular portion. When the washer 44 is integrated with the annular portion, the number of components may be decreased, so that the time necessary for supporting the sensor 30 may be shortened.

The spacer 41 is a cylindrical member that is made of a hot-rolled steel sheet. The spacer 41 is disposed in a gap between the upright wall portion 51 of each of the attachment brackets 15 and 16 and the sliding member 42 in the state where the sensor 30 is supported at the support position as illustrated in FIG. 12. Further, the spacer 41 is adjacent to the sliding member 42 with a slight gap in the width direction. In addition, the center portion of the spacer 41 is provided with a circular hole 41a, and the diameter becomes larger than the diameter of the step portion which forms the positioning portion 35 in the sensor 30.

The spacer 41 is formed to be thicker than the plate thickness of the steel sheet forming the side frame 2a. Further, in the case where the spacer 41 is not integrated with the attachment brackets 15 and 16 but separated therefrom, the spacer is formed to be thicker than the plate thickness of the steel sheet forming the attachment brackets 15 and 16. Further, the plate thickness of the spacer 41 is formed to be thinner than that of the bush 43.

The spacer 41 with the above-described shape is bonded by projection welding to the inner surface of the upright wall portion 51 of each of the attachment brackets 15 and 16 to overlap the circular hole 41a and the insertion hole 52 on the same axis. Then, when inserting the extension shaft portion 31 into the insertion hole 52 to support the sensor 30, the extension shaft portion 31 is guided into the insertion hole 52 through the circular hole 41a of the spacer 41. Further, at a time point at which the positioning portion 35 of the sensor 30 comes into contact with the upright wall portion 51 of each of the attachment brackets 15 and 16 and the sensor 30 is positioned thereto, the spacer 41 is disposed at the outside of the positioning portion 35 in the radial direction of the extension shaft portion 31 as illustrated in FIG. 12.

The spacer 41 which is set as described above serves as a stopper which regulates the sliding member 42 from excessively moving outward in the axial direction of the extension shaft portion 31. More specifically, when the sliding member 42 moves outward in the axial direction of the extension shaft portion 31 from a state where the sliding member is positioned at the outside of the annular portion serving as the load detection portion 37 in the radial direction of the extension shaft portion 31, the spacer 41 regulates the sliding member 42 from coming off to the outside of the annular portion.

The spacer 41 is provided to extend to the outside in the radial direction compared to the other end side flange portion 42c provided in the sliding member 42. That is, the outer diameter of the spacer 41 is formed to be larger than the outer diameter of the other end side flange portion 42c provided in the sliding member 42. Accordingly, when the sliding member 42 comes into contact with the spacer 41, the entire surface of the other end side flange portion 42c of the sliding member 42 comes into contact with the spacer 41, so that the contact area is widened. Accordingly, the spacer 41 may stably press and stop the other end side flange portion 42c, so that a biased load is inhibited from being applied to the sliding member 42.

Furthermore, in the embodiment, the thickness of the spacer 41 comparatively increases. For this reason, when the sensor 30 is positioned by the positioning portion 35, as illustrated in FIG. 12, the end (the end near the sliding member 42) which is positioned at the inside in the axial direction of the extension shaft portion 31 reaches the free end (the end near the spacer 41) of the annular portion in the same axial direction.

In other words, the inner end of the spacer 41 in the axial direction of the extension shaft portion 31 and the free end of the annular portion overlap with each other on the same imaginary plane (indicated by the sign VS in FIG. 12) in which the axial direction of the extension shaft portion 31 is set as the normal direction. With such a positional relation, the biased load may be inhibited from being applied to the free end of the annular portion.

Furthermore, the spacer 41 may be disposed so as not to overlap the outer end surface (the free end 37b) of the annular portion in the width direction on the imaginary plane VS in the state where the sensor 30 is supported by each of the attachment brackets 15 and 16. With such a configuration, when the load detection portion 37 is deformed by receiving the load with the attachment of the spacer 41, it is possible to inhibit degradation in the load detection precision due to the interference between the spacer 41 and the load detection portion 37.

In addition, as illustrated in FIG. 12, the upright wall portion 51 of each of the attachment brackets 15 and 16 is formed at a position away from the annular portion serving as the load detection portion 37 in the axial direction, but the spacer 41 is disposed at a position where the gap is covered by the spacer. Accordingly, it is possible to inhibit foreign matter from intruding between the annular portion and the even diameter portion 36a of the accommodation shaft portion 36. When the foreign matter intrudes between the annular portion and the even diameter portion 36a of the accommodation shaft portion 36, if the annular portion is deformed to be warped inward in the radial direction by the load transmitted from the sliding member 42, the annular portion interferes with the foreign matter, so that the sensor 30 may not accurately measure the load. Here, in the embodiment, the spacer 41 inhibits the intrusion of the foreign matter by covering the gap between the upright wall portion 51 and the annular portion, so that the load detection error may be inhibited.

The spacer 41 is disposed at a position where it overlaps the front attachment region 25 (or the rear attachment region 23) when the vehicle seat Z is seen from the side portion thereof. That is, the spacer 41 is disposed at a position where the spacer overlaps the front attachment region 25 (or the rear attachment region 23) in the seat width direction. In other words, the spacer 41 may be provided in the range of the front attachment region 25 (or the rear attachment region 23). With such a configuration, since the distance between the front attachment region 25 or the rear attachment region 23 in the side frame 2a and the upright wall portion 51 of each of the attachment brackets 15 and 16 provided at the outside thereof decreases, the thickness of the spacer 41 does not increase.

Further, as described above, the sensor 30 is supported by each of the attachment brackets 15 and 16 by threading the nut 39 into the extension shaft portion 31. Then, the spacer 41 is formed at a position overlapping the nut 39 in the axial direction with the size illustrated in FIG. 12. In this way, with a configuration in which the nut 39 and the spacer 41 overlap with each other in the axial direction, the nut 39 and the spacer 41 are disposed to face each other with the upright wall portion 51 of each of the attachment brackets 15 and 16 interposed therebetween, the sensor 30 may be more rigidly supported by each of the attachment brackets 15 and 16.

Furthermore, in the embodiment, a configuration is illustrated in which the spacer 41 is formed separately from the sensor 30 or the attachment brackets 15 and 16. However, for example, the spacer may be integrated with the upright wall portion 51 of each of the attachment brackets 15 and 16. More specifically, a part of the upright wall portion 51 may be enlarged toward the sensor body 32, and the portion may be used instead of the spacer 41. In this way, since the spacer 41 is integrated with the other member, the number of components of the constituent may be decreased, so that the time necessary for supporting the sensor 30 may be shortened.

Other Embodiments of the Sensor Attachment Component

Hereinafter, referring to FIG. 18, the other embodiments of the sensor attachment component will be described. Furthermore, the same reference numerals will be given to the similar components to those of the above-described embodiment, and the specific description thereof will not be repeated.

Figure 18:
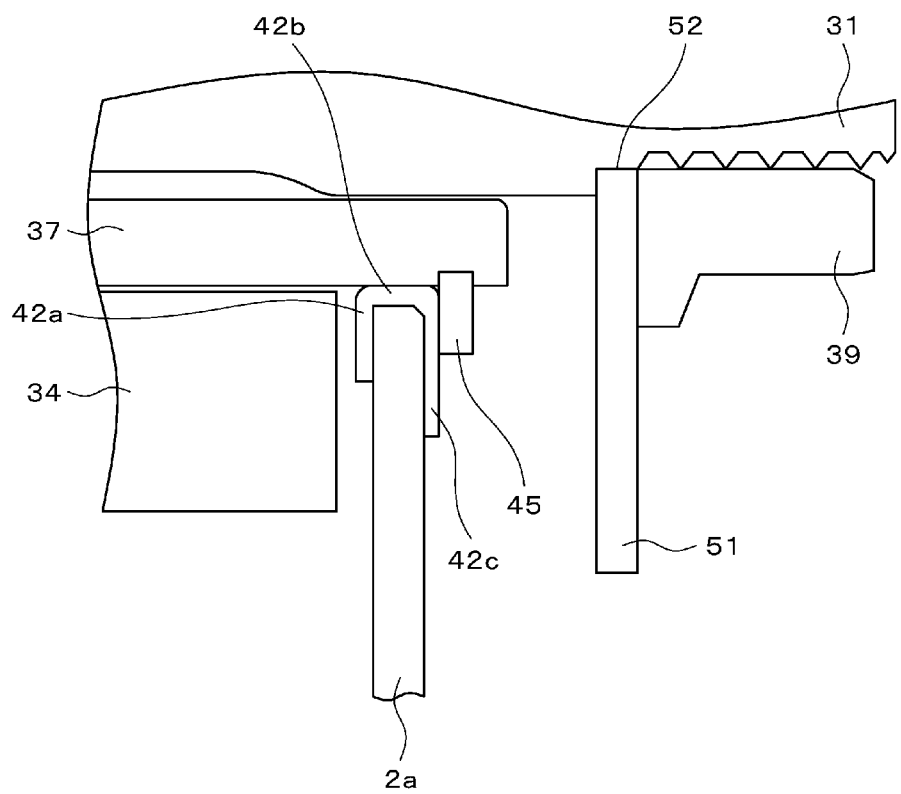
FIG. 18 is an enlarged diagram illustrating the other embodiment of the support structure for the load measurement sensor.

The embodiment illustrated in FIG. 18 is characterized in that the spacer 41 and the washer 44 described in the above-described embodiment are not provided and an E-ring 45 is provided. The E-ring 45 is an annular member that is made of a metal material, and is attached to the annular portion which is provided as the load detection portion 37 in the sensor body 32. More specifically, the E-ring 45 is attached into a groove which is formed in the outer periphery of the annular portion.

The E-ring 45 may be provided to restrict the range in which the side frame 2a moves along the axial direction of the extension shaft portion 31, and the sliding member 42 is provided between the side frame 2a and the E-ring 45. In other words, the sliding member 42 is attached to the side frame 2a, and the movement amount in which the sliding member 42 moves toward the extension shaft portion 31 is restricted by the E-ring 45 which is attached to the annular portion.

Furthermore, the outer diameters of the one end side flange portion 42a and the other end side flange portion 42c of the sliding member 42 are formed to be larger than the outer diameter of the E-ring 45. In addition, the outer diameter of the other end side flange portion 42c disposed at the contact side of the E-ring 45 is formed to be larger than the outer diameter of the one end side flange portion 42a. Accordingly, since the sliding member 42 further stably comes into contact with the E-ring 45 when the sliding member 42 comes into contact with the E-ring 45, the load detection precision may be improved.

In addition, in the embodiment of FIG. 18, the outer peripheral ends of the one end side flange portion 42a and the other end side flange portion 42c of the sliding member 42 are disposed at the inside in the radial direction compared to the ceiling surface (the opposite surface to the accommodation shaft portion 36) of the substrate unit 34 and are provided at the inside in the radial direction compared to the substrate unit 34.

Positional Relation Between the Sensor and Vehicle Seat Z

Hereinafter, the position of supporting the sensor 30 will be more specifically described, and the positional relation between the sensor 30 and the vehicle seat Z will be described by referring to FIGS. 14 and 15 together with FIG. 5.

As described above, the position of supporting the sensor 30 is positioned above the near lower rail 11 when seen from the first rail member, that is, the sensor 30. Then, when the sensor 30 is supported at the support position, the sensor body 32 (precisely, the portion of the sensor body 32 which is positioned at the inside compared to the load detection portion 37) of the sensor 30 is positioned between the side frames 2a in the width direction. For example, as illustrated in FIG. 5, the substrate unit 34 which is provided in the sensor 30 is positioned at the inside in the width direction compared to the side frame 2a.

Then, in the embodiment, when the sensor 30 is supported at the support position, the load receiving portion in the sensor body 32 is disposed at a position away from the second rail member compared to the center of the first rail member in the width direction of the vehicle seat Z. Here, the load receiving portion is a region which is formed in the sensor body 32 to receive the load transmitted from the vehicle seat Z (specifically, the side frame 2a), and in the embodiment, the load receiving surface 37a corresponds to the load receiving portion.

That is, in the embodiment, as illustrated in FIG. 5, in the state where the sensor 30 is supported at the support position, the load receiving surface 37a serving as the load receiving portion is positioned at the outside compared to the center of the width direction of the lower rail 11 serving as the first rail member. With such a positional relation, since the sensor 30 does not easily interfere with the member (a member positioned between the rail members and for example, the S-spring 6 or a safety belt (not illustrated)) inside the seat, a compact in size of the vehicle seat Z may be satisfactorily accomplished.

Furthermore, the load receiving surface 37a has a width (wide area) in the width direction. Then, as illustrated in FIG. 5, the outer end of the load receiving surface 37a in the width direction is positioned at the outside compared to the transverse center of the lower rail 11 serving as the first rail member. Particularly, in FIG. 5, the center of the load receiving surface 37a in the width direction is positioned at the outside of the center of the first rail member. In addition, the inner end of the load receiving surface 37a in the width direction is also positioned at the outside compared to the center of the first rail member. With the above-described positional relation, the effect of inhibiting the interference between the sensor 30 and the member inside the seat is further effectively exhibited.

In addition, as illustrated in FIG. 5, in the state where the sensor 30 is supported at the support position, the sensor body 32 is provided between both ends of the lower rail 11 in the width direction. As described above, since the sensor body 32 is provided between both ends of the lower rail 11 in the width direction, the sensor 30 may be supported by effectively using the space on the lower rail 11, so that the vehicle seat Z may be further compact in size.

Further, since the sensor body 32 is provided between both ends of the lower rail 11 in the width direction, the substrate unit 34 provided in the sensor body 32 is also provided between both ends of the lower rail 11 in the width direction. Accordingly, when the sensor 30 is supported at the support position, the connector portion 34a which is provided in the substrate unit 34 is disposed at the outside compared to the inner end of the first rail member in the width direction in the state where the front end is positioned at the front side. Accordingly, the interference between the connector portion 34a and the member inside the seat is inhibited, and for example, the safety belt may be smoothly connected to the connector portion 34a.

Further, in the state where the sensor 30 is supported at the support position, the sensor 30 is positioned at the outside compared to the S-spring 6 (precisely, the near S-spring among the plurality of S-springs 6 arranged in parallel in the width direction, which is the same hereinafter) in the width direction. Accordingly, as described above, the interference between the sensor 30 and the S-spring 6 may be effectively inhibited.

In addition, for the purpose of effectively inhibiting the interference between the sensor 30 and the S-spring 6, in the embodiment, as illustrated in FIG. 14, the sensor 30 is disposed at the same position as that of the installation position of the second curved portion 6b among first and second curved portions 6a and 6b constituting the S-spring 6 in the front-to-back direction of the vehicle seat Z. Here, the first curved portion 6a indicates a portion of the S-spring 6 which is curved to be closer to the first rail member in the width direction when seen from the sensor 30 supported on the first rail member. The second curved portion 6b indicates a portion of the S-spring which is curved to be closer to the second rail member in the width direction when seen from the sensor 30 supported on the first rail member.

With the above-described arrangement, the sensor 30 and the S-spring 6 may be made to be away from each other, so that the interference between the sensor 30 and the S-spring 6 may be further effectively inhibited. Furthermore, in the embodiment, in order to further effectively inhibit the interference between the sensor 30 and the S-spring 6, the position of supporting the sensor 30 and the arrangement position of the S-spring 6 in the vertical direction (the height direction of the vehicle seat Z) are different from each other.

Further, as described above, the sensor 30 is disposed in a place provided with the rear attachment region 23 and the front attachment region 25 which protrude outward in the side frame 2a. Accordingly, the position of supporting the sensor 30 may be further shifted outward in the width direction, so that the interference between the sensor 30 and the member inside the seat may be further effectively inhibited.

Further, when the sensor 30 is supported at the support position, as illustrated in FIG. 15, the sensor 30 is positioned at the same position as that of the transverse center portion 4a of the submarine restraining pipe 4 in the front-to-back direction of the vehicle seat Z. That is, the transverse center portion 4a of the submarine restraining pipe 4 is disposed at a position where the sensor 30 is supported in the front-to-back direction. On the other hand, the transverse end 4b of the submarine restraining pipe 4 turns around to the front side of the sensor 30 in the front-to-back direction, and is disposed along the extension shaft portion 31. With such a positional relation, the submarine restraining pipe 4 may be provided to inhibit the interference with the sensor 30.

Furthermore, the transverse end 4b of the submarine restraining pipe 4 is not limited to turn around to the front side of the sensor 30, and the transverse end 4b of the submarine restraining pipe 4 may turn around to the rear side of the sensor 30.

Further, when the sensor 30 is supported at the support position, the substrate unit 34 provided in the sensor 30 is positioned at the inside compared to the side frame 2a. That is, the substrate of the substrate unit 34 is positioned at the side opposite to the position of the attachment brackets 15 and 16 in the axial direction of the extension shaft portion 31 when seen from the side frame 2a. In such a state, the gap between the substrate and the side frame 2a is larger than the gap between the side frame 2a and each of the attachment brackets 15 and 16. Accordingly, the gap between the inner peripheral surface of the hole portion 21 of the side frame 2a corresponding to the pressing portion and the substrate is larger than the gap between the inner peripheral surface of the hole portion 21 and each of the attachment brackets 15 and 16. Accordingly, the contact between the substrate and the side frame 2a is inhibited, and the position of supporting the sensor 30 is further shifted to the outside, so that the vehicle seat Z may be made to be further compact in size.

Further, in the state where the sensor 30 is supported at the support position, the regulation portion 36c which is formed in the even diameter portion 36a is disposed at a position away from the second rail member compared to the transverse center of the first rail member. Accordingly, since the load detection portion 37 may be disposed near a position where the sensor 30 is supported, the sensor 30 may be stably supported.

Next, the positional relation between the sensor 30 and the sensor attachment components 40 will be described.

When the sensor 30 is supported at the support position, the sliding member 42 is disposed at the inside compared to the outer end of the annular portion serving as the load detection portion 37, that is, the end near the attachment brackets 15 and 16. In other words, the sliding member 42 is disposed at a position away from the attachment brackets 15 and 16 compared to the outer end of the annular portion. This means that the sliding member 42 does not reach the outer end of the load detection portion 37 in the state where the sensor 30 is supported at the support position. Therefore, it is possible to visually check the state of the vicinity of the outer end of the annular portion, and particularly, the presence of foreign matter from the upper side.

Furthermore, as described above, in the embodiment, the inner end of the spacer 41 in the thickness direction reaches the outer end of the annular portion, but in order to easily check the state of the vicinity of the outer end of the load detection portion 37, the inner end of the spacer 41 in the thickness direction may be positioned at the outside compared to the outer end of the annular portion.

Further, in the state where the sensor 30 is supported at the support position, the regulation portion 36c which is formed in the even diameter portion 36a is disposed at a position away from the second rail member compared to the transverse center of the first rail member. Accordingly, the annular portion serving as the load detection portion 37 of the sensor 30 is disposed at the further outside, so that the interference between the member inside the seat and the sensor 30 may be further effectively inhibited.

Improved Example of Extension Shaft Portion

In the above-described embodiment, the cross section of the extension shaft portion 31 in the axial direction is formed in a true circular shape. On the other hand, when the extension shaft portion 31 is inserted into the insertion hole 52 and the hole portion 21 to support the sensor 30 and the sensor 30 is positioned, the sensor 30 is present at a predetermined position in the extension shaft portion 31 in the circumferential direction. At the predetermined position, the annular portion serving as the load detection portion 37 and the load receiving surface 37a are substantially positioned below the side frame 2a in the load transmission direction, so that the load may be appropriately received.

Here, at a time point at which the sensor 30 is positioned, the adjacent portion 31b of the extension shaft portion 31 is fitted to the insertion hole 52 of each of the attachment brackets 15 and 16. However, the sensor 30 may rotate about the extension shaft portion 31 with respect to each of the attachment brackets 15 and 16. Then, when the sensor 30 rotates with respect to each of the attachment brackets 15 and 16, the load detection portion 37 and the load receiving surface 37a rotate in the rotation direction. The direction of the load receiving surface 37a with respect to the load is changed by a variation in the load receiving surface 37a, which affects the load measurement precision of the sensor 30 and degrades the measurement precision.

For this reason, when inserting the extension shaft portion 31 into the insertion hole 52 formed in each of the attachment brackets 15 and 16 with the operation of supporting the sensor 30, there is a need to inhibit the relative rotation of the sensor 30 with respect to each of the attachment brackets 15 and 16 after the sensor 30 is supported. Here, when a local contact pressure is applied to the sensor 30 or the attachment brackets 15 and 16 with the regulation of the relative rotation of the sensor 30 with respect to each of the attachment brackets 15 and 16, the extension shaft portion 31 is cut out so that each of the attachment brackets 15 and 16 is deformed. When such a state is continued, finally, there is a possibility that the relative rotation of the sensor 30 with respect to each of the attachment brackets 15 and 16 may not be regulated.

Figure 16:
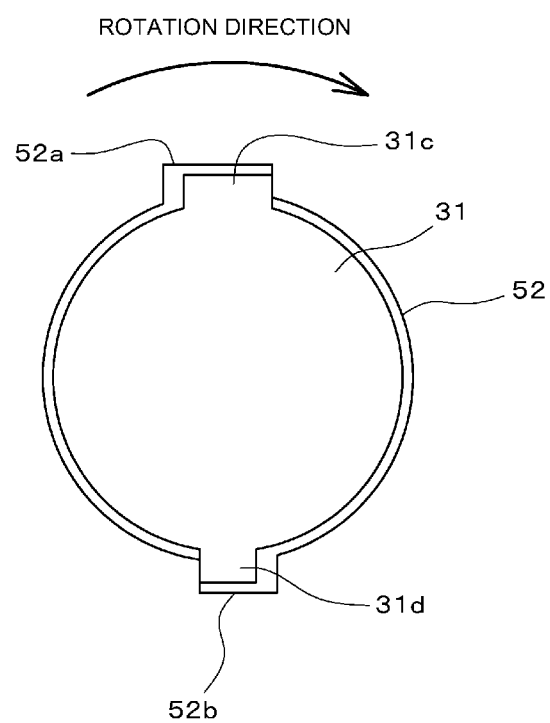
FIG. 16 is a cross-sectional view illustrating an improved example of an extension shaft portion.

Therefore, as another structure for inhibiting the relative rotation of the sensor 30, as illustrated in FIG. 16, the shaft body of the extension shaft portion 31 may be provided with the convex portions 31c and 31d which protrude outward in the radial direction from the outer periphery of the shaft body. Here, the shaft body indicates a portion which is obtained by removing the convex portions 31c and 31d in the extension shaft portion 31, and specifically, the shaft body is the adjacent portion 31b adjacent to the male screw portion 31a.

The structure for inhibiting the relative rotation of the sensor 30 illustrated in FIG. 16 will be described in detail. The outer periphery of the shaft body of the extension shaft portion 31 is provided with a plurality of convex portions provided at different positions in the circumferential direction of the extension shaft portion 31, and in the embodiment, two convex portions 31c and 31d are provided.

On the other hand, the inner peripheral surface of the insertion hole 52 is provided with concave portions 52a and 52b corresponding to the two convex portions 31c and 31d, and the extension shaft portion 31 is inserted into the insertion hole 52 so that the respective convex portions 31c and 31d engage with the corresponding concave portions 52a and 52b. As a result, when the sensor 30 rotates about the extension shaft portion 31 with respect to each of the attachment brackets 15 and 16 in the state where the extension shaft portion 31 is inserted into the insertion hole 52, the convex portions 31c and 31d come into contact with one side surfaces (that is, the edge surface of the insertion hole 52) of the concave portions 52a and 52b formed in the inner peripheral surface of the insertion hole 52. That is, the convex portions 31c and 31d are locked to one side surfaces of the concave portions 52a and 52b. Accordingly, the relative rotation of the sensor 30 is inhibited. Furthermore, since the plurality of the convex portions 31c and 31d are formed, the force applied to the respective convex portions 31c and 31d is reduced by the number of the convex portions, so that the convex portions 31c and 31d and the concave portions 52a and 52b may be further decreased in size.

As described above, in the embodiment, the convex portions 31c and 31d are provided to regulate the relative rotation of the sensor 30. Here, the invention is not limited thereto. For example, in order to define the position of the sensor 30 in the circumferential direction of the shaft body of the extension shaft portion 31 (that is, in order to perform the positioning operation), the convex portions 31c and 31d may be provided.

Furthermore, when the concave portions 52a and 52b are provided to correspond to the convex portions 31c and 31d, the respective convex portions 31c and 31d come into plane-contact with the corresponding concave portions 52a and 52b. Accordingly, it is possible to solve the above-described problem in which the extension shaft portion 31 comes into edge-contact with the inner peripheral surface of the insertion hole 52 so that the portion is cut out. As a result, the relative rotation of the sensor 30 with respect to each of the attachment brackets 15 and 16 may be continuously appropriately regulated, so that the sensor 30 is maintained at a position where the load may be accurately measured.

Furthermore, in the embodiment, the concave portions 52a and 52b are provided in the edge surface so that the convex portions 31c and 31d come into plane-contact with the edge surface of the insertion hole 52 of each of the attachment brackets 15 and 16, but when the plane-contact may be ensured, the convex portions may come into plane-contact with a structure other than the concave portions 52a and 52b.

Further, at least one of the concave portions 52a and 52b is positioned above the shaft body in the state where the extension shaft portion 31 is inserted into the insertion hole 52. In other words, the concave portion is positioned above the shaft body in the state where the extension shaft portion 31 is inserted into the insertion hole 52, and the concave portion is provided in the edge surface of the insertion hole 52 formed in each of the attachment brackets 15 and 16. The concave portion is formed to penetrate each of the attachment brackets 15 and 16 along the thickness direction of the attachment brackets 15 and 16. Accordingly, it is easy to check the support state of the sensor 30, and particularly, the positioned state of the sensor 30 in the width direction.

Further, in the embodiment, the plurality of (in the embodiment, two) convex portions 31c and 31d are formed in the outer periphery of the shaft body at different positions. Accordingly, the effect of inhibiting the relative rotation of the sensor 30 is further effectively exhibited. At this time, it is desirable that the respective convex portions 31c and 31d are disposed at a predetermined interval (in the embodiment, a deviation of about 180 degrees) in the outer periphery of the shaft body in the circumferential direction.

In addition, in the embodiment, the respective shapes (including a size) of two convex portions 31c and 31d are different from each other, so that the erroneous assembly of the sensor 30 may be inhibited. This will be easily described. When inserting the extension shaft portion 31 into the insertion hole 52, the respective convex portions 31c and 31d may reliably engage with the corresponding concave portions 52a and 52b. Furthermore, in the embodiment, in the state where the extension shaft portion 31 is inserted into the insertion hole 52, the respective convex portions 31c and 31d are positioned between a one end side opening to which the extension shaft portion 31 is inserted and the other end side opening which is positioned at the side opposite to the one end side opening in the concave portions 52a and 52b of the insertion hole 52. With such a configuration, since the respective convex portions 31c and 31d are included in the concave portions 52a and 52b of the insertion hole 52, the interference with the other member may be inhibited.

Further, in the embodiment, the convex portion 31c to which the larger load is applied in the circumferential direction of the outer periphery of the shaft body among two convex portions is larger than the convex portion 31d to which the smaller load is applied in the circumferential direction. Here, the larger (smaller) load is applied in the circumferential direction of the outer periphery of the shaft body indicates the position which is located at the downstream (upstream) when seen from the load transmission direction among two different points in the circumferential direction of the outer periphery.

More specifically, as for the intersection of the sensor 30 between the outer periphery of the annular portion provided with the load detection portion 37 and the transmission path (the linear path) of the load applied to the load detection portion 37, there are two intersections on the outer periphery of the annular portion. The intersection (the lower intersection) which is positioned at the lower side is the intersection to which the larger load is applied, and the convex portion 31c which is formed at a position corresponding to the lower intersection in the circumferential direction of the outer peripheral surface of the shaft body becomes the convex portion to which the larger load is applied. On the other hand, the intersection (the upper intersection) which is positioned at the upper side is the intersection to which the smaller load is applied, and the convex portion 31d which is formed at a position corresponding to the upper intersection in the circumferential direction of the outer peripheral surface of the shaft body becomes the convex portion to which the smaller load is applied.

In this way, when the convex portion to which the larger load is applied is formed with the larger size, the rigidity increases in response to the size. Even in the convex portion to which the larger load is applied, the relative rotation of the sensor 30 may be stably regulated. Furthermore, in order to improve the rigidity of the convex portion to which the larger load is applied, for example, a surface treatment or a coating for improving the rigidity may be performed other than the manner of increasing the size.

Further, in the embodiment, the convex portions 31c and 31d protrude from the outer periphery of the adjacent portion 31b in the extension shaft portion 31, and are connected to the step portion as the positioning portion 35 of the sensor 30. That is, in the embodiment, the step portion and the convex portions 31c and 31d are continuously integrated with each other in the axial direction. With such a configuration, the rigidity of the convex portions 31c and 31d is improved.

In addition, in the embodiment, the lengths from the center of the extension shaft portion 31 to the front ends of the convex portions 31c and 31d in the radial direction of the extension shaft portion 31 are equal to or smaller than the outer diameter of the step portion serving as the positioning portion 35 of the sensor 30. Accordingly, it is possible to inhibit the relative rotation of the sensor 30 while easily positioning the sensor 30 using the step portion. Further, the convex portions 31c and 31d may be easily formed.

Furthermore, the lengths from the center of the extension shaft portion 31 to the front ends of the convex portions 31c and 31d may be equal to the outer diameter of the step portion. In this case, compared to the case where the lengths from the center of the extension shaft portion 31 to the front ends of the convex portions 31c and 31d are smaller than the outer diameter of the step portion, the easiness of the operation of positioning the sensor 30 using the step portion is slightly degraded, but such portions may be easily processed or the excellent rigidity is ensured.

Further, in order to inhibit the excessive load from being applied to the convex portions 31c and 31d, it is desirable that the outer diameter of the nut threaded into the male screw portion 31a of the extension shaft portion 31 is larger than the diameter of the insertion hole 52.

Here, when the sensor 30 rotates with respect to the attachment brackets 15 and 16, the measurement precision is degraded with an increase in the rotation angle. In the embodiment, as described above, since the convex portions 31c and 31d and the concave portions 52a and 52b are provided, when the convex portions 31c and 31d come into contact with the concave portions 52a and 52b, the rotation angle when the sensor 30 rotates about the extension shaft portion 31 with respect to each of the attachment brackets 15 and 16 in the state where the extension shaft portion 31 is inserted into the insertion hole 52 is inhibited to be 15 degrees or less. Accordingly, the measurement precision of the sensor 30 is improved. Particularly, in the embodiment, when the convex portions 31c and 31d come into contact with the concave portions 52a and 52b, the rotation angle is inhibited within 10 degrees, so that the measurement precision is further improved.

Other Support Structures

In the above-described embodiment (hereinafter, the specification example), the extension shaft portion 31 of the sensor 30 is fastened to the attachment brackets 15 and 16, and the sensor 30 is supported by the brackets 15 and 16. Then, in the specification example, when a load is applied to the vehicle seat Z, the load is directly input to the load detection portion 37 from the side frame 2a which is disposed at the inside in the width direction compared to the attachment brackets 15 and 16. Here, as for the support structure for the sensor 30, a structure may be supposed other than the structure according to the specification example. For example, the extension shaft portion 31 of the sensor 30 may be fastened to the side frame 2a so that the sensor 30 is supported by the frame 2a. In such a configuration (hereinafter, the other embodiment), a load of a member different from the side frame 2a is transmitted to the load detection portion 37.

Hereinafter, the other embodiment will be described by referring to FIGS. 29 to 36. In FIG. 30, for convenience of description, a sensor attachment component 70 to be described later is not illustrated. Further, in FIG. 34, in order to easily describe the state of the load measurement sensor when the load is generated, the inclination and the like of the load measurement sensor are slightly exaggerated.

Furthermore, in the following description, in the other embodiments, the different configuration from that of the specification example will be mainly described, and the similar configuration will not be described. In FIGS. 29 to 36, the same reference numerals and signs are given to the members similar to those of the specification example.

In the other embodiment, the sensor 30 is supported by each of the pair of side frames 2a provided in the seat frame F of the vehicle seat Z. That is, in the other embodiment, each side frame 2a corresponds to the support bracket, and each sensor 30 is supported by each of the front end and the rear end thereof. In this way, when the sensor 30 is supported by the side frame 2a having a comparatively high rigidity in the seat frame F, the support rigidity with respect to the sensor 30 is improved, so that the sensor 30 may be stably disposed at the support position. Furthermore, the front end and the rear end of each side frame 2a are provided with the circular hole portion 21 which is formed to fasten the extension shaft portion 31 of the sensor 30.

Further, as illustrated in FIG. 30, a front sensor receiving bracket 65 is fixed to the front end of the upper end surface of the upper rail 12 and a rear sensor receiving bracket 66 is fixed to the rear end by the bolt and the nut. Each of the sensor receiving brackets 65 and 66 is provided with the insertion hole 62, and the extension shaft portion 31 of the sensor 30 is inserted into the insertion hole 62.

Then, when the insertion hole 62 formed in each of the sensor receiving brackets 65 and 66 overlaps the hole portion 21 formed in the side frame 2a and the extension shaft portion 31 of the sensor 30 is inserted through both holes, the sensor receiving brackets 65 and 66 and the side frame 2a are connected to each other through the extension shaft portion 31 of the sensor 30. At this time, as illustrated in FIGS. 29 and 31, the pair of side frames 2a is positioned at the outside compared to the sensor receiving brackets 65 and 66 in the width direction, and the sensor body 32 of the sensor 30 is positioned at the inside compared to the sensor receiving brackets 65 and 66.

Figure 29:
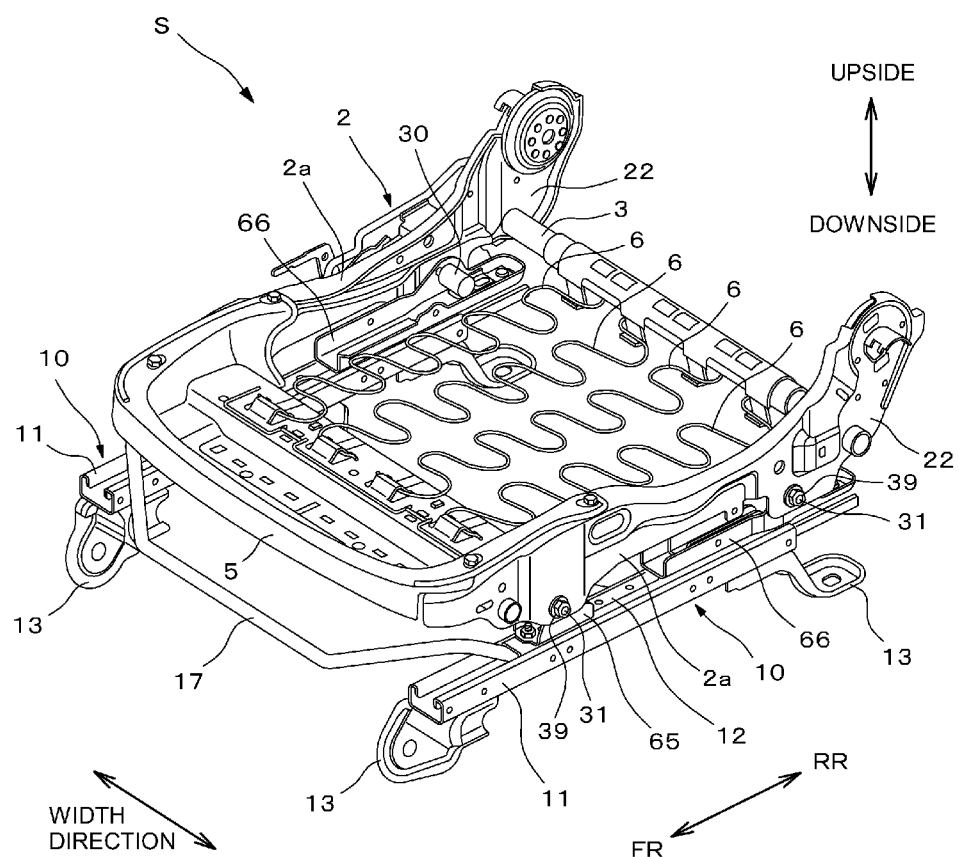
FIG. 29 is a perspective view illustrating a seat unit according to the other embodiment.
Figure 30:
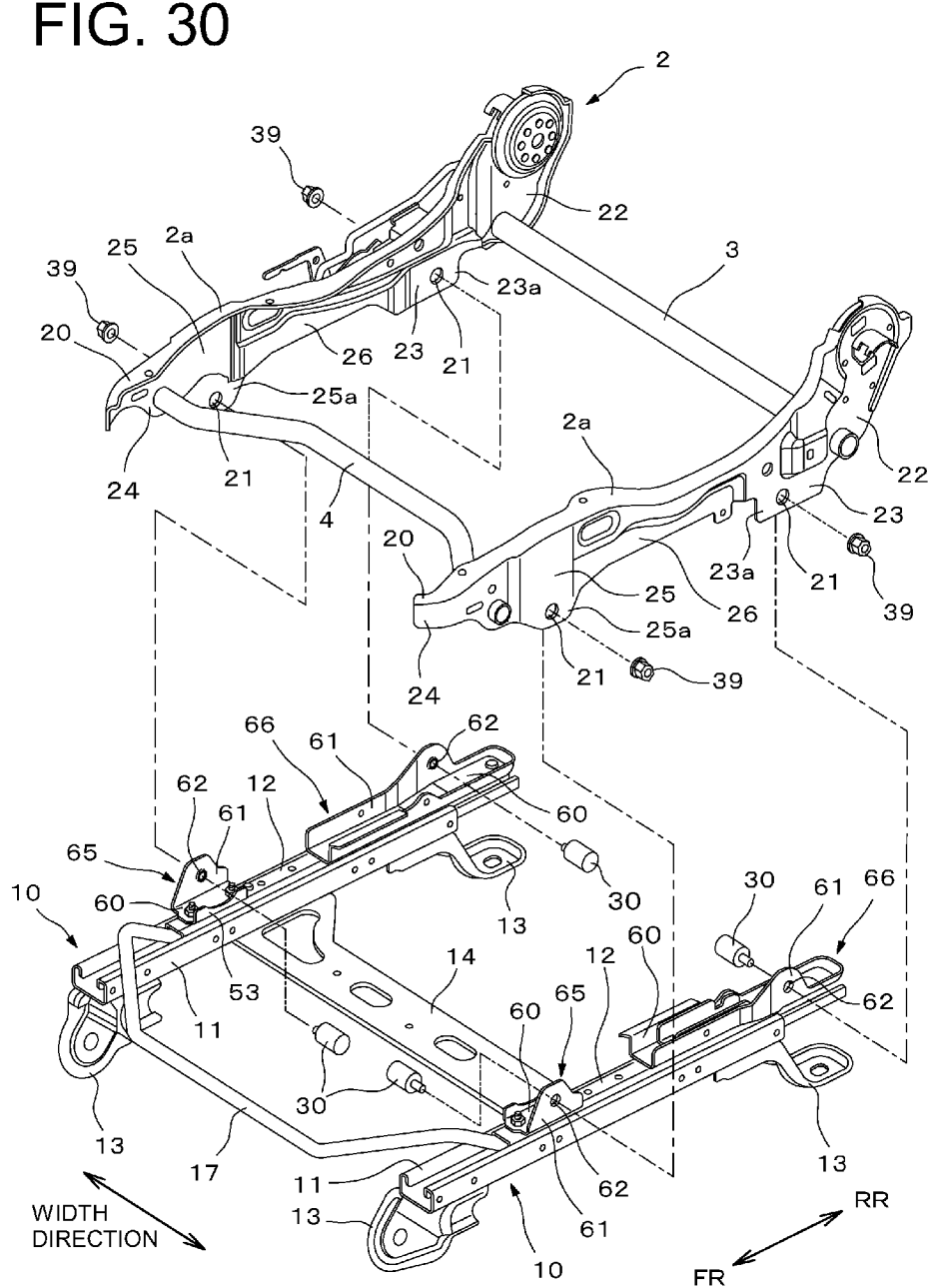
FIG. 30 is an exploded perspective view of a seat unit according to the other embodiment.
Figure 31:
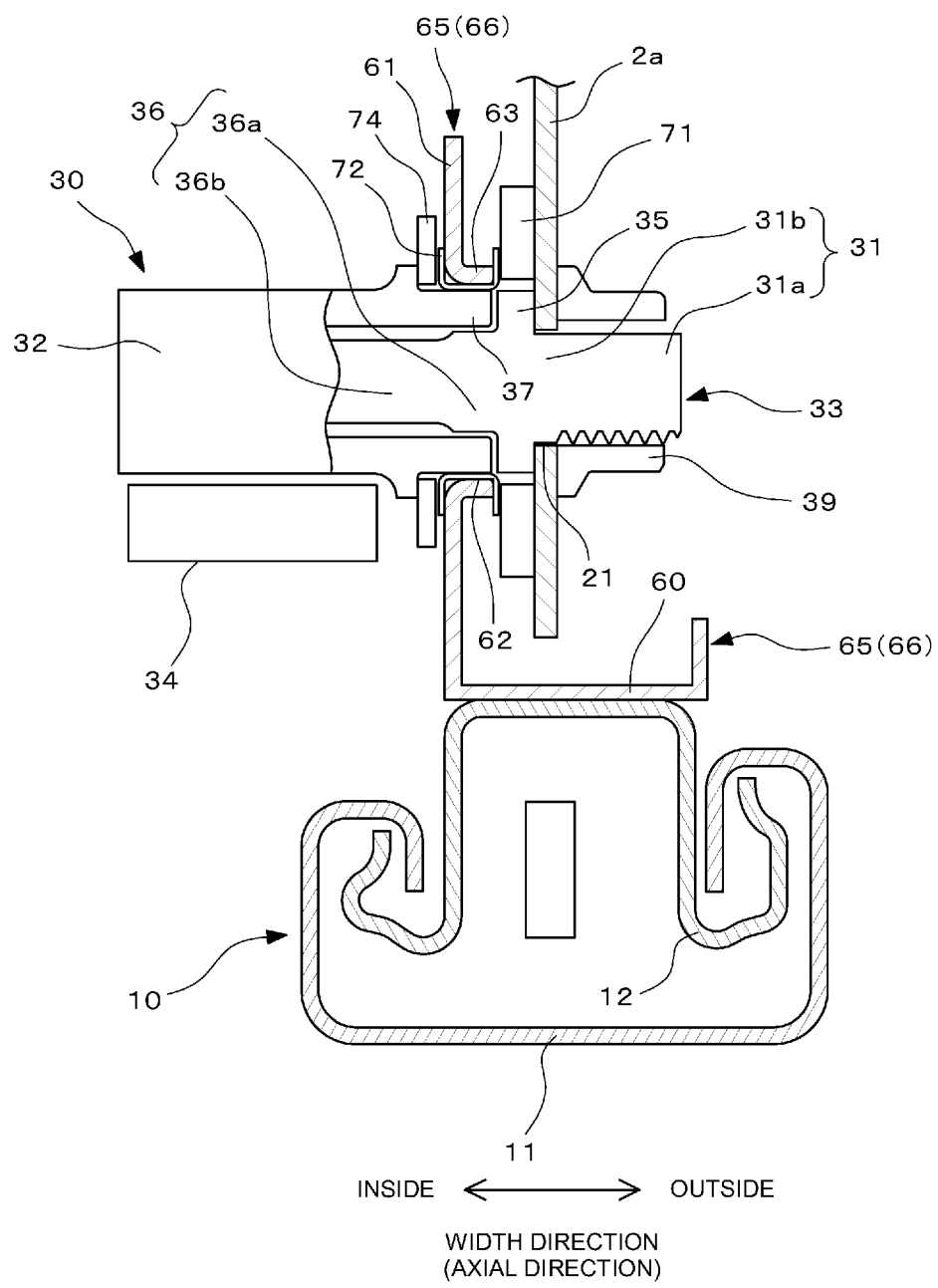
FIG. 31 is a cross-sectional diagram illustrating a support structure for a load measurement sensor according to the other embodiment.

Furthermore, in the configuration illustrated in FIGS. 29 and 31, the sensor receiving brackets 65 and 66 are fixed to the upper surface of the upper rail 12, but the sensor receiving brackets 65 and 66 may be attached to the side surface of the upper rail 12. Such a configuration is very appropriate for inhibiting an increase in size of the seat unit S in the vertical direction. More preferably, the sensor receiving brackets 65 and 66 are integrated, and the integrated sensor receiving bracket may be attached from the front end to the rear end of the side surface of the upper rail 12. In such a configuration, the support rigidity with respect to the sensor receiving bracket is improved. In addition, when the sensor receiving brackets 65 and 66 are disposed in the space between the lower rail 11 and the upper rail 12 in the width direction, an increase in size of the seat unit S in the width direction may be inhibited.

On the other hand, the sensor body 32 of the sensor 30 according to the other embodiment includes the load detection portion 37 which is deformed to detect the load. The load detection portion 37 corresponds to a deformation portion which is deformed in response to the magnitude of the load applied to the vehicle seat Z, and as in the specification example, is formed by the annular portion which is positioned at the opening side end of the outer cylindrical body provided in the sensor body 32. The end of the annular portion near the free end is inserted into the insertion hole 62 which is formed in the upright wall portion 61 of the sensor receiving brackets 65 and 66 in the state where the sensor 30 is fixed and supported to the side frame 2a. Here, in another embodiment, the insertion hole 62 corresponds to the hole portion, and each of the sensor receiving brackets 65 and 66 having the insertion hole 62 corresponds to a hole portion forming member.

Then, when a load is generated due to the passenger sitting on the vehicle seat Z, the end of the annular portion near the free end is deformed to be warped inward in the radial direction of the annular portion when the upper portion of the outer peripheral surface is pressed against the sensor receiving brackets 65 and 66. That is, even in another embodiment, as in the specification example, the upper portion of the outer peripheral surface of the annular portion corresponds to the load receiving surface 37a.

In the other embodiment, as illustrated in FIG. 31, the sensor 30 is fixed and supported to the side frame 2a so that the extension shaft portion 31 is positioned at the side portion of the sensor body 32. Specifically, as described above, the hole portion 21 provided in the side frame 2a overlaps the insertion hole 62 formed in each of the sensor receiving brackets 65 and 66, and the extension shaft portion 31 of the sensor 30 is inserted into both holes from the inside of the sensor receiving brackets 65 and 66. Accordingly, in the sensor 30, the end of the annular portion near the free end is loosely inserted into the insertion hole 62 of the sensor receiving brackets 65 and 66.

In addition, the male screw portion 31a of the extension shaft portion 31 protrudes toward the outside of the side frame 2a from the hole portion 21 of the side frame 2a, and the nut 39 is threaded into the male screw portion 31a. In this way, when the extension shaft portion 31 is fastened to the side frame 2a, the sensor 30 is fixed and supported to the side frame 2a. Then, even in the other embodiment, the sensor 30 is supported in the state where the extension shaft portion 31 is positioned at the side portion of the sensor body 32, and more specifically, the axial direction of the extension shaft portion 31 follows the width direction. Furthermore, the sensor 30 which is supported to the side frame 2a is held in a cantilevered state, and more specifically, a state where the side opposite to the extension shaft portion 31 becomes a free end.

When the passenger sits on the vehicle seat Z to which the sensor 30 is set in such a state, the load at this time (indicated by the arrow F in FIG. 34) is transmitted to the load detection portion 37 through the side frame 2a and the sensor receiving brackets 65 and 66. Specifically, when the passenger sits on the vehicle seat Z, the side frame 2a presses the upper end of the adjacent portion 31b of the extension shaft portion 31 downward by the load on the inner peripheral surface of the hole portion 21. The pressing force corresponds to the load which is generated when the passenger sits on the vehicle seat Z. For this reason, the portion of the side frame 2a provided with the hole portion 21 corresponds to the load input portion, and comes into contact with a portion different from the load receiving surface 37a in the sensor 30 to input the load to the sensor 30.

Figure 34:
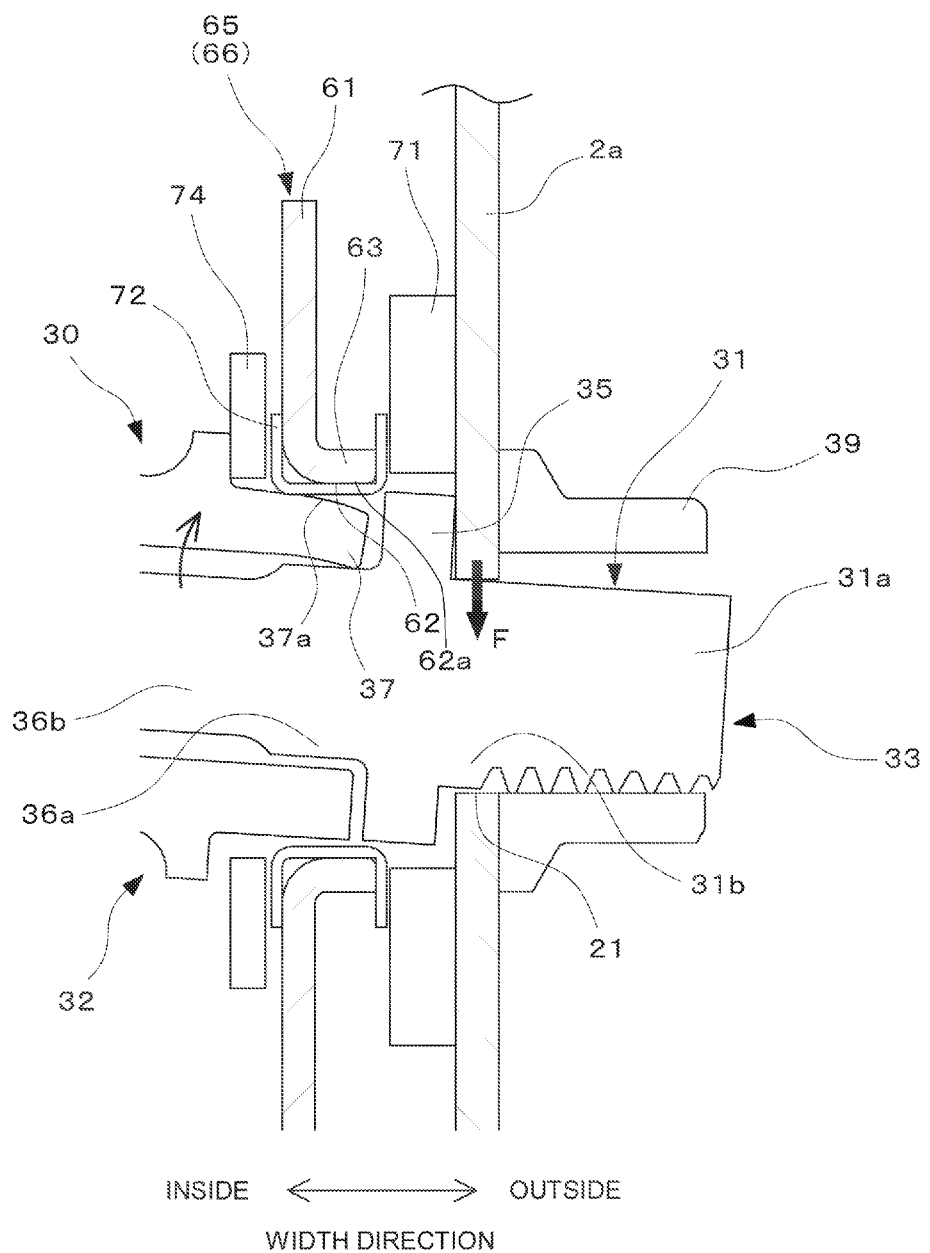
FIG. 34 is a diagram illustrating a load measurement sensor and the periphery thereof when a load is generated.

When the pressing force of the side frame 2a, that is, the load generated when the passenger sits on the vehicle seat Z is input, the sensor 30 rotates about a predetermined position as illustrated in FIG. 34 by the rotation moment generated by the input load from the side frame 2a. With such a rotation, the annular portion of the sensor body 32 provided with the load receiving surface 37a is pressed against the sensor receiving brackets 65 and 66, and particularly, the inner peripheral surface of the insertion hole 62 provided in the upright wall portion 61 through a sliding member 72 to be described later. For this reason, in the upright wall portion 61 of each of the sensor receiving brackets 65 and 66, the portion provided with the insertion hole 62 corresponds to the pressing portion. Particularly, the pressing portion according to the other embodiment constitutes a sensor body receiving portion against which the sensor body 32 is pressed with the rotation of the sensor 30.

Then, when the load receiving surface 37a which is formed in the upper portion of the outer peripheral surface of the annular portion is pressed against the upright wall portion 61 of the sensor receiving brackets 65 and 66, as illustrated in FIG. 34, the end of the annular portion near the free end is deformed to be inclined inward in the radial direction by the reaction force.

As described above, in the other embodiment, when the passenger sits on the vehicle seat Z, the load is first input from the side frame 2a to the extension shaft portion 31 of the sensor 30, so that the sensor 30 rotates by the input load. With the rotation, the upper portion of the outer peripheral surface of the annular portion serving as the load detection portion 37 is pressed against the upright wall portion 61 of the sensor receiving brackets 65 and 66. Finally, the end of the annular portion near the free end is deformed to be warped inward the radial direction. In this way, in the other embodiment, the load which is applied to the vehicle seat Z is transmitted to the load detection portion 37 through the side frame 2a and the sensor receiving brackets 65 and 66 and further the rotation of the sensor 30.

Further, as in the specification example, the even diameter portion 36a of the accommodation shaft portion 36 is disposed at the inside of the annular portion in the radial direction. Furthermore, as in the specification example, in the even diameter portion 36a, the regulation portion 36c is disposed at a position which is present at the load center point in the axial direction of the extension shaft portion 31. Here, the load center point according to the other embodiment is a point where the largest load concentrates when the annular portion is pressed against each of the sensor receiving brackets 65 and 66 and the load is applied thereto, and specifically, corresponds to the center position of the load receiving surface 37a (the center position of the axial direction of the extension shaft portion 31).

Then, since the regulation portion 36c is disposed at the above-described position, the regulation portion 36c receives the portion corresponding to the load center point in the annular portion serving as the load detection portion 37. As a result, the excessive deformation of the annular portion due to the biased load or the like is inhibited, so that the sensor 30 may stably measure the load.

Furthermore, in the annular portion, the even diameter portion 36a is present in the range where the annular portion is pressed against the sensor receiving brackets 65 and 66. Accordingly, in the range where the annular portion is pressed against the sensor receiving brackets 65 and 66, the even diameter portion 36a receives the annular portion. As a result, the load may be further stably measured.

Further, as in the specification example, in the even diameter portion 36a, the regions which are positioned at both sides of the region (the regulation portion 36c) which regulates the deformation of the annular portion serve as a foreign matter intrusion inhibiting portion 36d which inhibits foreign matter from intruding between the annular portion and the accommodation shaft portion 36.

Next, the support structure for the sensor 30 according to the other embodiment will be described. Furthermore, the vehicle seat Z is formed in a substantially bisymmetrical shape, and hereinafter, only the configuration at one end side of the width direction of the vehicle seat Z will be described.

Figure 33:
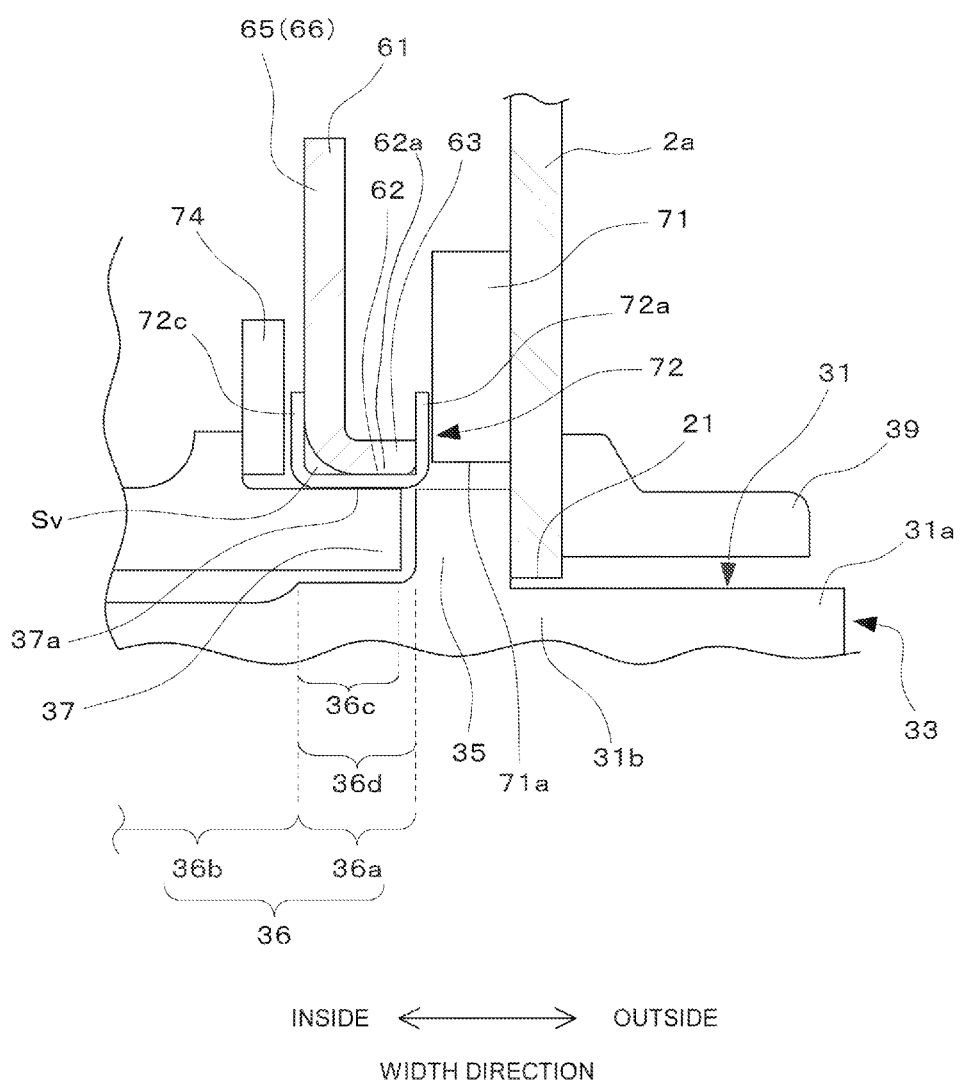
FIG. 33 is a partially enlarged diagram of a support structure for a load measurement sensor according to the other embodiment.

The sensor 30 is, as illustrated in FIG. 33, supported to connect the side frame 2a and the sensor receiving brackets 65 and 66 to each other while crossing the members.

On the other hand, the side frame 2a is provided with the circular hole portion 21, and the adjacent portion 31b of the extension shaft portion 31 of the sensor 30 is loosely inserted into the hole portion 21.

The sensor receiving brackets 65 and 66 are formed separately from the upper rail 12, extend along the front-to-back direction of the vehicle seat Z, and are detachably fixed to the upper surface of the upper rail 12 by the bolt. Since the sensor receiving brackets 65 and 66 are formed separately from the upper rail 12, the general versatility and the maintenance workability of the support structure for the sensor 30 are improved. Here, the sensor receiving brackets 65 and 66 may be integrated with the lower rail 11 or the upper rail 12 to constitute a part of the rail member. With such a configuration, since a part of the rail member having a comparatively high rigidity is used as the sensor receiving brackets 65 and 66, the rigidity of the sensor receiving brackets 65 and 66 is ensured. As a result, the load detection portion 37 of the sensor body 32 is stably pressed against the sensor receiving brackets 65 and 66.

Further, in the other embodiment, the front sensor receiving bracket 65 is provided in the front end of the upper rail 12, and the rear sensor receiving bracket 66 is provided in the rear end of the upper rail 12. In this way, when two sensor receiving brackets 65 and 66 are away from each other in the front-to-back direction of the vehicle seat Z, the arrangement of the respective sensor receiving brackets 65 and 66 may be individually adjusted, so that the bracket position adjusting precision is improved. Here, the invention is not limited thereto. For example, a configuration in which the sensor receiving bracket is integrated without being divided into the front and rear portions, a configuration in which the front sensor receiving brackets 65 are connected to each other and the rear sensor receiving brackets 66 are connected to each other, and a configuration which is obtained by the combination thereof may be adopted. With such a configuration, the rigidity of the sensor receiving brackets 65 and 66 is improved.

Here, the front sensor receiving bracket 65 and the rear sensor receiving bracket 66 have different lengths in the front-to-back direction, but have substantially the same basic structures. Hereinafter, only the structure of the front sensor receiving bracket 65 will be described.

The sensor receiving bracket 65 includes, as illustrated in FIG. 30, a bottom wall portion 60 which is placed on the upper surface of the upper rail 12 and an upright wall portion 61 which is substantially formed upright in the perpendicular direction from the outer end of the bottom wall portion 60 in the width direction. Then, as described above, the upright wall portion 61 is provided with the insertion hole 62, and the annular portion serving as the load detection portion 37 is loosely inserted into the insertion hole 62.

Furthermore, as illustrated in FIG. 31, in the upright wall portion 61, a burring process is performed on the outer edge of the insertion hole 62. Accordingly, in the upright wall portion 61, the outer edge of the insertion hole 62 is bent in an annular shape to form an annular portion 63. The annular portion 63 indicates a portion of the upright wall portion 61 which has the insertion hole 62 formed therein and slightly protrudes outward in the width direction, that is, toward the installation side of the adjacent side frame 2a. Since the annular portion 63 is formed, the length of the insertion hole 62 in the width direction becomes longer by the amount of the annular portion 63.

Further, in the embodiment, in the upright wall portion 61, a portion which is bent to form the annular portion 63 is bent in a round shape as illustrated in FIG. 33. That is, in the upright wall portion 62, the opening edge of the insertion hole 62 which is positioned at the side opposite to the installation side of the annular portion 63 is chamfered to be rounded.

Further, in the upright wall portion 61, the portion which is positioned below the insertion hole 62 extends along the vertical direction toward the vehicle body floor, that is, downward. Accordingly, since the upright wall portion 61 is widened in the width direction, an increase in size of the vehicle seat Z may be inhibited.

Then, the insertion hole 62 formed in each of the sensor receiving brackets 65 and 66 overlaps the hole portion 21 formed in the side frame 2a to communicate therewith, and the extension shaft portion 31 of the sensor 30 is inserted into two overlapping holes from the inside of the upright wall portion 61 of each of the sensor receiving brackets 65 and 66. At this time, the sensor 30 is inserted until the positioning portion 35 provided in the sensor body 32 comes into contact with the inner surface of the upright wall portion 61. Accordingly, the sensor 30 is positioned in the width direction.

When the sensor 30 is positioned, the annular portion serving as the load detection portion 37 in the sensor body 32 is loosely inserted into the insertion hole 62 formed in the upright wall portion 61 of the sensor receiving brackets 65 and 66. Also, the male screw portion 31a of the extension shaft portion 31 protrudes outward from the hole portion 21 of the side frame 2a, and the adjacent portion 31b is fitted into the hole portion 21. In addition, the nut 39 is threaded into the male screw portion 31a which protrudes from the hole portion 21 of the side frame 2a, so that the extension shaft portion 31 is fastened to the side frame 2a. With the above-described procedure, the sensor 30 is supported by the side frame 2a.

When the sensor 30 is supported by the side frame 2a, the sensor 30 is interposed between the portion of the side frame 2a provided with the hole portion 21 and each portion of the sensor receiving brackets 65 and 66 provided with the insertion hole 62. Here, the portion provided with the hole portion 21 of the side frame 2a corresponds to the load input portion as described above, and inputs the load applied to the vehicle seat Z to the sensor 30. On the other hand, the portion provided with the insertion hole 62 in the sensor receiving brackets 65 and 66 corresponds to the sensor body receiving portion as described above, and when the sensor 30 rotates by the load, the annular portion serving as the load detection portion 37 may be rigidly pressed through the sliding member 72 to be described later. That is, in the other embodiment, in the state where the sensor 30 is supported by the side frame 2a, the load input portion and the sensor body receiving portion are away from each other in the axial direction of the extension shaft portion 31.

As described above, when the load input portion and the sensor body receiving portion are away from each other in the axial direction of the extension shaft portion 31, the load is input from the load input portion to the sensor 30, so that the sensor 30 rotates. With the rotation of the sensor 30, the end of the annular portion serving as the load detection portion 37 near the free end is pressed against the sensor body receiving portion through the sliding member 72, so that the end of the annular portion near the free end is deformed to be warped inward in the radial direction. That is, the load which is input from the load input portion is appropriately transmitted to the annular portion in a manner such that the annular portion moves to a position where the annular portion is pressed against the sensor body receiving portion with the rotation of the sensor 30. At this time, even when the load input from the load input portion is minute, the load is appropriately transmitted from the load input portion to the annular portion by the principle of a lever.

With the above-described action, in the embodiment, the load input from the load input portion may be appropriately transmitted to the annular portion serving as the load transmission portion 37, so that the load may be accurately measured.

Furthermore, in the state where the sensor 30 is supported by the side frame 2a, the portion of the side frame 2a provided with the hole portion 21 is positioned at the side opposite to the sensor body 32 which is supported by the sensor receiving brackets 65 and 66 when seen from the near sensor receiving brackets 65 and 66. That is, in the other embodiment, the load input portion is positioned at the side opposite to the sensor body 32 in the axial direction of the extension shaft portion 31 when seen from the sensor body receiving portion. With such a positional relation, since the load input portion is away from the sensor body 32, for example, even when the excessive load is input from the load input portion, the excessive load is not directly applied to the sensor body 32, so that the sensor body 32 may be protected.

Further, as described above, when the sensor 30 rotates by the load applied to the vehicle seat Z, the annular portion is pressed against the inner peripheral surface of the insertion hole 62 formed in the upright wall portion 61 of each of the sensor receiving brackets 65 and 66 through the sliding member 42 to be described later. Here, the portion provided with the insertion hole 62 in the upright wall portion 61 is provided with the annular portion 63 by a boring process. That is, the area of the inner peripheral surface of the insertion hole 62 is widened by the amount of the annular portion 63. Accordingly, the annular portion is easily pressed against the inner peripheral surface of the insertion hole 62, so that the load is easily transmitted to the deformation portion. That is, the annular portion 63 is a portion which is formed to widen the area where the annular portion of the sensor body 32 is pressed against the inner peripheral surface of the insertion hole 62.

In addition, the annular portion 63 which is formed in the upright wall portion 61 of the sensor receiving brackets 65 and 66 protrudes toward the side frame 2a, that is, the installation side of the load input portion in the width direction. With such a configuration, when the sensor 30 rotates by the input load so that the annular portion of the sensor body 32 is pressed against the inner peripheral surface of the insertion hole 62, as illustrated in FIG. 34, first, the annular portion is pressed against the base end having a comparatively high rigidity in the annular portion 63. As a result, the annular portion is appropriately pressed against the inner peripheral surface of the insertion hole 62.

Figure 35:
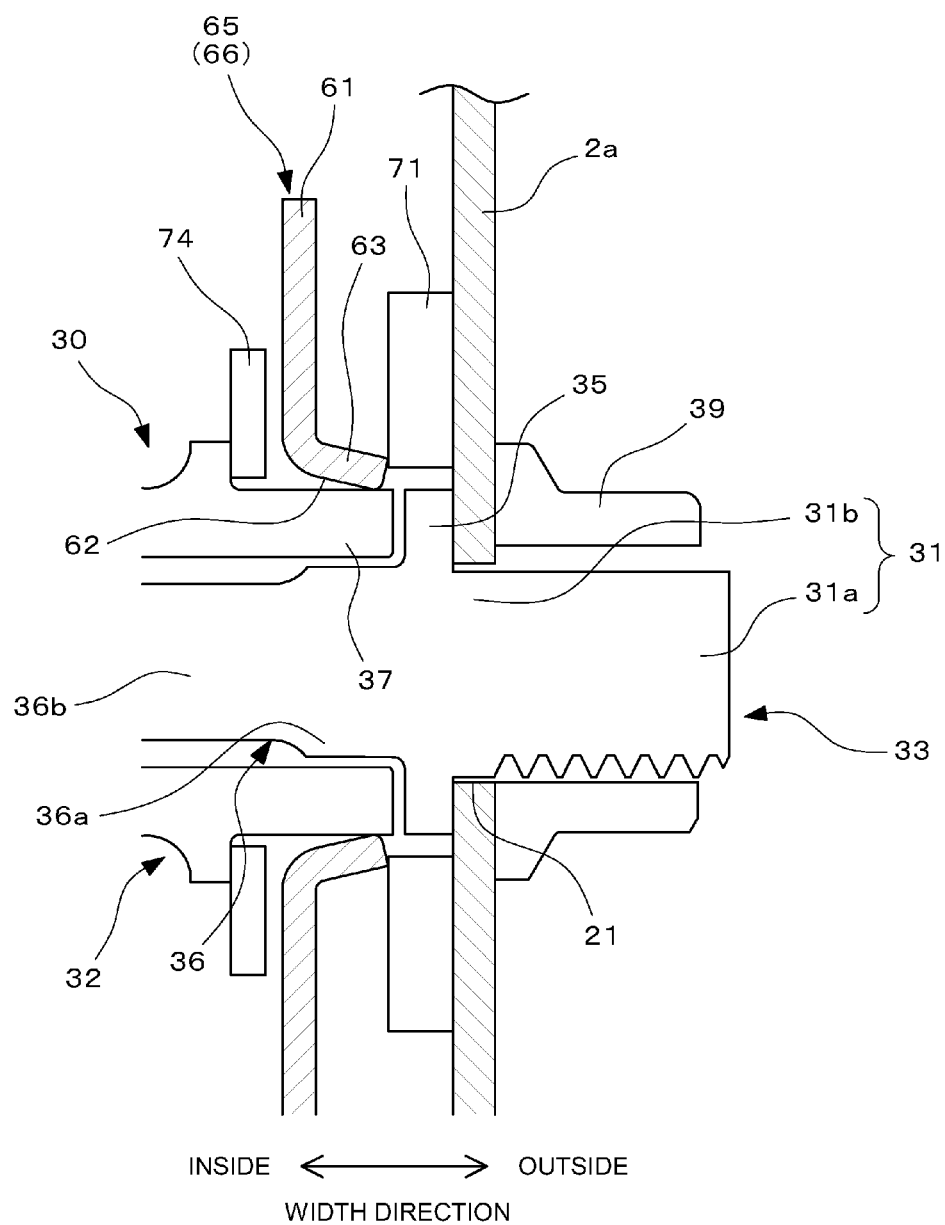
FIG. 35 is a diagram illustrating a first modified example of a support structure for a load measurement sensor according to the other embodiment.

Furthermore, when the annular portion is pressed against the inner peripheral surface of the insertion hole 62 by the rotation of the sensor 30, the load receiving surface 37a in the upper portion of the outer peripheral surface of the annular portion comes into contact with the inner peripheral surface of the insertion hole 62 while being inclined with respect to the axis of the annular portion. Here, in order to firmly and more efficiently press the annular portion against the inner peripheral surface of the insertion hole 62 by increasing the region of the load receiving surface 37a coming into contact with the inner peripheral surface of the insertion hole 62, as illustrated in FIG. 35, the shape of the annular portion 63 is formed in a tapered shape of which the diameter decreases toward the free end. For example, the inner peripheral surface of the insertion hole 62 may be formed as a surface which is inclined with respect to the axis of the annular portion to correspond to the inclination of the load receiving surface 37a.

Figure 36:
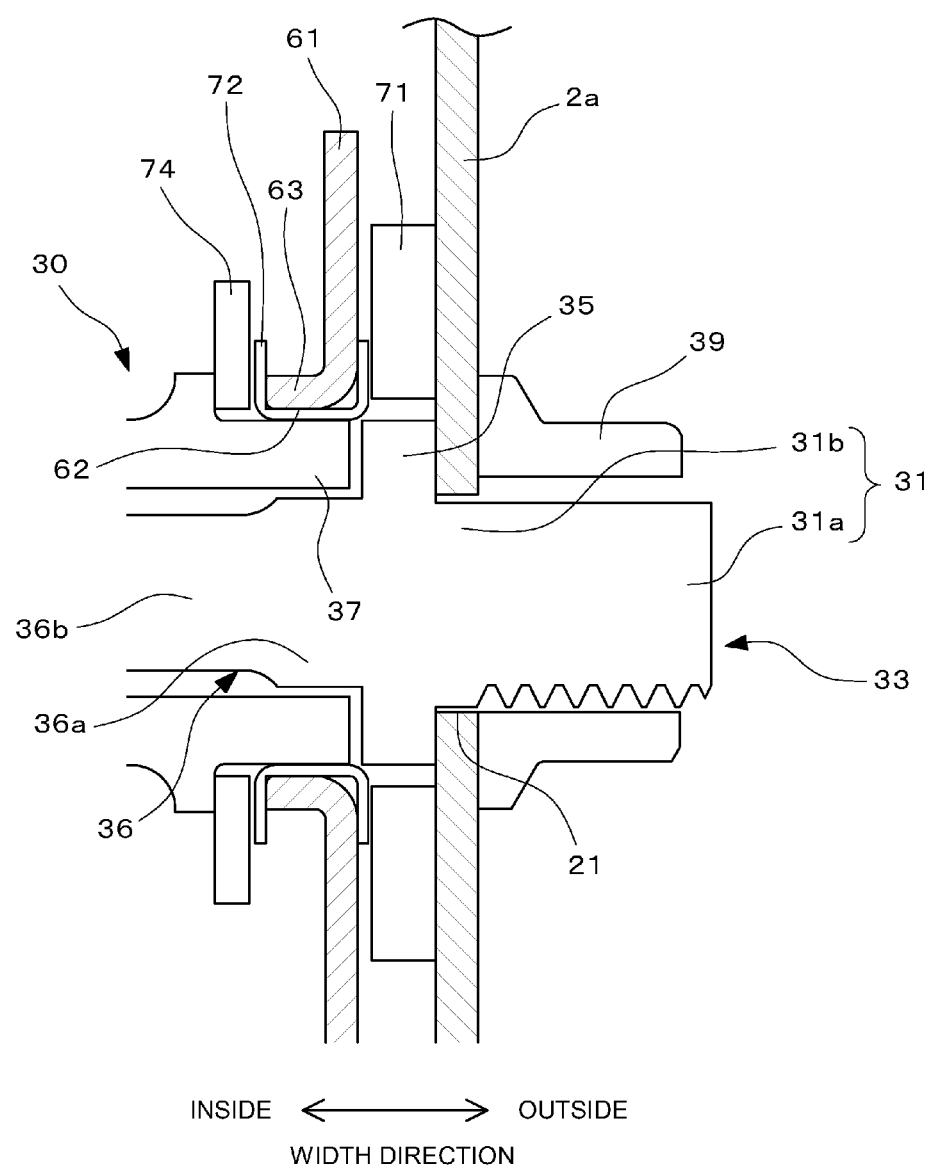
FIG. 36 is a diagram illustrating a second modified example of a support structure for a load measurement sensor according to the other embodiment.
Figure 37:
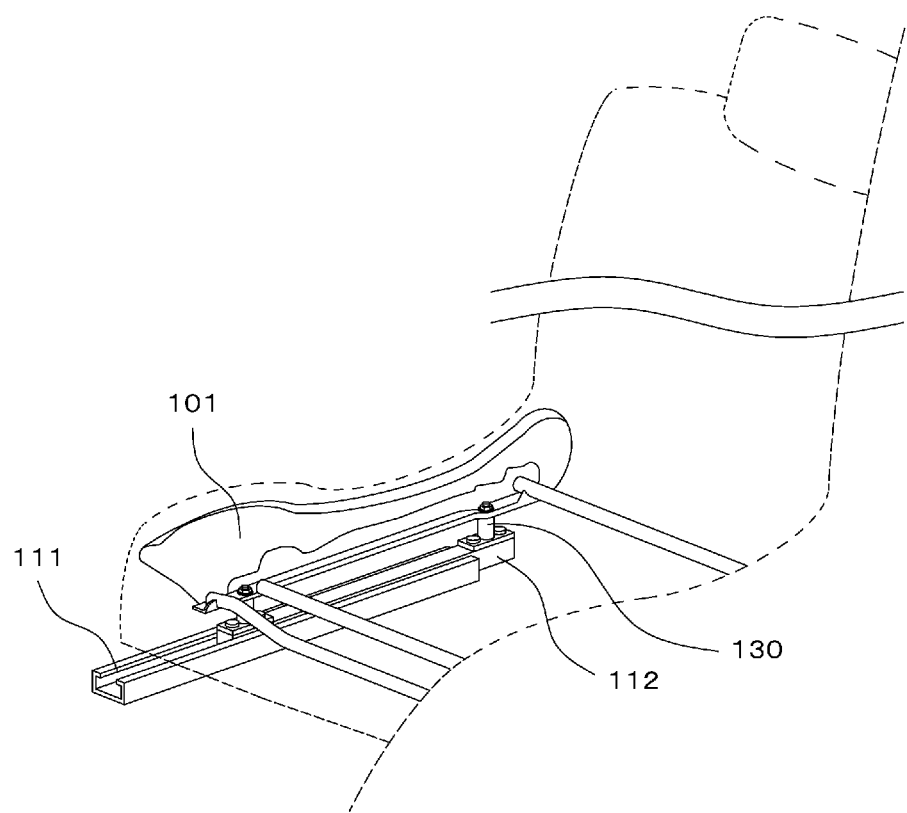
FIG. 37 is a partial perspective view illustrating a vehicle seat which adopts a support structure for a load measurement sensor according to the related art.
Figure 38:
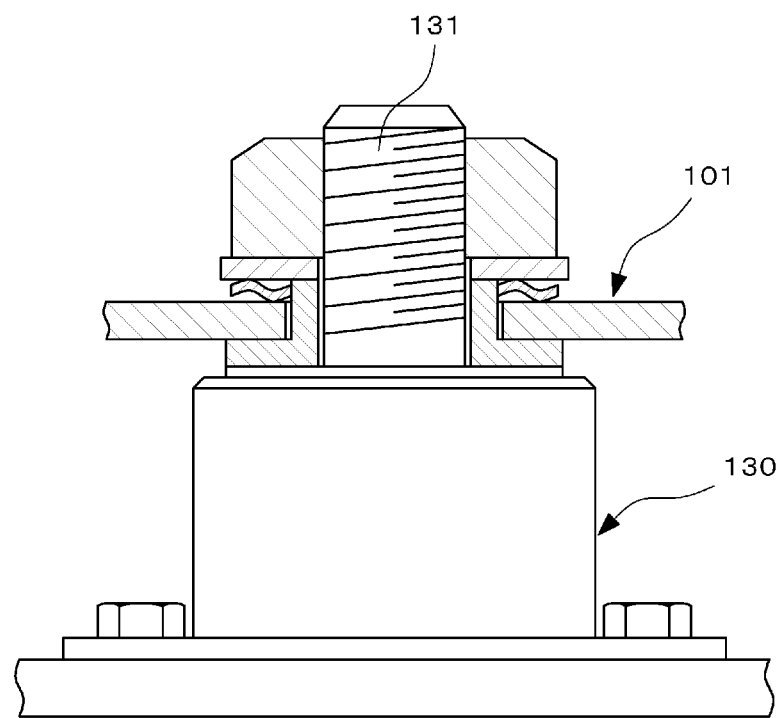
FIG. 38 is a cross-sectional view of the support structure for the load measurement sensor according to the related art.

Further, a configuration is exemplified in which the annular portion 63 protrudes toward the side frame 2a in the width direction. However, as illustrated in FIG. 36, the annular portion may protrude toward the side opposite to the side frame 2a, that is, the side opposite to the installation side of the load input portion. In such a configuration, when the sensor 30 rotates by the load input from the load input portion so that the annular portion of the sensor body 32 is pressed against the inner peripheral surface of the insertion hole 62, first, the annular portion is pressed against the inner peripheral surface of the insertion hole 62 at the free end of the annular portion 63. Accordingly, for example, even when the excessive load is input from the load input portion, the annular portion is pressed against the inner peripheral surface of the insertion hole 62 at the free end of the annular portion 63, the excessive load may be absorbed by releasing the impact load which is generated by the collision between the annular portion and the annular portion 63 due to the bending deformation of the free end.

On the other hand, in the state where the sensor 30 is supported by the side frame 2a, the annular portion is loosely inserted into the insertion hole 62, so the even diameter portion 36a of the accommodation shaft portion 36 and the uneven diameter portion 36b are partly disposed inside the insertion hole 62. In other words, the length of the insertion hole 62 is set to an extent in which the entire even diameter portion 36a is provided in the range from one end of the insertion hole 62 to the other end thereof when the sensor 30 is supported by the side frame 2a. With such a configuration, in the annular portion, the entire portion which is warped inward in the radial direction to comes into contact with the even diameter portion 36a is surrounded by the annular portion 63. Accordingly, since the annular portion 63 comes into contact with the portion of the annular portion which is warped, the load is reliably transmitted thereto.

Further, in the state where the sensor 30 is supported by the side frame 2a, the upper ends of the sensor receiving brackets 65 and 66 are positioned above the sensor 30 or the sensor attachment component 70, that is, a spacer 71, the sliding member 72, and a washer 74 to be described later. In this way, when the sensor receiving brackets 65 and 66 are formed above the sensor 30 or the sensor attachment component 70 serving as the subject support body, the support rigidity with respect to the subject support body is improved.

Next, the sensor attachment component 70 will be described which appropriately supports the sensor 30 to satisfactorily transmit the load to the sensor 30. As for the sensor attachment component 70, as illustrated in FIG. 31, the spacer 71, the sliding member 72, and the washer 74 are sequentially arranged from the outside in the width direction, and the component set is provided for each sensor 30. Furthermore, the other embodiment is different from the specification example in that the member corresponding to the bush 43 serving as the load transmission portion or the load transmission member is not provided.

Figure 32:
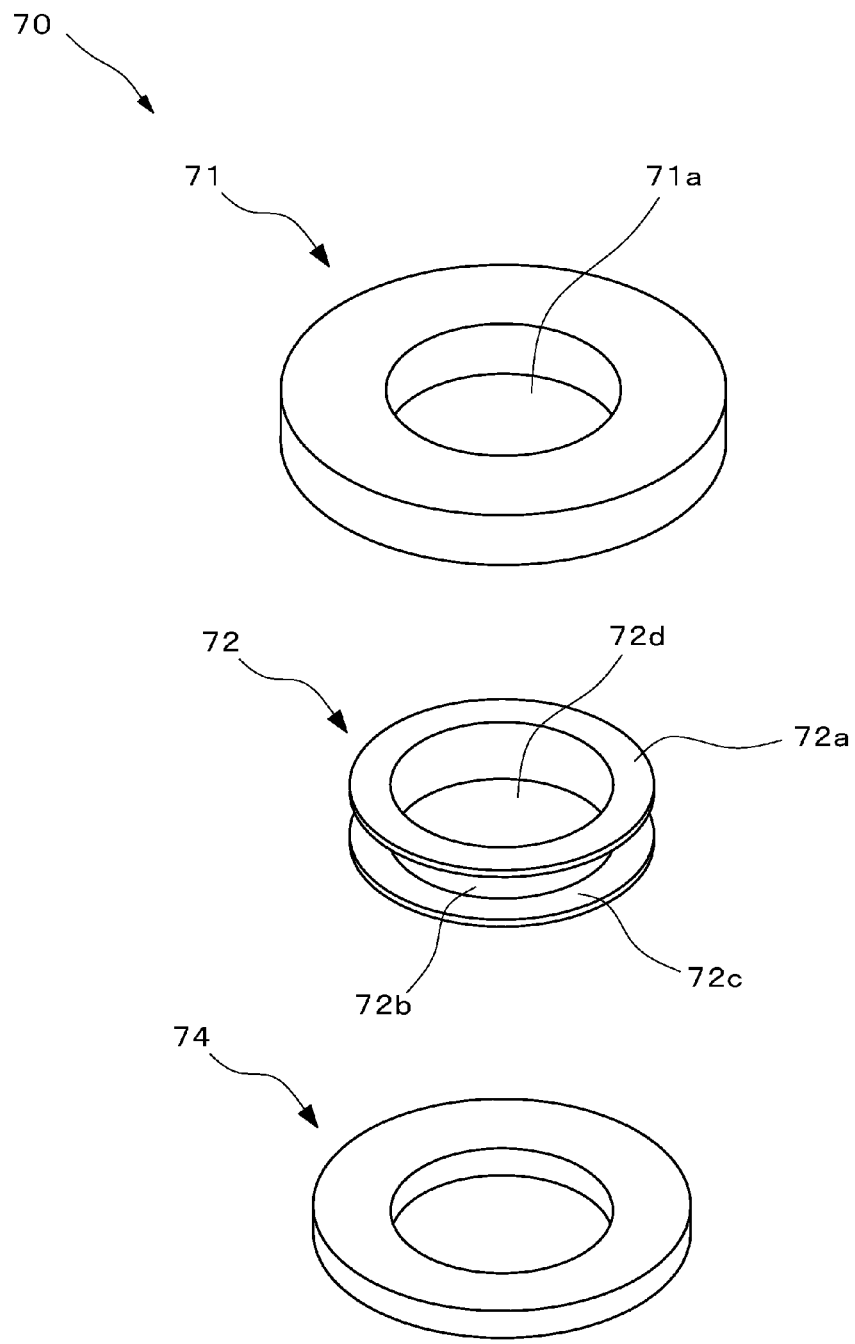
FIG. 32 is an exploded perspective component diagram illustrating each sensor attachment component according to the other embodiment.

In the sensor attachment component 70, the sliding member 72 is a cylindrical body illustrated in FIG. 32, and is fitted into the insertion hole 62 which is formed in the upright wall portion 61 of the sensor receiving brackets 65 and 66. Then, the annular portion of the sensor body 32 serving as the load detection portion 37 is fitted to a penetration hole 72d formed in the sliding member 72, and is pressed against the inner peripheral surface of the insertion hole 62 through the sliding member 72. At this time, the sliding member 72 comes into contact with the upper portion of the outer peripheral surface of the annular portion, that is, the load receiving surface 37a to transmit the load to the sensor body 32. That is, in the other embodiment, the sliding member 72 corresponds to the contact portion or the load input member as in the sliding member 42 of the specification example.

More specifically, the sliding member 72 is attached to the sensor receiving brackets 65 and 66 in the state where the center portion thereof in the axial direction is inserted into the insertion hole 62 of the sensor receiving brackets 65 and 66. At this time, the sliding member 72 is attached to the sensor receiving brackets 65 and 66 so that the axial direction of the sliding member 72 is equal to the width direction of the vehicle seat Z. In this way, in the other embodiment, the sensor receiving brackets 65 and 66 which are disposed at the inside in the width direction of the side frame 2a correspond to the attachment member, and the sliding member 72 serving as the contact portion is attached to the portion of the sensor receiving brackets 65 and 66 provided with the insertion hole 62.

Further, in the state where the sensor 30 is supported by the side frame 2a, the portion from the free end to the position slightly in front of the base end in the annular portion serving as the load detection portion 37 is fitted into the sliding member 42.

Then, when the sensor 30 rotates by the load applied to the vehicle seat Z so that the annular portion serving as the load detection portion 37 is pressed against the inner peripheral surface of the insertion hole 62 in the sensor receiving brackets 65 and 66, the sliding member 72 comes into contact with the outer periphery of the annular portion. That is, the annular portion is pressed against the inner peripheral surface of the insertion hole 62 through the sliding member 42. In other words, the sliding member 72 inputs the load generated from the vehicle seat Z through the inner peripheral surface coming into contact with the annular portion of the sensor body 32, so that the inner peripheral surface of the penetration hole 72d formed in the sliding member 72 corresponds to the contact surface with respect to the annular portion.

Further, when the annular portion is pressed against the inner peripheral surface of the insertion hole 62 through the sliding member 72, the sliding member 42 slides on the outer peripheral surface of the annular portion to move between the spacer 71 and the washer 74. That is, as in the specification example, the sliding member 72 corresponds to a movable portion, and moves in the axial direction of the extension shaft portion 31 with respect to the load receiving surface 37a. Then, when the annular portion is pressed against the inner peripheral surface of the insertion hole 62 by the rotation of the sensor 30 so that the free end of the annular portion is warped inward in the radial direction, the sliding member 72 slides on the outer peripheral surface of the annular portion outward in the width direction, that is, toward the side frame 2a to follow the strain deformation. In this way, when the sliding member 72 slides outward in the width direction, the annular portion receives the load from the side frame 2a provided with the fixed end of the sensor 30. As a result, since the load is stably transmitted to the annular portion, the detection precision is improved.

In addition, in the state where the sensor 30 is supported by the side frame 2a, the sliding member 72 is disposed across the free end of the annular portion in the width direction. Accordingly, when the annular portion is pressed against the inner peripheral surface of the insertion hole 62 through the sliding member 72, the annular portion is satisfactorily deformed to be warped, so that the load detection precision is improved.

The sliding member 72 with the above-described function includes, as illustrated in FIG. 32, a cylindrical fitting cylindrical portion 72b which is provided at the center of the axial direction and flange portions 72a and 72c which are formed at both ends in the axial direction. Furthermore, the axial direction of the sliding member 72 is equal to the sliding direction of the sliding member 72. Then, in the state where the sliding member 72 is attached to the sensor receiving brackets 65 and 66, the fitting cylindrical portion 72b is inserted into the insertion hole 62, the one end side flange portion 72a in the axial direction is adjacent to the free end at the outside of the free end of the annular portion 63 in the width direction, and the other end side flange portion 72c is adjacent to the inner surface of the upright wall portion 61 in the axial direction. That is, when the sliding member 72 is attached to the sensor receiving brackets 65 and 66, the portion provided with the insertion hole 62 in the upright wall portion 61 of the sensor receiving brackets 65 and 66 is interposed between two flange portions 72a and 72c.

Further, the sliding member 72 according to the other embodiment is formed so that the one end side flange portion 72a and the other end side flange portion 72c are symmetrical to each other and two flange portions 72a and 72c substantially have the same diameter. Accordingly, it is possible to inhibit the force acting on the flange portions 72a and 72c when the annular portion of the sensor body 32 comes into contact with the sliding member 72 from becoming uneven between the flange portions 72a and 72c. In addition, when the one end side flange portion 72a and the other end side flange portion 72c are symmetrical to each other, the sliding member 42 may be attached to the annular portion from any end, so that the operation of attaching the sliding member 72 is easily performed.

The attachment of the sliding member 72 will now be described. A substantially cylindrical base is inserted into the insertion hole 62 of the sensor receiving brackets 65 and 66, and in the state where both ends of the base protrude from the insertion hole 62, both ends of the base are caulked. With the above-described procedure, the sliding member 72 having the flange portions 72a and 72c provided in both ends is completed, and the sliding member 72 may be assembled to the upright wall portion 61 of the sensor receiving brackets 65 and 66. Then, in the state where the sliding member 72 is assembled to the sensor receiving brackets 65 and 66, the outer edge of the free end of the annular portion 63 is positioned at the inside of the outer edge of the one end side flange portion 72a. Accordingly, at the time point at which the caulking is performed, in the one end side flange portion 72a, it is possible to ensure a tolerance corresponding to the extent in which the free end of the annular portion 63 protrudes.

Furthermore, in the state where the sliding member 72 is attached to the sensor receiving brackets 65 and 66, as illustrated in FIG. 33, the one end side flange portion 72a of the sliding member 72 comes into contact with the free end of the annular portion 63 without any gap and is bonded to the annular portion 63. On the other hand, the other end side flange portion 72c comes into contact with the inner surface of the upright wall portion 61 and is bonded to the upright wall portion 61. However, in the corner portion which is formed by the other end side flange portion 72c and the fitting cylindrical portion 72b, a gap is formed with respect to the upright wall portion 61. As described above, in the upright wall portion 61, the opening edge of the insertion hole 62 is bent in a round shape and protrudes toward the side frame 2a to form the annular portion 63. Accordingly, the other end side flange portion 72c is bonded to the upright wall portion 61 by being bonded to the portion which is positioned at the outside in the radial direction compared to the base end bent in a round shape in the upright wall portion 61.

Then, in the state where the sensor 30 is supported by the side frame 2a, as illustrated in FIG. 33, the even diameter portion 36a of the accommodation shaft portion 36 is disposed at the inner position compared to both ends of the sliding member 72 in the axial direction of the extension shaft portion 31. Accordingly, when the annular portion of the sensor body 32 is pressed against the sensor receiving brackets 65 and 66 through the sliding member 72, the load is stably transmitted to the annular portion since the even diameter portion 36a is present at the side opposite to the sliding member 72 with the annular portion interposed therebetween.

Further, in the state where the sensor 30 is supported by the side frame 2a, as illustrated in FIG. 33, the sliding member 72 is disposed across the slit formed between the positioning portion 35 of the sensor body 32 and the annular portion in the axial direction of the extension shaft portion 31. That is, in the other embodiment, since the sliding member 72 is disposed at the outside of the slit in the radial direction, the slit may be covered by the sliding member 72, so that foreign matter may be inhibited from intruding into the slit.

Further, in the state where the sensor 30 is supported by the side frame 2a, as illustrated in FIG. 33, in the axial direction of the extension shaft portion 31, a gap (hereinafter, a hollow portion) Sv which is surrounded by the other end side flange portion 72c, the fitting cylindrical portion 72b, and the round bent portion of the upright wall portion 61 reaches the boundary position between the even diameter portion 36a and the uneven diameter portion 36b of the accommodation shaft portion 36. That is, the hollow portion Sv and the upright wall portion 61 are present at the position of the terminal end of the even diameter portion 36a in the axial direction of the extension shaft portion 31. Further, in the annular portion serving as the load detection portion 37, the portion positioned at the terminal end of the even diameter portion 36a in the axial direction is positioned at the innermost side in the width direction in the region pressed against the inner peripheral surface of the insertion hole 62.

On the other hand, in the embodiment, as described above, when the sensor 30 is rotated by the input load so that the annular portion the sensor body 32 is pressed against the inner peripheral surface of the insertion hole 62, the pressing is performed at the base end side of the annular portion 63. At this time, in the annular portion, the same portion as that of the terminal end of the even diameter portion 36a is pressed against the inner peripheral surface of the insertion hole 62. Then, since the base end of the annular portion 63 is provided with the hollow portion Sv, the impact which is generated when the annular portion is butted against the inner peripheral surface of the insertion hole 62 is absorbed by the hollow portion Sv.

The washer 74 corresponds to the movement regulation member as in the specification example, and is formed in an annular member into which the annular portion of the sensor body 32 is inserted. The washer 74 is positioned at the inside of the width direction compared to the other end side flange portion 72c of the sliding member 72, so that the excessive inward movement of the sliding member 72 is regulated in the width direction. That is, the washer 74 regulates the sliding member 72 from moving inward compared to the arrangement position of the washer 74. Further, as illustrated in FIG. 33, the boundary position between the even diameter portion 36a and the uneven diameter portion 36b in the accommodation shaft portion 36 is positioned at the outside of the washer 74 in the width direction. Accordingly, it is possible to inhibit the even diameter portion 36a from unnecessarily increasing in size in the axial direction of the accommodation shaft portion 36.

Further, the outer diameter of the washer 74 is formed to be larger than the outer diameters of the flange portions 72a and 72c of the sliding member 72. Accordingly, it is possible to reliably inhibit the excessive movement of the sliding member 72 by the washer 74. Furthermore, the washer 74 is not limited to be separated from the sensor 30. For example, the washer may be integrated with the annular portion of the sensor body 32. In such a configuration, the number of components decreases, so that the time necessary for the operation of supporting the sensor 30 may be shortened.

The spacer 71 is formed as a cylindrical member that is positioned between the one end side flange portion 72a of the sliding member 72 and the side frame 2a, and regulates the outward excessive movement of the sliding member 72 in the width direction. Specifically, when the sliding member 42 that is fitted to the annular portion of the sensor body 32 slides outward on the outer peripheral surface of the annular portion, the spacer 71 comes into contact with the sliding member 72 to regulate the sliding member 72 from coming off from the annular portion. The spacer 71 is bonded by projection welding to the side frame 2a in the state where a center circular hole 71a and the hole portion 21 of the side frame 2a overlap with each other in a concentric shape. The diameter of the circular hole 71a is larger than the diameter of the hole portion 21, and in the state where the sensor 30 is supported by the side frame 2a, as illustrated in FIG. 32, the positioning portion 35 of the sensor body 32 is disposed inside the circular hole 71a. Furthermore, the spacer 71 is not limited to be separated from the sensor 30 or the sensor receiving brackets 65 and 66. For example, the spacer may be integrated with the upright wall portion 61 by processing a part of the upright wall portion 61 of the sensor receiving brackets 65 and 66. In such a configuration, the number of components decreases, so that the time necessary for the operation of supporting the sensor 30 may be shortened.

Other Embodiments

In the above-described embodiment, an example of the support structure for the sensor 30 which measures the load applied to the vehicle seat Z has been described as an example. However, the above-described embodiment is provided to help the understanding of the invention, and does not limit the invention. The invention may be modified and improved without departing from the spirit of the invention, and of course, the equivalent thereof is included in the invention. Further, the above-described material or shape is merely an example of exhibiting the effect of the invention, and does not limit the invention.

For example, in the above-described embodiment, the sensor 30 is described which measures the load by detecting the deformation amount of the load detection portion 37 using the strain sensor, but the invention is not limited thereto. For example, a load measurement sensor may be used which includes a magnet displaced with the deformation of the load detection portion 37 and a hall element facing the magnet. In such a sensor, when the load detection portion 37 is deformed, the magnet is displaced with the deformation, and the hall element measures the displacement amount, thereby measuring the load from the measurement result.

Further, in the above-described embodiment, when supporting the sensor 30, the extension shaft portion 31 of the sensor 30 is inserted into the insertion holes 52 and 62 of the attachment brackets 15 and 16 or the sensor receiving brackets 65 and 66, the male screw portion 31a protrudes outward from the opening of the insertion hole 52, 62, and then the nut 39 is threaded into the male screw portion 31a. Here, the invention is not limited thereto. For example, the front end of the extension shaft portion 31 may not protrude outward from the insertion holes 52 and 62 when supporting the sensor 30. That is, in the state where the extension shaft portion 31 is inserted into the insertion holes 52 and 62, the front end of the extension shaft portion 31 may be positioned between one end side opening and the other end side opening of the insertion holes 52 and 62. With such a configuration, in the extension shaft portion 31, the portion which protrudes from the insertion holes 52 and 62 serves to inhibit the interference with the other member.

Further, in the above-described embodiment, as the support spring which supports the cushion body, the S-spring 6 is provided. Then, in the above-described embodiment, in order to prevent the interference between the sensor 30 and the S-spring 6, the sensor 30 is disposed at a position away from the S-spring 6. Here, the invention is not limited thereto. For example, a pan frame (a sheet metal member) or the like may be provided as a passenger posture support member instead of the support spring. Even in such a configuration, in order to attain a compact in size of the vehicle seat Z, it is desirable to support the sensor 30 in a manner that the sensor is away from the passenger posture support member as much as possible.

Further, in the above-described embodiment, in order to further appropriately transmit the load from the side frame 2a to the sensor 30, the bush 43 or the sliding member 42 is provided, and the side frame 2a presses the load detection portion 37 through the bush 43 or the sliding member 42. Here, the invention is not limited thereto. For example, the bush 43 or the sliding member 42 may not be provided, and the side frame 2a may directly come into contact with the load detection portion 37 to press the load detection portion 37. Further, instead of the bush 43 or the sliding member 42, other relay member may be provided in the load transmission path from the side frame 2a to the sensor body 32.

Furthermore, in the above-described embodiment, the sliding member 42 is a movable member that moves with the deformation of the load detection portion 37. However, for example, in a configuration in which the side frame 2a directly comes into contact with the load detection portion 37 to press the load detection portion 37, the side frame 2a corresponds to the movable member.

Further, in the above-described embodiment, the vehicle seat Z is exemplified as the seat, but the invention is not limited thereto. The invention may be applied to other conveyances such as an airplane or a ship. In addition, the invention is not limited to the conveyance, and the invention may be applied to any seat which needs to measure the load thereof.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of components that perform the specified functions.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are used herein generally and are not limited solely to mechanical embodiments. Numerous modifications and adaptations will be readily apparent to those skilled in this art without departing from the spirit and scope of the present invention.

DESCRIPTION OF REFERENCE NUMERALS AND SIGNS

Z: vehicle seat
F: seat frame
S: seat unit
Sv: hollow portion
1: seat back frame
2: seating frame
2a: side frame
2b: deformation following portion
3: connection pipe
4: submarine restraining pipe
4a: transverse center portion
4b: transverse end
4c: connection portion
5: hanging pan
6: S-spring
6a: first curved portion
6b: second curved portion
10: rail mechanism
11: lower rail
12: upper rail
13: support bracket
14: member frame
15, 16: attachment bracket
17: slide lever
18: bolt
20: front end
21: hole portion 22: connection region
23: rear attachment region
23a: protrusion portion
24: front end region
25: front attachment region
25a: protrusion portion
26: intermediate region
26a: lower portion
26b: upper portion
26c: rear adjacent portion
26d: front adjacent portion
30: sensor (load measurement sensor)
31: extension shaft portion
31a: male screw portion
31b: adjacent portion
31c, 31d: convex portion
32: sensor body
33: shaft body
34: substrate unit
34a: connector portion
35: positioning portion
36: accommodation shaft portion
36a: even diameter portion
36b: uneven diameter portion
36c: regulation portion
36d: foreign matter intrusion inhibiting portion
36i: inclined surface
37: load detection portion
37a: load receiving surface
37b: free end
37h: inclined surface
37i: inclined surface
37r: R-shaped portion
39: nut
40: sensor attachment component
41: spacer
41a: circular hole
41b, 41c: end
42: sliding member
42a: one end side flange portion
42ax: end
42a': thin portion
42b: fitting cylindrical portion
42c: other end side flange portion
42c': thick portion
42d: penetration hole
42i: inclined surface
43: bush
43a: cylindrical portion
43b: flange portion
43c: penetration hole
43d: welded portion
43e: deformation following portion
43i: inclined surface
44: washer
45: E-ring
50: bottom wall portion
51: upright wall portion
52: insertion hole
52a, 52b: concave portion
53: upward protrusion wall
54: removed portion
60: bottom wall portion
61: upright wall portion
62: insertion hole
63: annular portion
65, 66: sensor receiving bracket
70: sensor attachment component
71: spacer
71a: circular hole
72: sliding member
72a: one end side flange portion
72b: fitting cylindrical portion
72c: other end side flange portion
72d: penetration hole
74: washer
101: seat frame
111: lower rail
112: upper rail
130: load measurement sensor
131: shaft portion

What is claimed is:

1. A support structure for a load measurement sensor which supports the load measurement sensor, comprising:
a sensor body that detects a load applied to a seat; and
an extension shaft portion extending from the sensor body, by way of a support bracket in a state where the extension shaft portion is positioned at a side portion of the sensor body;
the sensor body comprising:
a deformation portion which is a portion of bendable material and is deformable to be curved inward in a radial direction of the extension shaft portion by receiving the load; and
a regulation portion which is a portion of material which is positioned inside relative to the deformation portion in the radial direction and comes into contact with the deformation portion to regulate a deformation amount of the deformation portion;
the regulation portion being disposed in an axial direction of the extension shaft portion at a position that includes a load center point of the load applied to the deformation portion by the seat;
wherein:
the support structure for the load measurement sensor comprises:
a pressing portion which is positioned at an outside of the deformation portion in the radial direction and presses the deformation portion inward in the radial direction when the load is applied to the seat; and
a load transmission member that is positioned between the deformation portion and the pressing portion in the radial direction to widen a pressing area in which the pressing portion presses the deformation portion;
the load transmission member is provided so that both ends of the load transmission member in the axial direction are positioned at an inside of both ends of the regulation portion in the axial direction; and
a length of the load transmission member in the axial direction is longer than a length of the pressing portion in the axial direction.

2. The support structure for the load measurement sensor according to claim 1, wherein:
the sensor body further includes a foreign matter intrusion inhibiting portion which inhibits foreign matter from intruding between the deformation portion and the regulation portion.

3. The support structure for the load measurement sensor according to claim 2, wherein the regulation portion and the foreign matter intrusion inhibiting portion are provided in a same components among components constituting the sensor body.

4. The support structure for the load measurement sensor according to claim 1, wherein:

the support structure for the load measurement sensor includes a pressing portion which is positioned at an outside of the deformation portion in the radial direction and presses the deformation portion inward in the radial direction when the load is applied to the seat; and a length of the regulation portion in the axial direction is longer than a length of the pressing portion in the axial direction.

5. The support structure for the load measurement sensor according to claim 1, wherein the deformation portion, the pressing portion, and the load transmission portion comprise separately formed parts.

6. The support structure for the load measurement sensor according to claim 1, wherein:

the support structure for the load measurement sensor includes a pressing portion which is positioned at an outside of the deformation portion in the radial direction and presses the deformation portion inward in the radial direction when the load is applied to the seat;

the pressing portion is positioned at a position different from the support bracket in the axial direction;

the sensor body includes a substrate which outputs an electric signal representing a measurement result using the load measurement sensor;

the substrate is disposed at a side opposite to the support bracket with respect to the pressing portion in the axial direction; and a gap between the substrate and the pressing portion in the axial direction is larger than a gap between the pressing portion and the support bracket.

7. The support structure for the load measurement sensor according to claim 1, wherein:

the support structure for the load measurement sensor comprises:

a pressing portion which is positioned at an outside of the deformation portion in the radial direction and presses the deformation portion inward in the radial direction when the load is applied to the seat; and a load input member that is positioned between the deformation portion and the pressing portion in the radial direction and moves in the axial direction along with a deformation of the deformation portion, one end of a contact surface of the load input member with respect to the deformation portion in the axial direction is positioned near the extension shaft portion compared to an other end of the contact surface in the axial direction;

one end of the regulation portion in the axial direction is positioned near the extension shaft portion compared to an other end of the regulation portion in the axial direction; and the one end of the contact surface in the axial direction is separated from the extension shaft portion compared to the one end of the regulation portion in the axial direction.

8. The support structure for the load measurement sensor according to claim 7, wherein the other end of the contact surface in the axial direction is near the extension shaft portion compared to the other end of the regulation portion in the axial direction.

9. The support structure for the load measurement sensor according to claim 1, wherein:

the support structure for the load measurement sensor comprises:

a movable portion which is disposed at a position parallel to the support bracket in the axial direction and moves in the axial direction along with a deformation of the deformation portion; and a spacer which is disposed in a gap between the support bracket and the movable portion in the axial direction and is adjacent to the movable portion in the axial direction;

the movable portion is positioned at an outside of the deformation portion in the radial direction and moves toward the support bracket along the axial direction while pressing the deformation portion inward in the radial direction to transmit the load to the deformation portion, and an end of the spacer near the movable portion in the axial direction and an end of the deformation portion near the spacer in the axial direction overlap with each other on a same imaginary plane in which the axial direction is set as a normal direction.

10. The support structure for the load measurement sensor according to claim 9, wherein:

a hole portion forming member that has a hole portion formed to insert the deformation portion thereinto is positioned at an inside in the axial direction compared to the support bracket;

the movable portion is a load input member that is positioned between the hole portion forming member and the deformation portion in the radial direction and moves toward the support bracket in the axial direction along with the deformation of the deformation portion; and the load input member is disposed at a position separated from the support bracket compared to the end of the deformation portion near the support bracket in the axial direction.

11. The support structure for the load measurement sensor according to claim 1, wherein:

the support structure for the load measurement sensor comprises:

a movable portion which is disposed at a position parallel to the support bracket in the axial direction and moves in the axial direction along with a deformation of the deformation portion; and a movement regulation member that is adjacent to the movable portion in the axial direction and regulates the movement of the movable portion toward a side opposite to the support bracket;

the movable portion is positioned at an outside of the deformation portion in the radial direction and moves toward the support bracket along the axial direction while pressing the deformation portion inward in the radial direction to transmit the load to the deformation portion, and an end of the regulation portion at the side opposite to the support bracket in the axial direction is near the support bracket compared to the movement regulation member.

12. The support structure for the load measurement sensor according to claim 1, wherein:

the deformation portion includes a load receiving surface, and is deformed to be curved inward in the radial direction when the load is transmitted to the load receiving surface;

the support structure for the load measurement sensor comprises:

a hole portion which is formed in the support bracket to insert the extension shaft portion thereinto;

a convex portion which protrudes from the extension shaft portion; and a concave portion which is formed in the support bracket and is engageable with the convex portion;

when the load measurement sensor rotates about the extension shaft portion relative to the support bracket in a state where the extension shaft portion is inserted into the hole portion, the convex portion comes into contact with the concave portion.

13. The support structure for the load measurement sensor according to claim 1, wherein:

the support structure for the load measurement sensor includes a contact portion which comes into contact with the sensor body and transmits the load to the sensor body, the sensor body includes a load receiving surface which comes into contact with the contact portion and receives the load, and a surface contact holding mechanism is formed where the load receiving surface is able to come into plane-contact with the contact portion when the load is transmitted to a position where the load receiving surface comes into contact with the contact portion.

14. The support structure for the load measurement sensor according to claim 13, wherein:

the support structure for the load measurement sensor includes a load transmission portion which transmits the load from the seat to the contact portion;

the load receiving surface receives the load from the contact portion and is displaceable in a direction opposite to the contact portion; and the load transmission portion includes a deformation following portion which is deformable based on a displacement of the load receiving surface.

15. The support structure for the load measurement sensor according to claim 1, wherein a surface contact holding mechanism is formed such that the regulation portion is able to come into plane-contact with the deformation portion when the deformation portion receives the load at a position where the regulation portion comes into contact with the deformation portion.

16. The support structure for the load measurement sensor according to claim 15, wherein:

the deformation portion includes a free end at one end thereof; and the surface contact holding mechanism is provided near the free end.

17. The support structure for the load measurement sensor according to claim 1, wherein:

the support structure for the load measurement sensor includes:

a load input portion which comes into contact with the load measurement sensor and inputs the load to the load measurement sensor; and a sensor body receiving portion which is pressed by the deformation portion when the load measurement sensor is moved by the load input from the load input portion; and in a state where the load measurement sensor is supported by the support bracket, the load input portion and the sensor body receiving portion are separated from each other.

* * * * *